United States Patent
MacDougall

(10) Patent No.: US 11,794,893 B2
(45) Date of Patent: Oct. 24, 2023

(54) TRANSPORTATION SYSTEM FOR TRANSPORTING ORGANIC PAYLOADS

(71) Applicant: Frederick William MacDougall, San Diego, CA (US)

(72) Inventor: Frederick William MacDougall, San Diego, CA (US)

(*) Notice: Subject to any disclaimer, the term of this patent is extended or adjusted under 35 U.S.C. 154(b) by 0 days.

(21) Appl. No.: 17/855,454

(22) Filed: Jun. 30, 2022

(65) Prior Publication Data

US 2022/0363379 A1   Nov. 17, 2022

Related U.S. Application Data

(63) Continuation-in-part of application No. 17/467,038, filed on Sep. 3, 2021, now Pat. No. 11,414,962.

(60) Provisional application No. 63/159,785, filed on Mar. 11, 2021, provisional application No. 63/075,521, filed on Sep. 8, 2020.

(51) Int. Cl.
| | |
|---|---|
| *B64C 37/02* | (2006.01) |
| *B64C 39/02* | (2023.01) |
| *B64B 1/70* | (2006.01) |
| *B64D 1/22* | (2006.01) |
| *B64U 10/30* | (2023.01) |
| *B64U 101/60* | (2023.01) |

(52) U.S. Cl.
CPC ............... *B64C 37/02* (2013.01); *B64B 1/70* (2013.01); *B64C 39/024* (2013.01); *B64D 1/22* (2013.01); *B64U 10/30* (2023.01); *B64U 2101/60* (2023.01)

(58) Field of Classification Search
CPC . B64C 37/02; B64C 39/024; B64C 2201/022; B64C 2201/128; B64B 1/70; B64D 1/22; B64U 10/30; B64U 2101/60
See application file for complete search history.

(56) References Cited

U.S. PATENT DOCUMENTS

| | | | |
|---|---|---|---|
| 3,955,411 A | 5/1976 | Lawson, Jr. | |
| 3,957,112 A | 5/1976 | Knibbe | |
| 3,991,583 A | 11/1976 | Scurlock | |
| 4,033,139 A | 7/1977 | Frederick | |

(Continued)

FOREIGN PATENT DOCUMENTS

| | | |
|---|---|---|
| AU | 2009201599 A1 | 11/2009 |
| CN | 107603644 A | 1/2018 |

(Continued)

OTHER PUBLICATIONS

Michels, et al. "Artificial coalification: comparison of confined pyrolysis and hydrous pyrolysis." Fuel 73.11 (Nov. 1, 1994): 1691-1696. Abstract, p. 1691 col. 2 para 3; p. 1692 col. 2 para 1.

(Continued)

*Primary Examiner* — Medhat Badawi
*Assistant Examiner* — Vicente Rodriguez
(74) *Attorney, Agent, or Firm* — ESPLIN & ASSOCIATES, PC

(57) ABSTRACT

Systems are described for transporting organic material, such as trees and logs, by flight. Such a transportation system may include a remotely-piloted air vehicle, a frame coupled thereto, multiple air vehicles, one or more propellers, a harness, and/or other components. The frame is coupled to both the remotely-piloted air vehicle and to the multiple other air vehicles.

9 Claims, 45 Drawing Sheets

(56) References Cited

U.S. PATENT DOCUMENTS

| | | | |
|---|---|---|---|
| 4,062,402 A | 12/1977 | Soulie | |
| 4,081,039 A | 3/1978 | Wardlaw | |
| 4,086,971 A | 5/1978 | Hall | |
| 4,176,722 A | 12/1979 | McNary | |
| 4,216,834 A | 8/1980 | Wardlaw | |
| 4,273,066 A | 6/1981 | Anderson | |
| 4,355,511 A | 10/1982 | Jones | |
| 4,363,566 A | 12/1982 | Morton | |
| 4,377,354 A | 3/1983 | Morton | |
| 4,448,266 A | 5/1984 | Potts | |
| 4,474,507 A | 10/1984 | Morton | |
| 4,511,287 A | 4/1985 | Horton | |
| 4,613,001 A | 9/1986 | Edberg | |
| 4,708,563 A | 11/1987 | Van Den Berg | |
| 4,719,937 A | 1/1988 | Roche | |
| 4,755,947 A | 7/1988 | Braschler | |
| 4,762,180 A | 8/1988 | Wybro | |
| 4,762,185 A | 8/1988 | Simpson | |
| 4,816,146 A | 3/1989 | Schertler | |
| 5,129,759 A | 7/1992 | Bishop | |
| 5,156,745 A | 10/1992 | Cairo, Jr. | |
| 5,447,392 A | 9/1995 | Marshall | |
| 5,490,562 A | 2/1996 | Arnold | |
| 5,506,137 A | 4/1996 | Mathur | |
| 5,511,905 A | 4/1996 | Bishop | |
| 5,516,434 A | 5/1996 | Cairo, Jr. | |
| 5,517,937 A | 5/1996 | Lunde | |
| 5,591,347 A | 1/1997 | Cairo, Jr. | |
| 5,697,732 A | 12/1997 | Sigmundstad | |
| 5,700,672 A | 12/1997 | Mathur | |
| 5,746,148 A | 5/1998 | Delago | |
| 5,749,676 A | 5/1998 | Head | |
| 5,778,981 A | 7/1998 | Head | |
| 5,875,848 A | 3/1999 | Wolff | |
| 6,004,385 A | 12/1999 | Birmingham | |
| 6,180,845 B1 | 1/2001 | Catallo | |
| 6,270,387 B1 | 8/2001 | Nesheim | |
| 6,280,998 B1 | 8/2001 | Mathur | |
| 6,364,940 B1 | 4/2002 | Prueter | |
| 6,415,877 B1 | 7/2002 | Fincher | |
| 6,446,323 B1 | 9/2002 | Metcalfe | |
| 6,474,252 B1 | 11/2002 | Delago | |
| 6,503,729 B1 | 1/2003 | Bult | |
| 6,554,324 B1 | 4/2003 | Herman | |
| 6,575,665 B2 | 6/2003 | Richter | |
| 6,648,081 B2 | 11/2003 | Fincher | |
| 6,672,803 B2 | 1/2004 | Richter | |
| 6,797,466 B1 | 9/2004 | Bult | |
| 6,806,081 B2 | 10/2004 | Shannon | |
| 6,840,322 B2 | 1/2005 | Haynes | |
| 6,843,448 B2 * | 1/2005 | Parmley | B64B 1/58 244/30 |
| 6,854,532 B2 | 2/2005 | Fincher | |
| 6,895,806 B2 | 5/2005 | Guesnon | |
| 6,925,954 B1 | 8/2005 | Van Acker, Jr. | |
| 6,990,917 B2 | 1/2006 | Boatman | |
| 7,077,603 B2 | 7/2006 | Fontaine | |
| 7,106,065 B1 | 9/2006 | Graf | |
| 7,141,370 B2 | 11/2006 | Hassibi | |
| 7,431,092 B2 | 10/2008 | Haheim | |
| 7,468,146 B2 | 12/2008 | Andriessen | |
| 7,494,810 B2 | 2/2009 | Kuhner | |
| 7,513,310 B2 | 4/2009 | Fossli | |
| 7,537,416 B2 | 5/2009 | Wetch | |
| 7,614,593 B2 | 11/2009 | McClure | |
| 7,950,463 B2 | 5/2011 | Fossli | |
| 7,955,482 B2 | 6/2011 | Nuzzio | |
| 7,967,070 B2 | 6/2011 | Reddy | |
| 8,001,784 B2 | 8/2011 | Marshall | |
| 8,048,309 B2 | 11/2011 | Osegovic | |
| 8,061,647 B1 * | 11/2011 | Powell | B64B 1/40 244/30 |
| 8,083,439 B2 | 12/2011 | Wetch | |
| 8,088,286 B2 | 1/2012 | Folkvang | |
| 8,157,205 B2 * | 4/2012 | McWhirk | B64B 1/02 244/30 |
| 8,256,538 B1 | 9/2012 | Deslierres | |
| 8,277,849 B2 | 10/2012 | Dillon | |
| 8,298,548 B2 | 10/2012 | Avila | |
| 8,314,209 B2 | 11/2012 | Rajamani | |
| 8,314,231 B2 | 11/2012 | Baures | |
| 8,349,587 B2 | 1/2013 | Fischer | |
| 8,448,709 B1 | 5/2013 | Tseytlin | |
| 8,474,536 B1 | 7/2013 | Tseytlin | |
| 8,476,051 B2 | 7/2013 | Ma | |
| 8,499,563 B2 | 8/2013 | Asturias | |
| 8,502,974 B2 | 8/2013 | Johnsen | |
| 8,557,249 B2 | 10/2013 | Brooks | |
| 8,597,926 B2 | 12/2013 | Lee | |
| 8,601,815 B2 | 12/2013 | Marshall | |
| 8,616,806 B2 | 12/2013 | Wetch | |
| 8,633,004 B1 | 1/2014 | Rapp | |
| 8,652,827 B2 | 2/2014 | Dadachova | |
| 8,657,013 B2 | 2/2014 | Kotrla | |
| 8,679,668 B2 | 3/2014 | Uebler | |
| 8,767,205 B2 | 7/2014 | Johnsen | |
| 8,785,174 B2 | 7/2014 | Ruiz | |
| 8,851,184 B2 | 10/2014 | Deslierres | |
| 8,863,845 B2 | 10/2014 | Gilmore | |
| 8,869,900 B2 | 10/2014 | Sawtell | |
| 8,926,219 B2 | 1/2015 | Andritsos | |
| 8,927,254 B2 | 1/2015 | Lipscomb | |
| 8,927,522 B2 | 1/2015 | Coragliotti | |
| 8,929,630 B2 | 1/2015 | Fu | |
| 8,932,652 B2 | 1/2015 | Dillon | |
| 8,960,303 B2 | 2/2015 | Gilmore | |
| 8,973,865 B2 * | 3/2015 | Schneider | B64B 1/58 244/128 |
| 9,005,554 B1 | 4/2015 | Herrmann | |
| 9,068,433 B2 | 6/2015 | Bushman | |
| 9,095,733 B2 | 8/2015 | Avila | |
| 9,205,040 B2 | 12/2015 | Brooks | |
| 9,267,115 B2 | 2/2016 | Lee | |
| 9,267,335 B2 | 2/2016 | Walker | |
| 9,322,763 B2 | 4/2016 | Papadimitriou | |
| 9,328,569 B2 | 5/2016 | Gilmore | |
| 9,359,870 B2 | 6/2016 | Takai | |
| 9,422,789 B2 | 8/2016 | Bushman | |
| 9,441,016 B2 | 9/2016 | Altermann | |
| 9,453,082 B2 | 9/2016 | Bavington | |
| 9,470,070 B2 | 10/2016 | Keinath | |
| 9,477,307 B2 | 10/2016 | Chizeck | |
| 9,493,547 B2 | 11/2016 | Baker | |
| 9,580,713 B2 | 2/2017 | Breaker | |
| 9,597,280 B2 | 3/2017 | Yaiser | |
| 9,668,966 B2 | 6/2017 | Brooks | |
| 9,670,395 B2 | 6/2017 | McDaniel | |
| 9,678,242 B2 | 6/2017 | Baxter | |
| 9,714,547 B2 | 7/2017 | Curtiss, III | |
| 9,718,523 B2 | 8/2017 | Tan | |
| 9,719,096 B2 | 8/2017 | Ruiz | |
| 9,725,770 B2 | 8/2017 | Andersen | |
| 9,753,542 B2 | 9/2017 | Chizeck | |
| 9,790,460 B2 | 10/2017 | Goetheer | |
| 9,856,035 B1 * | 1/2018 | Keller | F21S 41/657 |
| 9,896,890 B2 | 2/2018 | Gilmore | |
| 9,902,980 B2 | 2/2018 | Fischer | |
| 9,940,707 B2 | 4/2018 | Fu | |
| 9,944,914 B2 | 4/2018 | Suda | |
| 9,944,955 B1 | 4/2018 | Wang | |
| 9,968,885 B2 | 5/2018 | Daigle | |
| 9,976,124 B2 | 5/2018 | Lee | |
| 9,993,399 B2 | 6/2018 | Dillon | |
| 10,087,687 B2 | 10/2018 | Gilmore | |
| 10,100,633 B2 | 10/2018 | Clark | |
| 10,112,687 B2 | 10/2018 | Lambrakos | |
| 10,144,977 B2 | 12/2018 | Ollivier | |
| 10,160,522 B2 | 12/2018 | Lisland | |
| 10,226,869 B2 | 3/2019 | Chizeck | |
| 10,227,830 B2 | 3/2019 | Orban | |
| 10,231,907 B2 | 3/2019 | Avila | |
| 10,240,440 B2 | 3/2019 | Umphries | |
| 10,246,726 B2 | 4/2019 | Wang | |

(56) References Cited

U.S. PATENT DOCUMENTS

| | | | |
|---|---|---|---|
| 10,278,912 B2 | 5/2019 | Coragliotti | |
| 10,280,393 B2 | 5/2019 | Foustoukos | |
| 10,287,842 B2 | 5/2019 | Bieneman | |
| 10,314,895 B2 | 6/2019 | Altermann | |
| 10,415,028 B2 | 9/2019 | Voyer | |
| 10,494,596 B2 | 12/2019 | Deutzmann | |
| 10,589,829 B2 | 3/2020 | Tan | |
| 10,724,315 B2 | 7/2020 | Leuchtenberg | |
| 10,746,328 B2 | 8/2020 | Walker | |
| 10,787,871 B2 | 9/2020 | Fossli | |
| 10,801,045 B2 | 10/2020 | Fischer | |
| 10,895,666 B2 | 1/2021 | N'Guessan | |
| 2009/0078818 A1* | 3/2009 | Zulkowski | B64B 1/08 244/30 |
| 2009/0206697 A1 | 8/2009 | Marshall | |
| 2013/0259575 A1 | 10/2013 | Hoeier | |
| 2013/0294859 A1* | 11/2013 | Harrigan | B60P 7/06 410/100 |
| 2015/0120126 A1* | 4/2015 | So | G01C 21/34 701/26 |
| 2017/0283014 A1 | 10/2017 | Baker | |
| 2019/0116719 A1* | 4/2019 | Fletcher | B64C 39/024 |
| 2021/0054831 A1 | 2/2021 | Lowry | |
| 2022/0074285 A1 | 3/2022 | MacDougall | |

FOREIGN PATENT DOCUMENTS

| | | |
|---|---|---|
| CN | 207375999 U | 5/2018 |
| KR | 20150127897 A | 11/2015 |

OTHER PUBLICATIONS

MacDougall. "Atmospheric Greenhouse Gas Reduction Through Deep Ocean Carbon Sequestration "DOCS"." (Sep. 21, 2021). Entire Document.

PCT International Search Report and Written Opinion, International Application No. PCT/US21/49143 dated Feb. 4, 2022 (14 pages).

\* cited by examiner

Red Sea Hydrothermal Vent Fields

| No. | Name | Jurisdiction | °Latitude | °Longitude | Depth in m | Spreading mm/a |
|---|---|---|---|---|---|---|
| 4702 | Shaban Deep | Egypt | 26.2250 | 35.3500 | 1540 | 11.0 |
| 4703 | Kebrit Deep | Saudi Arabia | 24.7233 | 36.2767 | 1590 | 11.8 |
| 4704 | Nereus Deep | Disputed: Sudan/Egypt | 23.1670 | 37.2830 | 2400 | 13.2 |
| 4705 | Discovery Deep | Sudan | 21.2830 | 38.0500 | 2100 | 14.1 |
| 4706 | Atlantis II Deep | Sudan | 21.3417 | 38.0750 | 2200 | 14.1 |
| 4707 | Suakin Deep | Sudan | 19.6333 | 38.7333 | 2850 | 15.3 |
| 4708 | Red Sea Rift | Saudi Arabia | 17.9667 | 40.0667 | 1500 | 16.7 |

*Fig. 47*

Evaluation of Westerly Winds From the Red Sea

From: "PREVAILING WIND DIRECTION OBSERVED BY GAMEP MET 2016 A.D." Table 1-11

| Reporting Stations | JAN | FEB | MAR | APR | MAY | JUN | JUL | AUG | SEP | OCT | NOV | DEC | Weighted Avg * | Patent Ref. No. |
|---|---|---|---|---|---|---|---|---|---|---|---|---|---|---|
| Turaif | W | E | W | W | W | W | W | W | W | W | E | W | 10 | |
| Arar | W | W | NW | W | WNW | W | NW | NW | N | W | W | W | 9.5 | |
| Guriat | E | W | W | W | W | W | WNW | W | W | W | E | E | 9 | |
| Al-Jouf | W | E | NW | W | W | W | W | W | W | W | E | E | 8.5 | |
| Rafha | W | NW | WNW | NW | NNW | NW | NW | NW | NE | SE | SE | WNW | 5 | |
| Qaisumah | N | NNW | NNW | N | N | N | N | N | N | N | N | N | 1 | |
| Tabuk | NNE | E | E | NW | NW | NW | NW | NW | W | SSW | E | NW | 3 | |
| Hafr Elbatten | | | | | | | | | | | | | | |
| Hail | NNE | S | ENE | WSW | W | NNE | N | NNE | NNE | SSW | S | S | 2.5 | |
| Wejh | NNE | N | NW | WNW | NW | NW | W | WNW | NW | WNW | N | NNE | 6 | 2210 |
| Qassim | ENE | S | N | S | N | N | N | N | NNE | E | E | NE | 0 | |
| Dhahran | | | | | | | | | | | | | | |
| Dmmam-KFIA | NW | N | N | E | N | N | N | N | N | WNW | WNW | WNW | 3.5 | |
| Al-Ahsa | NNW | NNW | N | WSW | N | N | N | E | N | NNW | NNW | NNW | 3.5 | |
| Madinah | E | E | E | E | W | W | W | W | W | E | E | NE | 5 | |
| Riyadh-KKIA | SSE | N | SSE | S | N | N | N | NNE | NNE | N | SSE | SSE | 0 | |
| Riyadh Old | | | | | | | | | | | | | | |
| Yenba | W | W | W | W | W | W | W | W | W | W | W | W | 12 | 2211 |
| Jeddah-KAIA | N | ENE | N | WSW | W | W | W | W | WNW | W | W | N | 9 | 2212 |
| Makkah | SSW | S | SSW | S | N | N | NNW | S | S | SSW | WSW | S | 3 | |
| Taif | W | E | W | SSW | W | W | W | W | W | S | W | S | 8.5 | |
| Al-Baha | S | S | S | ESE | E | NNW | NW | NW | E | E | E | S | 1.5 | |
| Wadi Aldawas | ESE | ESE | E | ESE | E | ESE | E | E | ESE | ESE | ESE | E | 0 | |
| Bisha | W | E | W | S | S | E | N | N | E | ENE | E | NNE | 2 | |
| Abha | S | S | S | S | SSW | SSW | SSW | SSW | SSW | SSW | S | S | 3 | |
| Khamis Mushal | SSW | S | SSW | SSW | WSW | ENE | NNE | SSW | E | ENE | ENE | S | 3 | |
| Najran | E | E | E | E | E | ENE | NNE | ENE | E | E | E | E | 0 | |
| Sharorah | ENE | NE | ENE | ENE | ENE | NNE | NNE | SSW | NE | ENE | E | ENE | 0.5 | |
| Jizan | S | S | S | S | W | W | W | W | W | W | S | SSW | 7 | |

* Waited Average months for westerly winds, W or WNW or WSW =1, NW or NNW or SW or SSW =.5

*Fig. 48*

TRANSPORTATION SYSTEM FOR TRANSPORTING ORGANIC PAYLOADS

FIELD OF THE DISCLOSURE

The present disclosure relates to systems and methods for coalification and carbon sequestration using deep ocean hydrothermal borehole vents.

BACKGROUND

Weather systems are known. Issues related to the effects of atmospheric greenhouse gasses are known, and increasingly alarming. Various processes to produce coal are known.

SUMMARY

One aspect of the present disclosure relates to a system configured to coalify organic material using hydro pyrolysis powered by one or more hydrothermal borehole vents. The system may include one or more of a semisubmersible platform, a transfer sub-system, a hydrothermal oven, one or more pipes, and/or other components. The semisubmersible platform may be configured to be moored at a body of water, such as an ocean. The transfer sub-system may be configured to transfer the organic material from the semisubmersible platform into the hydrothermal oven. The hydrothermal oven may be configured to coalify the organic material in the hydrothermal oven using at least one of (i) hot water, (ii) steam, and (iii) supercritical water.

One aspect of the present disclosure relates to a system configured to transfer organic material from a surface of a body of water to a depth of at least 200 meters below the surface of the body of water, such as an ocean. The system may include one or more of a tube having a length of at least 200 meters between a top end and a bottom end, one or more floating mechanisms configured to provide buoyancy to the tube, and/or other components.

One aspect of the present disclosure relates to a method to coalify organic material using hydro pyrolysis powered by one or more hydrothermal borehole vents. The method may include drilling the one or more hydrothermal borehole vents on a floor of a body of water, such as an ocean. The method may include delivering the organic material to a location on a surface of the body of water, wherein the location is above and/or near the one or more hydrothermal borehole vents. The method may include transferring the organic material towards the one or more hydrothermal borehole vents such that at least one of (i) hot water, (ii) steam, and (iii) supercritical water provided by the one or more hydrothermal borehole vents coalifies the organic material through using hydro pyrolysis. The at least one of (i) hot water, (ii) steam, and (iii) supercritical water may have a temperature of at least 200° C.

One aspect of the present disclosure relates to a system configured to coalify organic material using hydro pyrolysis powered by hydrothermal borehole vents. The system may include one or more of a drill ship, a drill, a transfer sub-system, and/or other components. The drill ship may be configured to carry the drill. The drill may include a drill shaft and a drill bit. The transfer sub-system may be configured to transfer the organic material from the drill ship, through the drill shaft, into a hydrothermal borehole vent such that the organic material coalifies through hydro pyrolysis powered by the hydrothermal borehole vent.

As used herein, any association (or relation, or reflection, or indication, or correspondency) involving hydrothermal (borehole) vents, hydrothermal ovens, pipes, tubes, sea-silos, containers, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

As used herein, the term "coupled" does not require direct attachment, but allows for one or more intermediary components between the coupled elements. As used herein, the term "connected" may suggest a direct attachment, but need not require a direct attachment unless specifically stated.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 30A depicts the introduction of colder water to reduce the tendency of the water to boil as the pressure decreases during the waters rise toward the surface of the ocean. FIG. 30B is a cross-section of a reservoir that would be located above FIG. 30A configured to stabilize the steam pressure inside riser pipe 2902 at or near the pressure of the surrounding water at that depth.

FIG. 47 is a table of known hydrothermal fields in the Red Sea.

FIG. 48 is a table of the prevailing winds across Saudi Arabia in the year 2016.

FIG. 50C with the wind tunnel raised from the barge's hold with the spinnaker 2712 still furled around the wind tunnel 2800.

DETAILED DESCRIPTION

Figure 1:
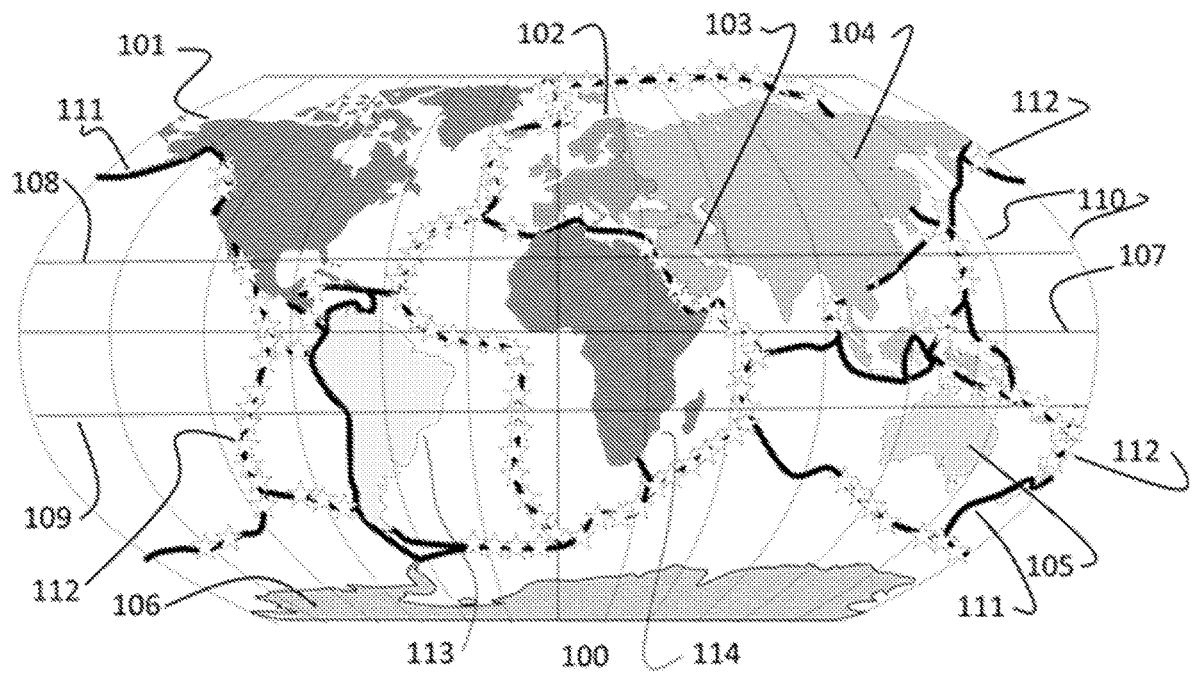
FIG. 1—A map of the Earth 100 with the general location of the continents, major fault lines 111, and areas where hydrothermal vents fields 112 have been discovered.

The devices, systems, and methods described herein address the problem of an excess concentration of greenhouse gasses in the atmosphere, which is a side effect that occurred when the world industrialized and started consuming large quantities of fossil fuel (coal, oil, and gas) that stored carbon for millions of years that now has formed atmospheric greenhouse gasses. It is generally accepted that the release of greenhouse gasses has caused the earth to warm and is a major concern of most nations and the scientists who have studied the present situation. Prior to the industrial revolution, wood was used to warm the fires in homes, and charcoal made from wood was used when high temperatures were needed including the processing of pottery in early pottery kilns, then bronze during the Bronze Age, and iron during the Iron Age. The use of wood as a fuel is carbon neutral since the wood gets carbon from the air through photosynthesis. The most prevalent greenhouse gas is carbon dioxide ($CO_2$) with methane ($CH_4$) in second place.

$CO_2$ is a fertilizer for trees and other plants that take in the $CO_2$ through photosynthesis, release oxygen, and store the carbon as organic matter in the plant. When the plants die and decompose, the microbes that consume the plants release $CO_2$ back into the air. Coal seams that are being mined today were formed though the compacting of organic matter. Microbes that consume organic matter and release the $CO_2$ back into the atmosphere did not exist or were not as prevalent, thereby allowing much of the dead organic matter to be processed through coalification.

By way of non-limiting example, some of this disclosure includes methods of achieving coalification of large quantities of organic matter including using the volcanic energy near hydrothermal vent fields to quickly decompose organic matter through hydro pyrolysis. The water near the bottom of the ocean is cold, typically less than 2° C., and oxygen deprived due to oxygens affinity to the warmer water nearer to the ocean's surface.

From a sizing standpoint, worldwide the amount of organic matter that would be needed to offset the consumption of fossil fuel is about 900 times the consumption rate of the Benson Sawmill operating in San Diego Calif. from 1906 to 1941.

The focus of this disclosure is to cause organic matter to decompose without generating $CO_2$. It is similar to the process used for "coaling" where wood is stacked, and burned in a low oxygen environment to breakdown the wood's fibers and make charcoal as has been done by mankind for thousands of years.

While any organic material (vegetable or animal) can be used for this process, one area of focus is on trees due their abundance and ease of manipulating large quantities of carbon. The Trillion Tree planting effort worldwide will help but if the trees go through their normal life cycle, the sequestering of carbon will only be for a few hundred years if the trees are allowed to decay naturally. If the trees and other organic matter go through coalification, with the carbon stored at the bottom of the ocean, the carbon could be stored for a few hundred thousand years and the trees that are removed for coalification can be replaced with new trees that through photosynthesis will remove more carbon dioxide from the air.

Municipal dumps are a significant source of greenhouse gasses, particularly methane, from the decay of vegetable and animal organic matter. If the same material were processed through coalification, the associated air pollution would be abated as would the world's greenhouse gas problem. In intensely populated cities, the methods described herein may be less expensive than using landfills.

In most carbon capture and storage efforts, the emphasis has been on capturing and storing carbon dioxide $CO_2$, not carbon. In the effort described here, the capturing of the carbon (not $CO_2$) is accomplished by vegetation through photosynthesis. Virtually all organic matter cycles carbon between storage in organic matter and atmospheric carbon dioxide. Through photosynthesis, plants absorb $CO_2$, use the carbon to increase their size and mass, and release the oxygen into the air. Plants are at the bottom of the food chain for animals and the carbon from the plants builds animal bodies also. When the plants and animals die, they are consumed by microbes or fire both of which release the carbon back into the atmosphere as $CO_2$. Every spring the atmospheric $CO_2$ level starts to drop due to budding vegetation and every fall the $CO_2$ level in the atmosphere increases due to an increase in rotting organic matter.

Nature's annual atmospheric $CO_2$ flux is far greater than the annual increase in anthropogenic atmospheric $CO_2$. It is cyclic and 180° out of phase between the northern and southern hemisphere with the northern hemisphere, which has about twice as much land area, dominating the cycle. Nature's $CO_2$ emissions flux could be slowed down. Organic matter that holds the carbon for minutes to centuries can be turned into charcoal or char and stored in the Earth's soil or on the bottom of the ocean where eventually it could form a coal seam resulting in less atmospheric $CO_2$ being released.

If all the world's anthropogenic garbage could be processed through systems and methods as described herein, it would make a small dent in the atmospheric $CO_2$ level. If half the world's dead trees could be processed, the Earth would be carbon negative with atmospheric $CO_2$ levels dropping without decreasing anthropogenic $CO_2$ emissions.

Hydrothermal vents driven by volcanic energy are a naturally occurring phenomenon that occurs throughout the world. They are concentrated along the mid-ocean ridges where the Earth's tectonic plates collide, divide, or slide past each other. The water that boils out of the vents seeps into the earth perhaps hundreds of miles from the vent. From a processing standpoint, the lack of control of the energy released by naturally occurring hydrothermal vents makes it difficult to harness the energy for useful purposes.

Figure 2:
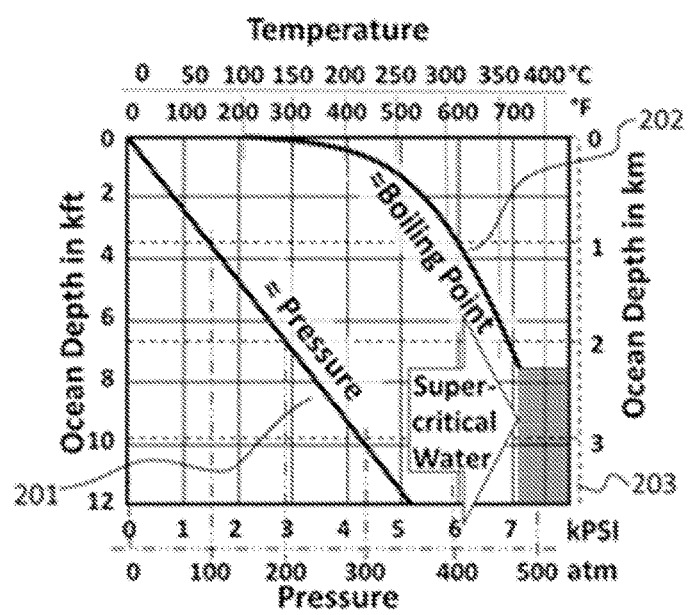
FIG. 2—A chart 200 showing approximate variations in pressure 201 and water boiling point 203 associated with changes in depth 201. There is a difference between fresh water and salt water pressures and boiling point curves due to the higher density of salt water and compression of water at great depths. Water can achieve the supercritical state 203 at great depths and higher temperatures.

This disclosure describes the construction of manmade hydrothermal vents (also referred to as hydrothermal borehole vents), methods of storing the energy extracted from these hydrothermal vents for later use, and applications for the stored energy. The basic premise for this is depicted in FIG. 2 where the relationship between the depth of the oceans' water, the pressure at that depth 2501, and the boiling point of water at that depth 2502 and the supercritical water area 2503 are plotted. One of the concepts described herein is to move organic matter to a place where it can be broken down without the emission of $CO_2$ into the atmosphere and storing the resultant carbon where it can remain for eons.

A hydrothermal vent field 500 m (2000 feet) below the ocean's surface would support quick decomposition through hydro pyrolysis. Due to the water pressure, these fields have a water boiling point that will convert the organic matter to carbon through hydro pyrolysis in seconds to hours. The energy needed to accomplish this is stored in the 1200° C. magma chambers below the hydrothermal vent fields. The oceans' bottom away from the hydrothermal vent fields is an ideal place to store the carbon for eons.

Mid Ocean Ridges

FIG. 1 is a plot of the Earth showing the continents of North America 101, South America 113, Europe 102, Africa 114, Asia 104, Australia 105, Antarctica 106, as well as the Middle East 103 which is part of the Asian continent. In FIG. 1 the globe is divided by longitude lines every 30° with zero being in the middle, positive longitude lines on the right (East) and negative on the left (West). The Equator 107, the Tropic of Cancer 108 and the Tropic of Capricorn 109 are included.

The movement of the Earth's tectonic plates the continents ride upon creates two types of faults 111 in the Earth's 100 crust. There are subduction zones where one tectonic plate is sliding under another and faults where the tectonic plates are pulling apart. In FIG. 1, areas where spreading faults 112 have been identified by the star symbol. Mid Ocean Ridges have formed across the planet and are interconnected making them the longest mountain range in the world at just under 80,000 km (50,000 miles).

Submarine Hydrothermal Vents Fields

When the tectonic plates spread apart, magma from the core of the Earth comes up and fills the cracks between the continental plates. Natural hydrothermal vents form when water below the sea floor is heated to the boiling point or the supercritical water state. The temperature of the water below the vent is heated until it boils which occurs at different temperatures at different depths and near the temperatures indicated by curve 202 of FIG. 2. The increase in boiling temperature 202 with depth 201 is caused by the increase in pressure 201 with depth. It is a super pressure cooker reaching temperatures above 400° C. (750° F.) heated from energy released by the 1200° C. magma chambers below natural vents.

Suitable Organic Materials

Figure 3:
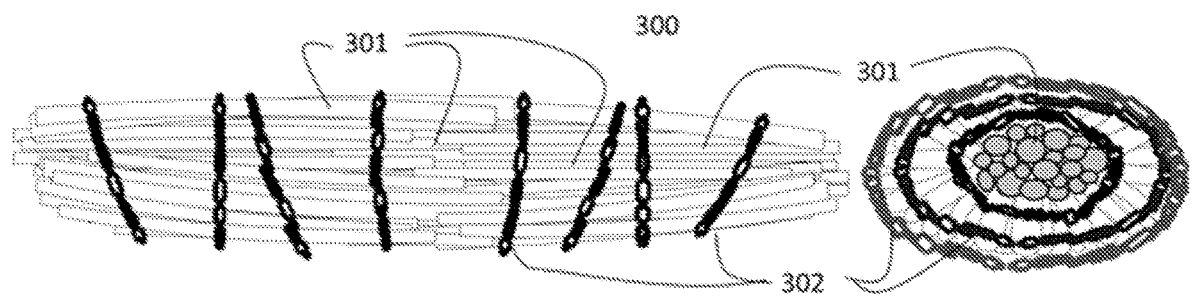
FIG. 3—Seaworthy log raft 300 similar to the one hundred and twenty log rafts supplied from Oregon's Columbia River to the Benson sawmill in San Diego between years 1906 and 1941. The larger rafts contained the carbon equivalent of 15.8M Ton of atmospheric $CO_2$ that would be released to the atmosphere if the logs were allowed to degrade naturally over time on the Earth's surface rather than go through the coalification process as described herein.
Figure 4:
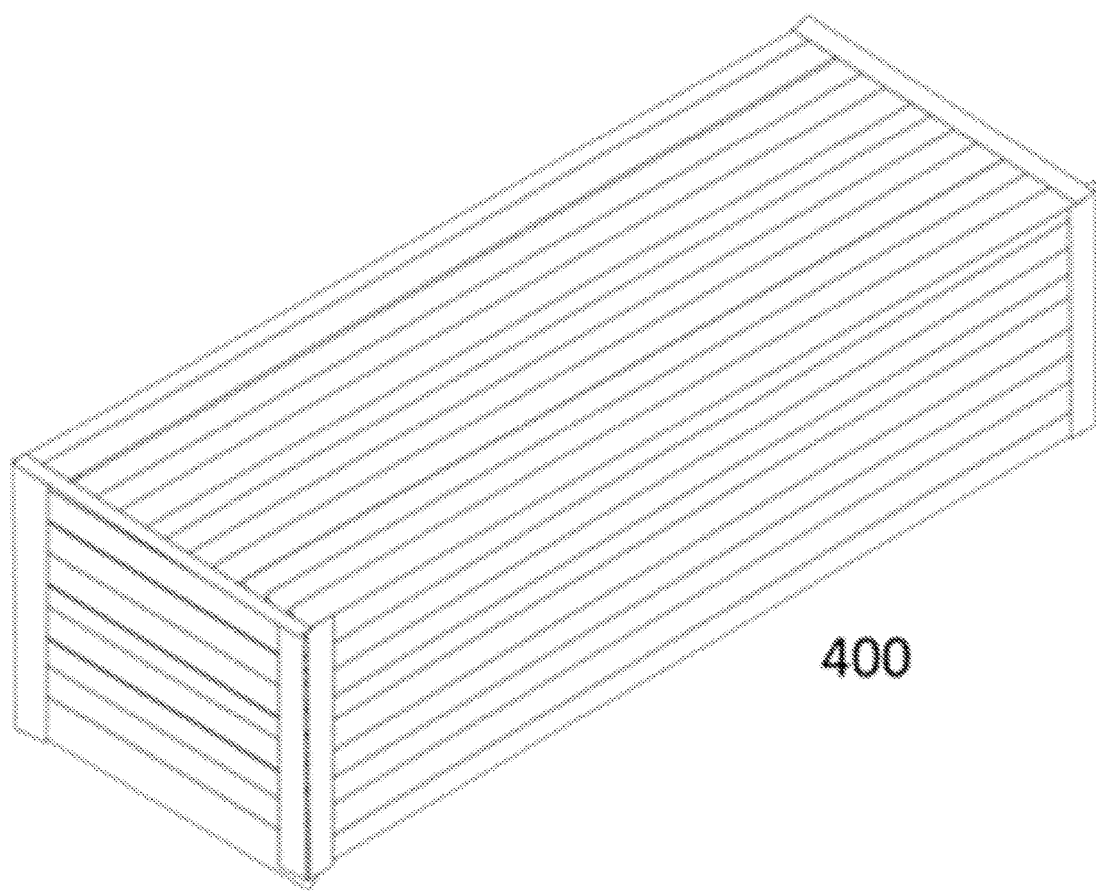
FIG. 4—A disposable organic matter container 400 made from wood or other organic matter and configured to hold miscellaneous organic matter for the purpose of carbonization of the container and contents.
Figure 5:
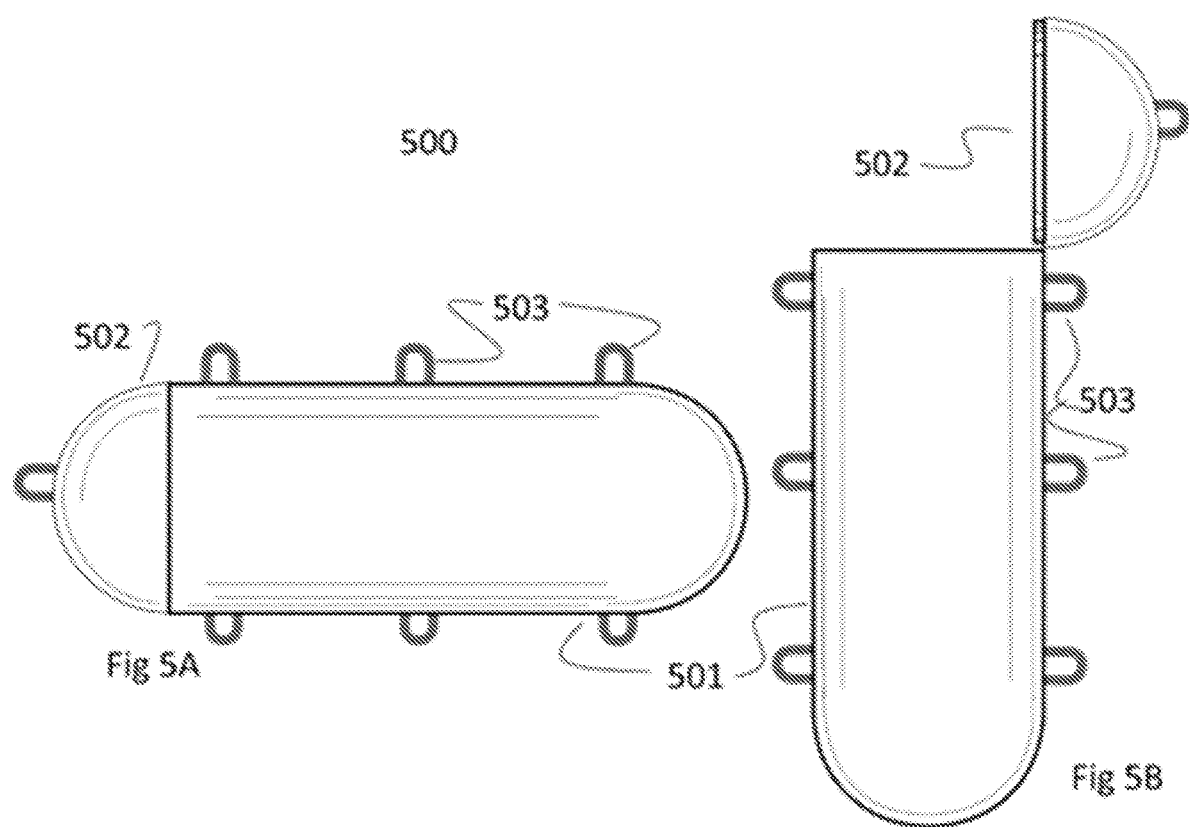
FIGS. 5A-5B illustrate a recoverable, reusable organic matter container 500 configured to sit in the area of a hydrothermal vent until the organic matter has been carbonized after which the remains can be retrieved along with the container or left on the bottom of the ocean when the container is retrieved.

Almost any organic material is suitable for the process described herein. If a way to get the organic matter to the processing centers can be found, coalification of the organic matter can take place. A primary focus for materials for coalification in the effort is trees and log rafts 300 (or bamboo rafts) of FIG. 3. Log rafts 300 with thousands of logs have been built where one raft processed into coal will sequester carbon equal to about 10 hours of worldwide $CO_2$ emissions.

There are other organic materials that accumulates like fallen leaves, yard trimmings, or food waste. There is also industrial waste, material from deconstruction sites, and worn out car tires that could be processed. Some of the materials processed may use significantly higher decomposition temperatures than wood and will need to be taken to appropriate coalification site that can reach the higher temperatures needed for proper decomposition. Specific containers like, by way of non-limiting example, the containers of FIG. 4, FIGS. 5A-5B, and FIG. 42 may be needed to process some organic materials.

Figure 14:
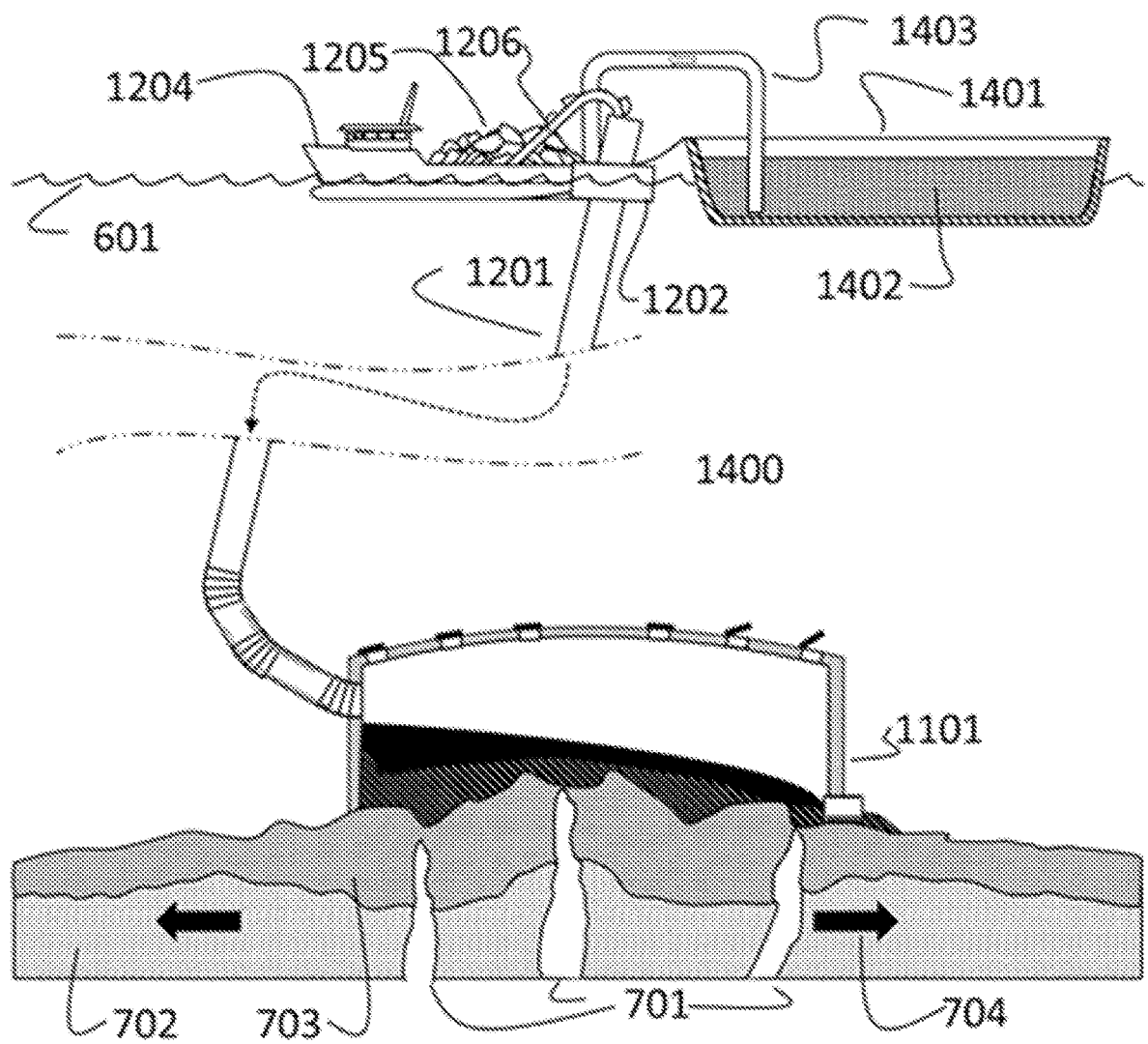
FIG. 14—A system where the flow of organic matter is directly into a high temperature oven on a fast spreading ocean ridge.
Figure 15:
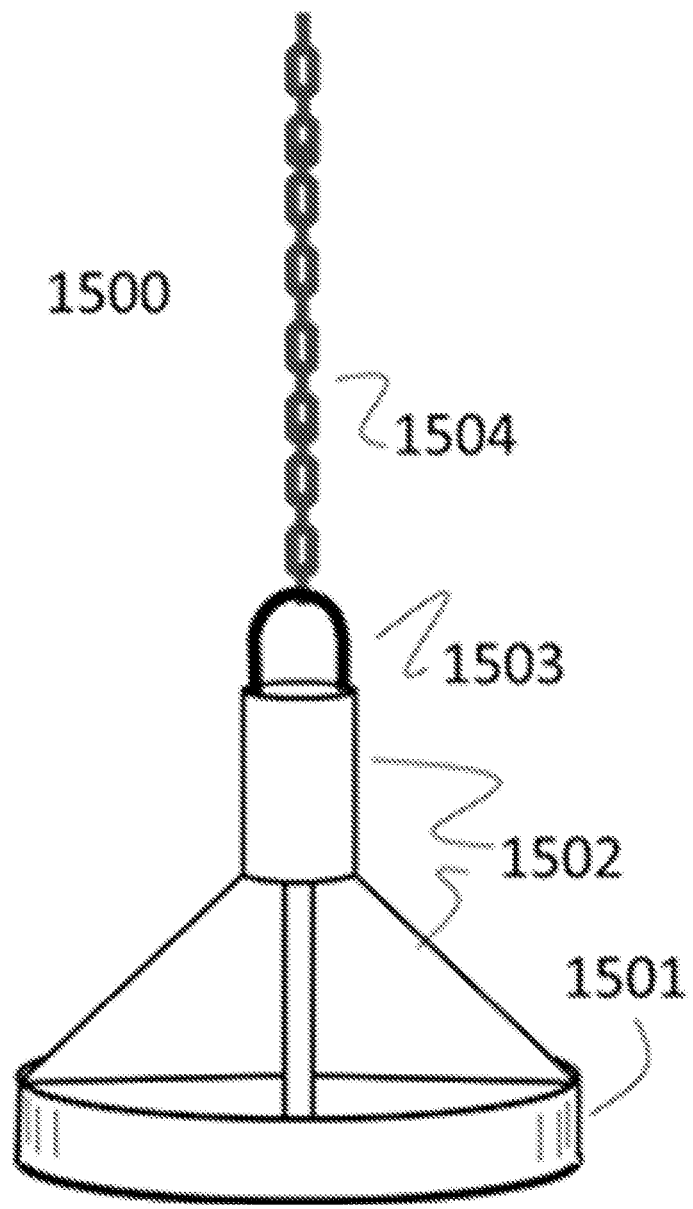
FIG. 15—A weight for compressing carbon after coalification into more dense forms of coal.

FIG. 14 illustrates a way of handling waste of specific concern. Solid municipal waste 1205 is being moved from the boat 1204 into the sea silo 1201 via the conveyer 1206. The conveyer 1206 also has a fluid capability where seawater and other fluids can be pumped into the sea silo 1201. Barge 1401 shown in cross-section contains sewer sludge 1402 that is being sucked into boat 1204 through tube 1403 and pumped into sea silo 1201. Organic matter that is difficult to breakdown will be held in oven 1100 long enough for the degradation to occur.

The term "plastics" includes materials composed of various elements such as carbon, hydrogen, oxygen, nitrogen, chlorine, and sulfur (C, H, O, N, Cl & S). Many plastics can be broken down at the temperatures that can be achieved at the submarine hydrothermal operation described herein.

Municipal waste could include hazardous chemicals that can be broken down at the correct vent water temperature if held for the proper time. For loads of organic matter that are or might have problems, control of the material is important and can be accomplished with a system like that shown in FIG. 14.

The controls on the system can be set up so that the material 1205 or material 1402 of concern is held in the oven 1100 at a temperature and for a time period that will assure the materials proper decomposition and avoids side effects.

For some materials to be processed through hydrothermal vent coalification the retrieval of the end product may be desirable. For such applications, the retrievable container similar to the examples shown in FIG. 5A-5B would be needed. FIG. 5B where the lid 502 is open may be normal for loading the container on land. When on a hydrothermal vent field (as depicted in FIG. 5B), the coalification will take place and the lifting eyes 503 will allow container 500 to be retrieved with or without the remains of the original content.

Waterlogging Organic Material

Figure 6:
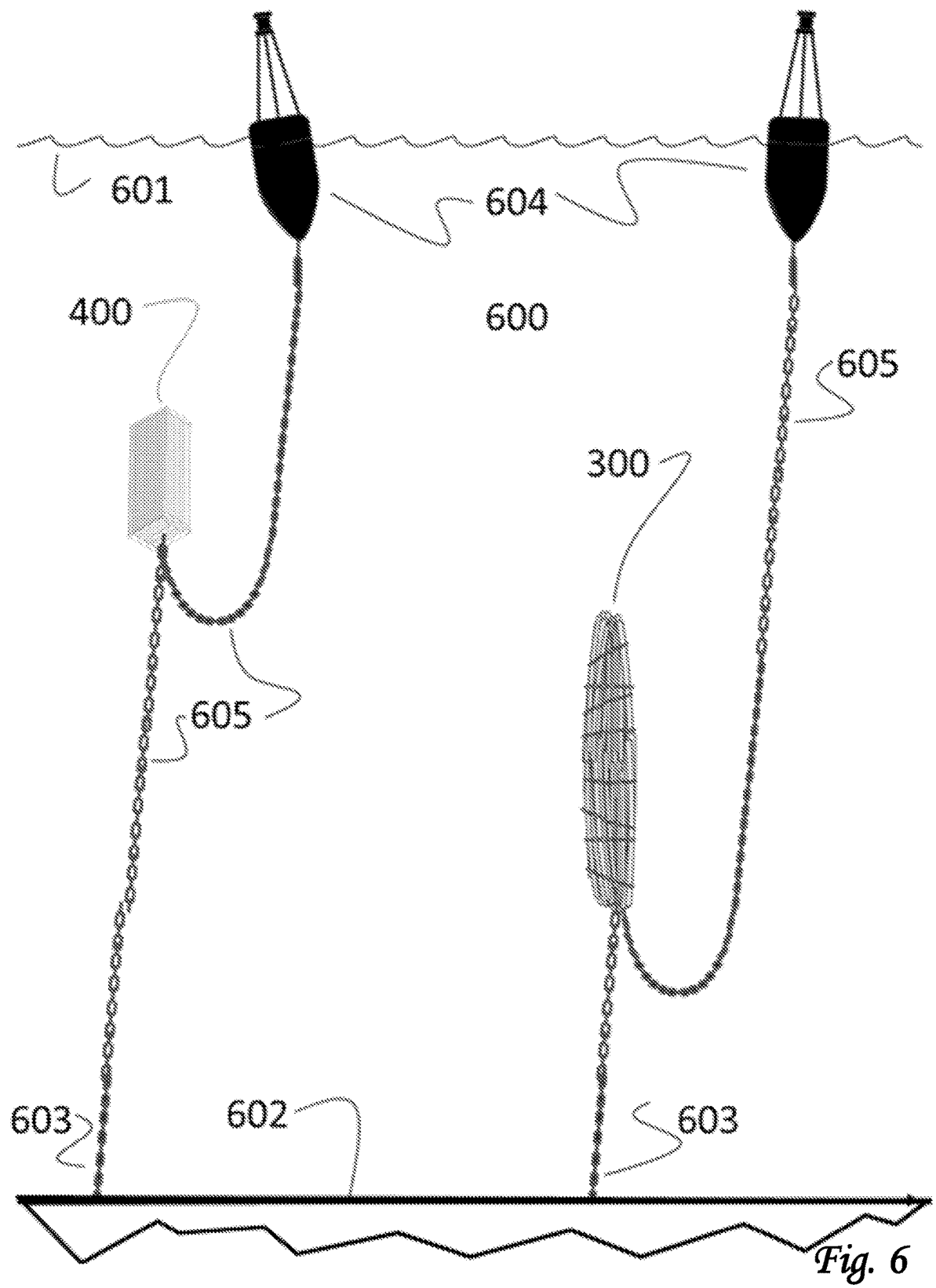
FIG. 6—A mechanism 600 for waterlogging organic matter before being moved to a deep ocean hydrothermal vent field.
Figure 7:
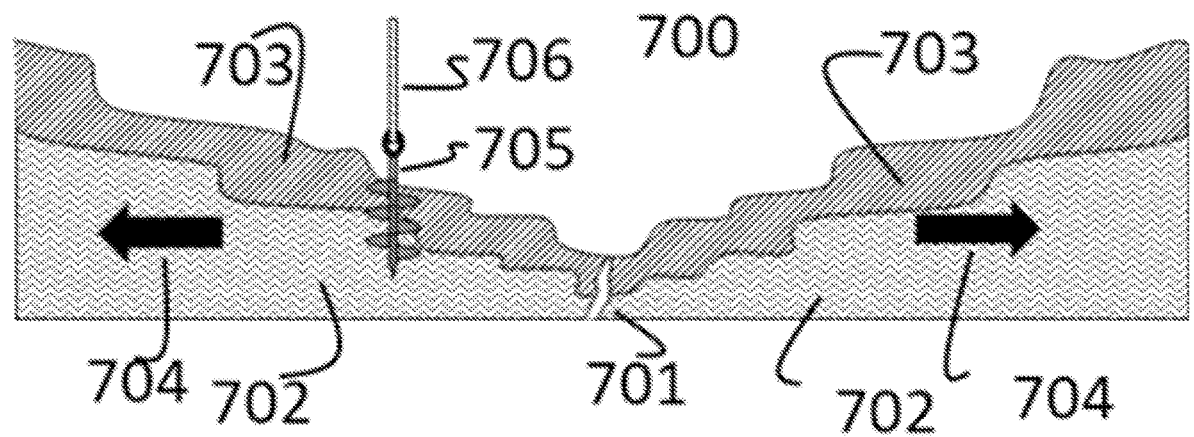
FIG. 7—A cross-section of a slow spreading hydrothermal vent ridge 700 typical of the ridges in the North Atlantic Ocean. A mooring 705 has been inserted into the ocean bottom with a cable 706 running up to a buoy floating above the hydrothermal vent field normally near the surface of the ocean.
Figure 8:
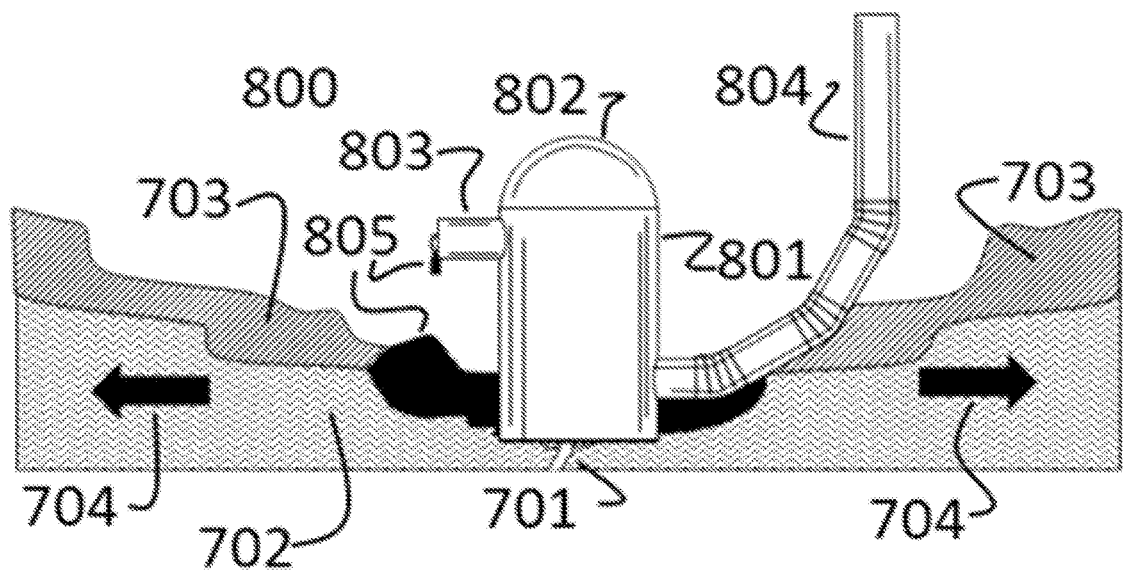
FIG. 8—A high temperature) oven 800 sitting on top of a hydrothermal vent.

In order to get the material to the hydrothermal vent field for coalification, the material or the material plus the container must sink. Waterlogging is probably the easiest way to get material like wood or bamboo to sink. FIG. 6 shows two waterlogging setups 600, one with disposable container 400 of FIG. 4 and one with log raft 300 (also depicted in FIG. 3). In this system, moorings 603 are placed in the sea floor 602 and chain or line is connected to the package being waterlogged, i.e., cargo container 400 or log raft 300. The mooring line or chain is also connected to a buoy 604 on the water's surface 601. Changing the pressure on the items being waterlogged will allow the water to penetrate the cell walls and the gas in the cells to escape more easily. The tides in the open ocean are relatively small, about 2 feet compared to the tides near shore which are often greater than 6 foot and can reach 43 foot in the Bay of Fundy. Waterlogging is likely to occur faster near shore due to the increased tides and associated pressure variation on the material being waterlogged. If waterlogging were deemed not practical, a heavy container 500 can be used to move the organic material to the hydrothermal vent area. In some implementations, getting the material to sink sooner could include adding rocks or other dense matter to a log raft 300 or a containers 400-500. In some implementations, a raft may include holds for other organic material.

Moving Material to Coalification Centers

Figure 24:
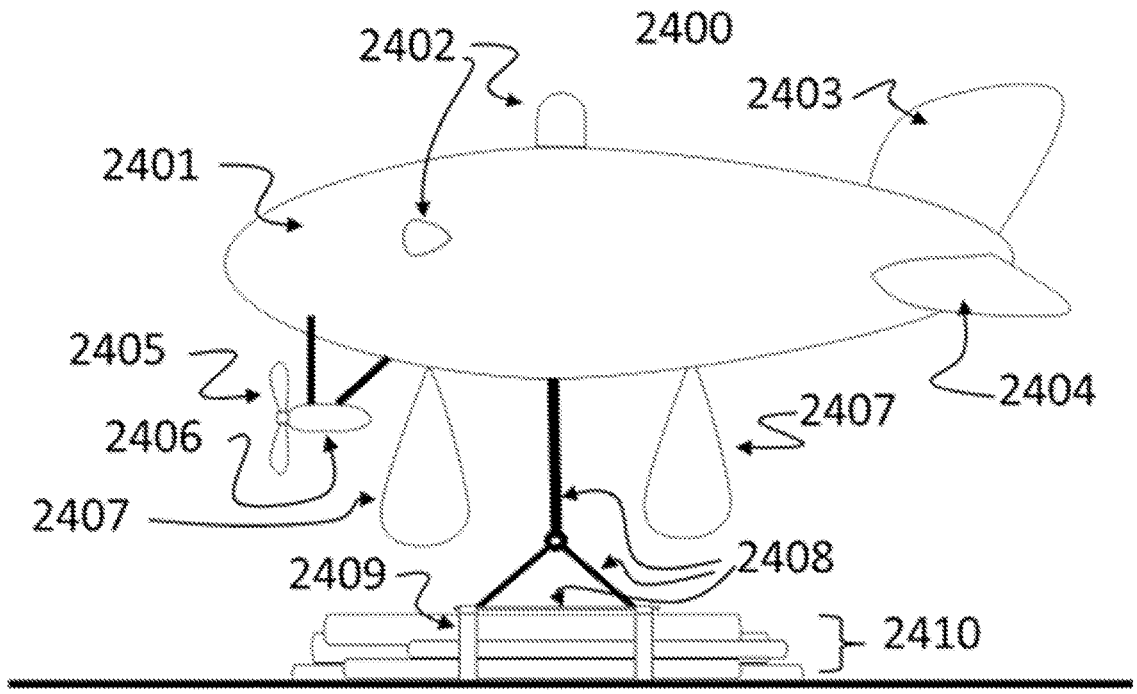
FIG. 24—A blimp configured to transport forest wood and litter from roadless areas to a river or road that can move the organic matter to the ocean and hydrothermal vent fields.

A primary source of organic material will be the world's forests. Many of the forests have large areas that are roadless and difficult to reach. FIG. 24 illustrates a configuration 2400 which includes a remotely piloted blimp 2401 with navigation lights 2402, a rudder 2403, ailerons 2404, a motor 2406 mounted to the blimp, propeller 2405, and/or other components. In some implementations, the blimp may have two water bags 2407 attached to it as well as a harness 2408 that includes logging straps 2409 that are tied around logs 2410 and other organic matter that needs to be transported out of a roadless or difficult to reach area to a river or road where the organic matter can be moved to the ocean and eventually to a coalification operation over a hydrothermal vent field.

In configuration 2400 the water bags 2407 are full and will be emptied to lessen the weight and allow the blimp to lift the logs and other organic matter 2410 off the ground. The blimp 2401 and logs and organic matter 2410 will be moved to the ocean or a river leading to the ocean, or a road where the logs and organic matter can be transported to the ocean. When the blimp and organic reach the transfer point, the water bags 2407 will be refilled and the logs and organic matter 2410 will be released. The blimp will head back to the roadless forested area and pick up another load.

Figure 25:
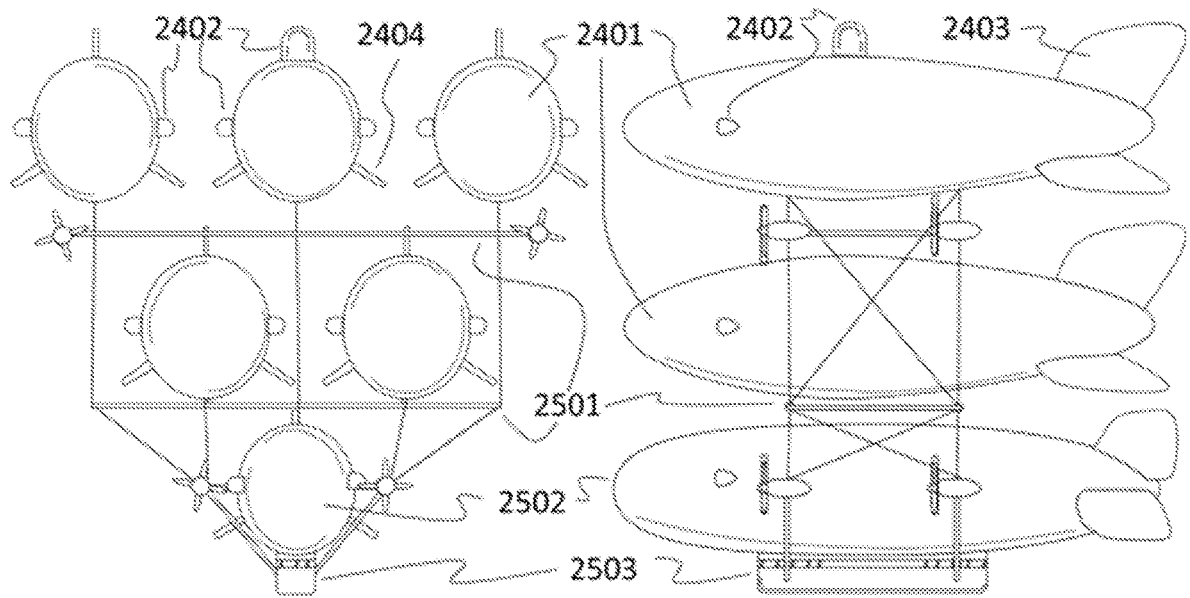
FIG. 25—A heavy lift blimp configuration with 6 smaller blimps in a frame with a piloted or unpiloted control blimp with an internal water ballast storage capacity.

Protecting blimps from storm damage may rely on hangars. Heavy lift blimps are of greater concern due to the size of the blimps and the availability of safe places to keep them in a storm. FIG. 25 illustrates a heavy lift configuration including multiple smaller blimps. In this configuration, blimp 2502 has a gondola 2503 with room for pilots and crew as well as a water ballast. It also has a frame 2501 configured to hold five of blimps 2401 similar to those used in configuration 2400.

In some implementations, the blimp may be an unmanned remotely operated or autonomous air vehicle operating in remote areas and at low altitudes. Moving a waterlogged log raft 300, a disposable container 400, or a reusable container 500 to the ocean from the shore or a river emptying into the ocean, to a coalification operation can be accomplished with ships and tub boats.

Moving the organic material from the oceans' surface down to the processing area which could be a mile or more below the surface of the ocean may need guidance. One way to accomplishing this is with guidance from surface ships maintaining a hold on the log raft as it sinks toward the targeted point on the oceans bottom using a mooring cable 706. A mooring 705 or anchor can be placed in the hydrothermal vent field with the mooring line 706 or anchor line used to control the position of log rafts and containers as they descend to the hydrothermal vent field. When the load attached to cable 706 for coalification is not to be retrieved in the near future, the connection to the cable may be accomplished with a fastener that will degrade and disintegrate over time or otherwise release once the load is in or near the desired position.

In some cases, it may be easier to use underwater unmanned vehicles either remotely piloted or operating autonomously to guide the material down to the vent field. Manned underwater vehicles could be used to guide the load to the hydrothermal vent field but that type of equipment may be expensive and cumbersome when attempting to work at some of the depths under consideration.

Sea Silos

Figure 12:
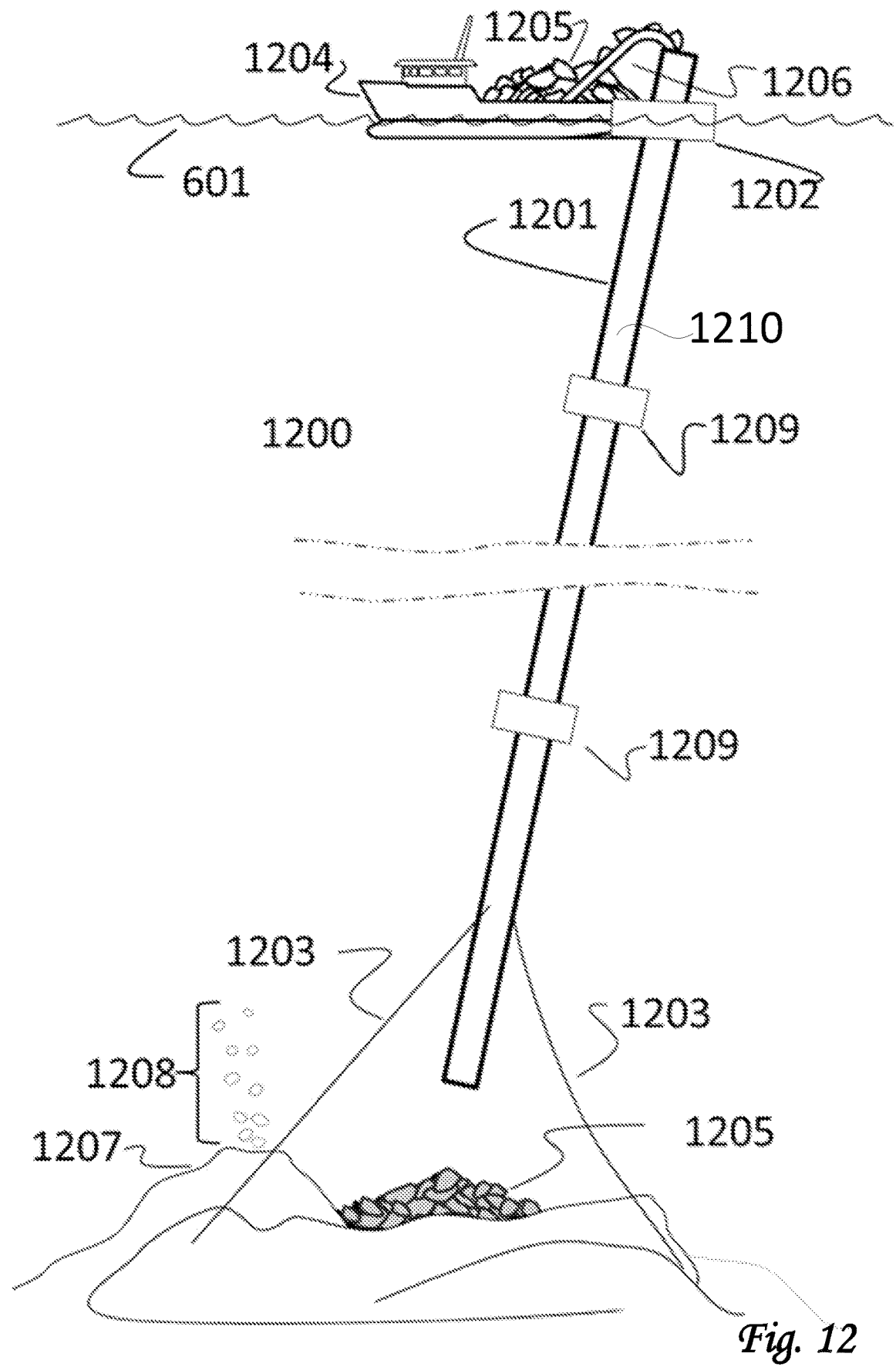
FIG. 12—A small sea silo 1201 being filled by a boat having a conveyer 1206 to move waterlogged organic matter 1205 into the silo with the conveyer having plumbing for water or fluid organic matter to be pumped into the silo or to assist in moving the organic matter 1205 thorough the silo and down to the hydrothermal vent field 1207.

FIG. 12 depicts a sea silo system 1200 that includes a sea silo 1201 (which includes a tube 1210 having a length of at least 200 meter between a top end and a bottom end), one or more floating mechanisms (e.g., float 1202, floats 1209, boat 1204, and/or other components configured to provide buoyancy to tube 1210), and/or other components. Tube 1210 is configured to extend from above the surface of the body of water (e.g., sea level 601) to a depth of at least 200 meters (or, in some cases, at least 500 meters) below the surface. Sea silos 1201 (in FIG. 12) and 1301 (in FIG. 13) may be configured to move organic matter down to the ocean floor. The lower parts of the silos are typically held over the hydrothermal vent fields or other desirable areas, e.g., with guys 1203 that connect the silos 1201 and 1301 to moorings 705. The top of the silo 1201 is held above sea level 601 by a float 1202 along with flotation support from floats 1209. The boat 1204, perhaps a municipal garbage barge, may offload its cargo, including organic matter 1205, into the top of silo 1201 using a conveyor 1206 that is fitted with water pipe used to pump water or fluid organic matter into the top of the silo 1201 to encourage the flow of the organic matter 1205 from the boat 1204 down the silo to the hydrothermal vent field near vent 1207 with its emission of boiling water 1208 generated by contact with the magma in the Earth's core below the vent. When the sea silos are moved to the vent sites, it will usually be done in sections with the sections being assembled while horizontal on the surface of the ocean 601. Following assembly some of the flotation or buoyancy will be removed allowing one end of the silo to sink. The floats 1209 will be arranged down the silo to minimize the stresses in the silo during the assembly process as well as the stresses associated with normal operation. In some implementations, one or more of the floating mechanisms may be controllable such that the buoyancy can change, e.g., as controlled by a user. In some implementations, tube 1210 may have a diameter ranging between 1 and 3 feet, or between 2 and 4 feet.

Figure 13:
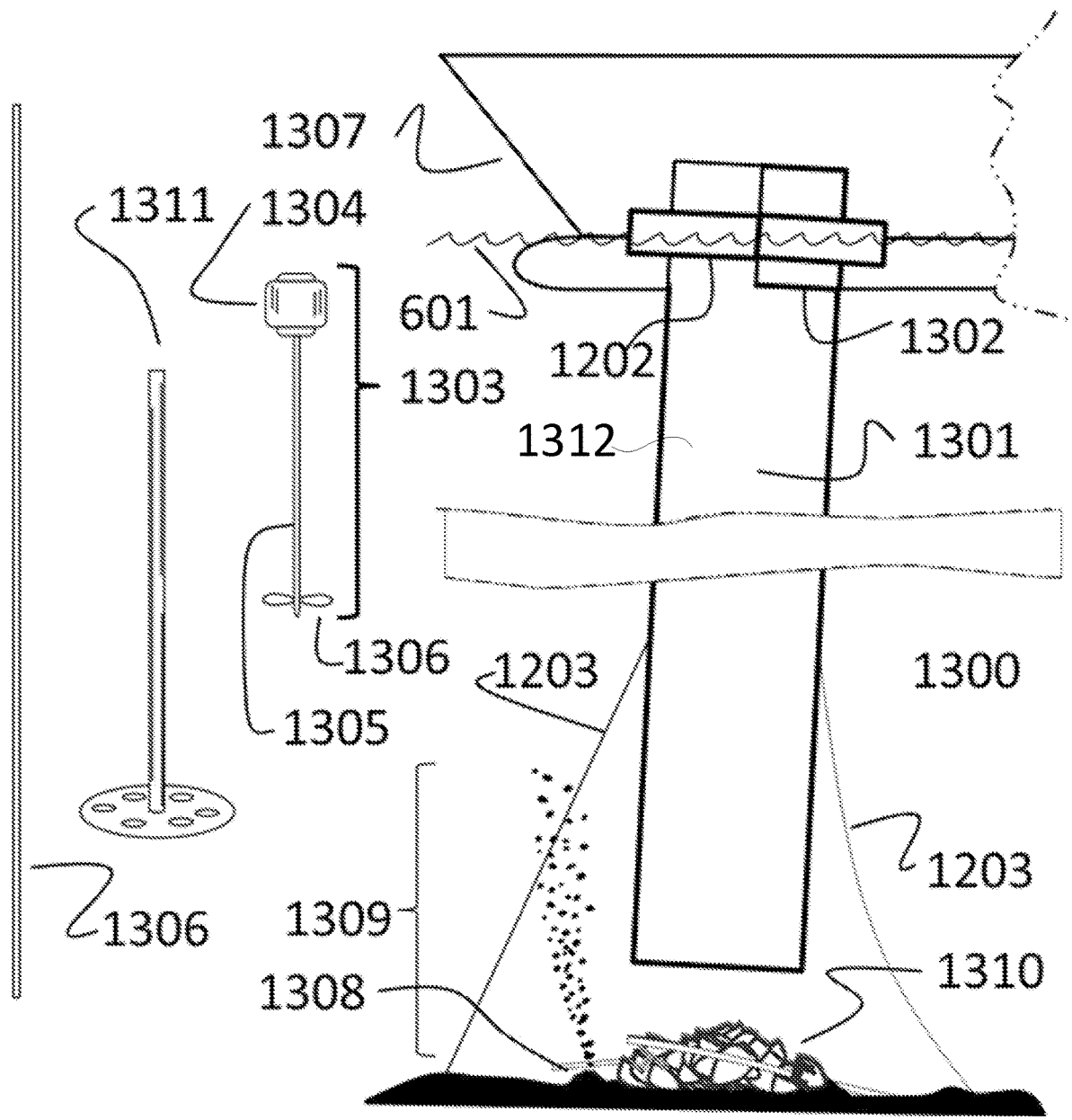
FIG. 13—Large sea silo with surface level entrance 1302 to accommodate floating organic matter like log rafts or bamboo rafts. The silo is capable of holding a large amount of organic matter while it is becoming waterlogged.

FIG. 13 depicts a sea silo system 1300 that includes a sea silo 1301 (which includes a tube 1312 having a length of at least 200 meter between a top end and a bottom end). Sea silo 1301 is a larger version of sea silo 1201. Sea silo system 1300 may include a float 1202 to keep the top above sea level 601 and guys 1203 between sea silo 1301 and a mooring 705 in the vent field near the vent 1308 with its boiling emissions 1309. Sea silo system 1300 may include a door 1302 at the top of sea silo 1301. This door opens to allow material to be hauled into sea silo 1301 that is floating at sea level 601. Next to sea silo 1301 is a cargo ship 1307 (partially shown in FIG. 13) that will be loading organic matter into the top of sea silo 1301. The organic matter 1310 has been waterlogged and is on the hydrothermal vent field in various stages of coalification. The organic matter loaded into sea silo 1301 may not be completely waterlogged. Tools like pusher 1311 and rod 1306 may be used to manipulate the floaters and get them out of the way of the sinkers. Also, impellers 1303 may be used to move the water in the sea silo. Motor 1304 will normally be above the water and connected to the propeller 1306 through shaft 1305. In some implementations, sea silo system 1200 or sea silo system 1300 may include a pressure generator configured to generate pressure that forces the organic material from the top end (of tube 1210 or tube 1312) towards and out of the bottom end of the tube. In some implementations, the pressure generator may include one or more of a pusher (e.g., pusher 1311), a rod (e.g., rod 1306, an impeller (e.g., impellers 1303), a motor (e.g., motor 1304), and/or other components. In some implementations, tube 1312 may have a diameter ranging between 20 and 40 feet, between 30 and 60 feet, about 50 feet, about 100 feet, and/or other dimensions.

The sea silos in configuration 1600 are mounted on the sea floor with multiple silos 1601 held in a group with supports 1602 and a floating deck 1605. The sea silos 1601 are held in place with guys 1203 that are connected to moorings 705. The organic material will enter through the top of one of the silos and start its journey through waterlogging and sinking down to the bottom of the silo. There the conditions including the heat from the hydrothermal vent will cause the organic matter to go through coalification. At the bottom of the silo the organic material going through coalification will build up. The mid ocean ridges where the hydrothermal vent fields are found are underwater mountains with a lot of relatively steep cliffs. If such a location is used for the sea silos, it might be centuries before the silos need to be moved. If the silos need to be moved for any reason including the buildup of carbonized material at its base, the floating deck 1605 and stress relieving floats 1203 can have the buoyancy to lift all five silos 1601 off the sea bottom by several hundred feet allowing the sea silos and associated equipment to be moved to a new location.

In some implementations, sea silos 1201-1301-1601 may be used in conjunction with hydrothermal vent thermal reflectors 900 to increase the rate of coalification of the incoming organic material. In some situations, the thermal reflectors 900 may be attached to the sea silos 1201-1301-1601.

Hydrothermal Vent Ovens

The deep sea hydrothermal vent ovens 800-1100-1400-1900-2100-2200 (shown in different figures) are set up directly over hydrothermal vents where the organic material is controlled through the coalification process and spends time in the hottest part of the chosen hydrothermal vent field. This may be a more expensive process than moving rafts of logs down to the bottom of the ocean and letting them go through coalification over time, with some organic matter taking many years. Some of the hydrothermal vent ovens will be subjected to destructive volcanic activity since they are directly over the vents, and this may have a negative effect on the useful lifetime of a hydrothermal vent oven, vent covers, and/or other components.

Figure 17:
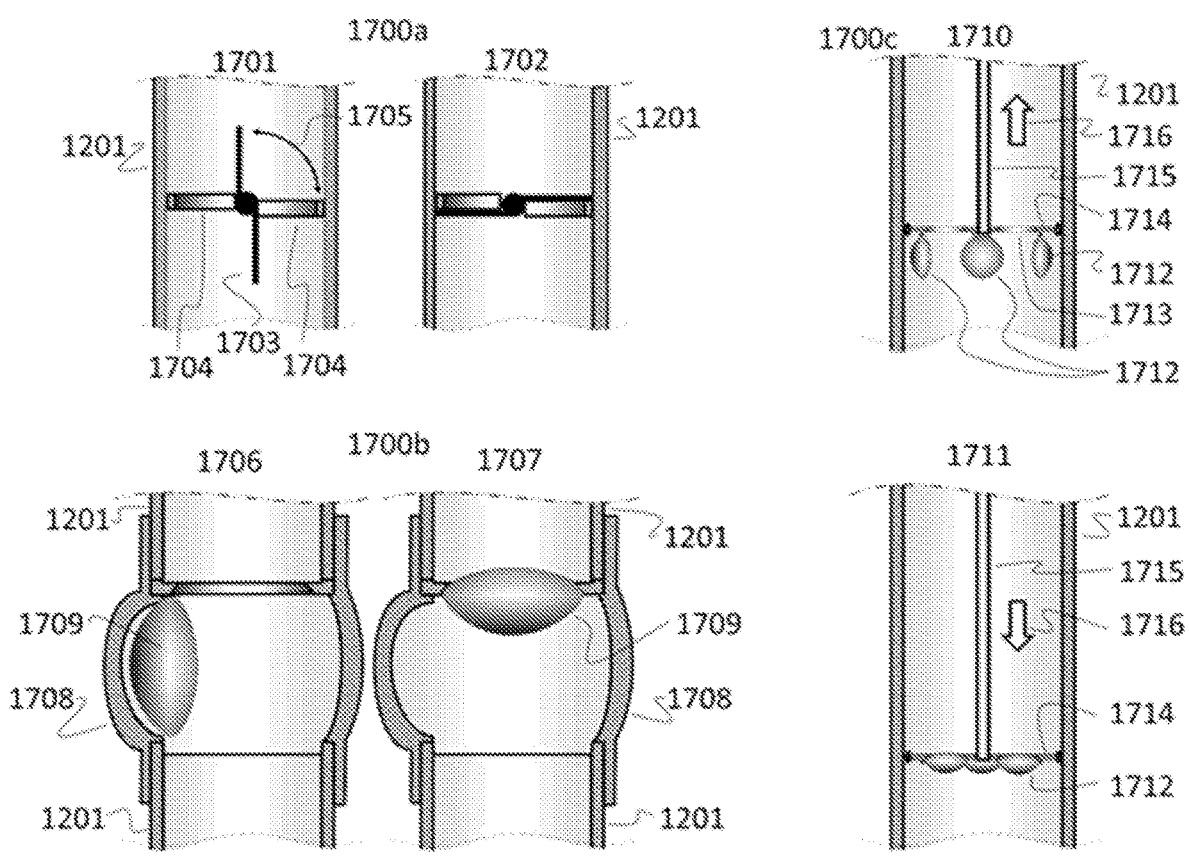
FIG. 17—Sea silo controls including a shutoff valve 1700a, a flow control float valve 1700b and a flow control pusher 1700c for use when handling materials of concern or that tend to float back up the silos.

There are organic materials today that require incineration after use, such as hospital materials, illegal drug seizure, the destruction of unused or outdated drugs, unused explosives, invasive plant species, deconstruction materials or plastics that decompose at the deep sea pyrolysis temperatures. Sea silos (e.g., 1201-1301) at sites were these types of materials are being handled for coalification purposes may be equipped with a series of valve controls as illustrated in FIG. 17. The valve 1700a is shown in the open position 1701 and closed position 1702 with the valve vain 1703 closing by moving to the stops 1704 as indicated by arrow 1705. A directional flow control valve 1700b is shown with housing 1708 and flapper 1709 installed in the sea silo 1201. The flapper 1709 is configured to float and close as shown in 1707. When water is flowing downward, the valve will open as shown in 1706. This is done to, among other things, minimize the problem of organic material 1205 floating back up though sea silo 1201 and jamming up when the equipment is not in use. A silo plunger 1700c is shown, including a shaft 1715 and a valve plate 1714 with a number of flappers 1712 that block the openings in the plate 1714 when pushing down as indicated by directional arrow 1716 as shown in 1711. When pulling up on the shaft 1715 as shown in 1710, the valves open up allowing the water to flow thought the plate 1714.

Minimizing Heat Loss from a Large Hydrothermal Vent Field

Figure 9:
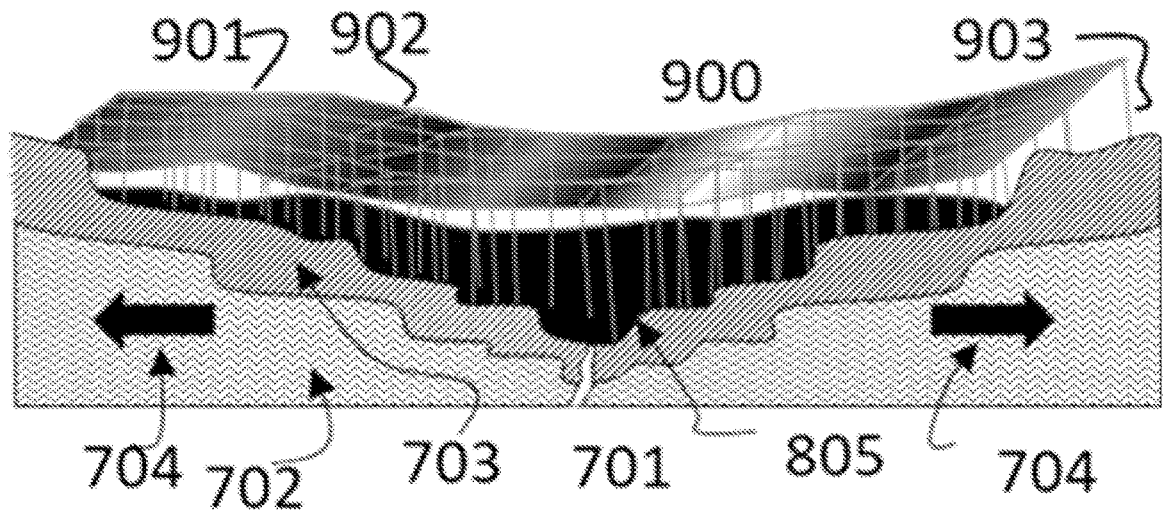
FIG. 9—A thermal reflector 900 over a hydrothermal vent field for increasing the average temperature of the water surrounding the vent and the subsequent rate of coalification of organic matter in the area.
Figure 10:
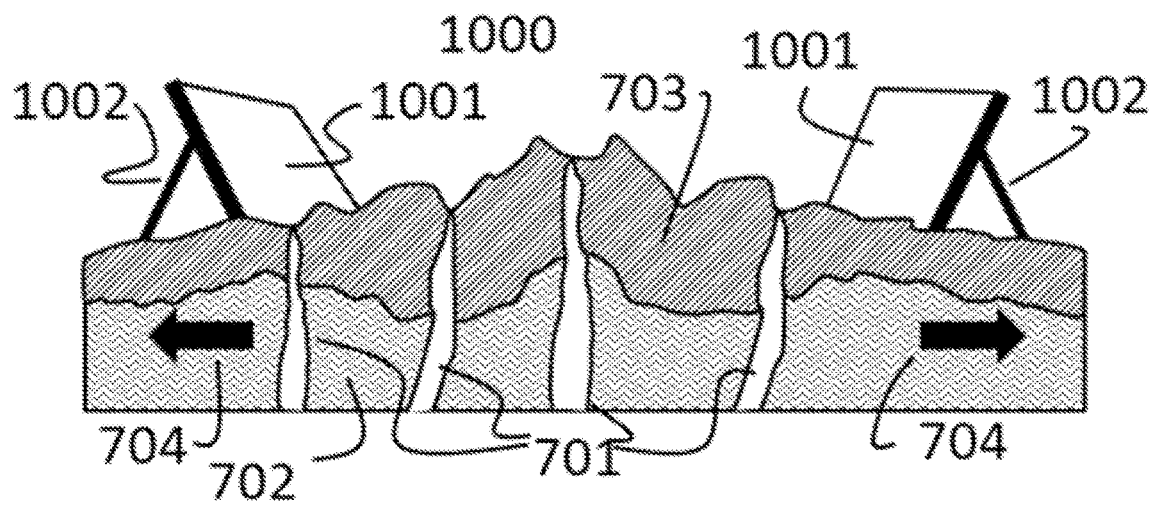
FIG. 10—The cross-section of a fast spreading hydrothermal vent field with a configuration 1000 that includes stadium walls 1001 (supported by supports 1002) added to minimize the effect of volcanic activity moving organic matter in a vent field outside of the area used for coalification by violent volcanic activity in the vent field.
Figure 11:
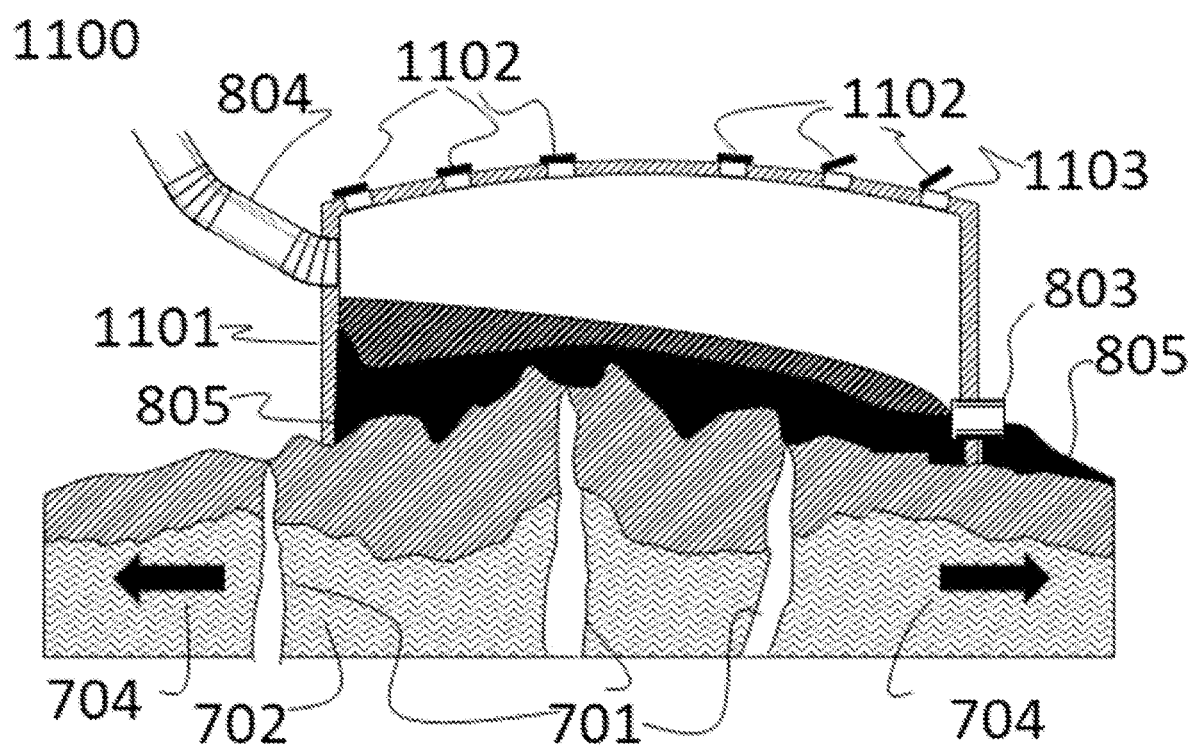
FIG. 11—A cross-section of a large oven for organic material coalification set on hydrothermal vents in a vent field on a fast spreading oceanic ridge with pressure relief vents 1103 to lessen the effect of violent volcanic activity on the oven.

The energy available from the Earth's core below the hydrothermal vent fields is truly impressive. There will be situations where a natural hydrothermal vent will not be able to keep up with the demand for the coalification process. The slow spreading North Atlantic Ridge could see a level of coalification activities that would exceed its thermal output capability. Modifying hydrothermal vent field by covering the field with a sturdy cover that can withstand most volcanic events and still be movable could minimize the effect of such demands on the system. The heat shield 901 in FIG. 9 may be configured to conserve heat.

Large Reusable Vent Covers

Figure 18:
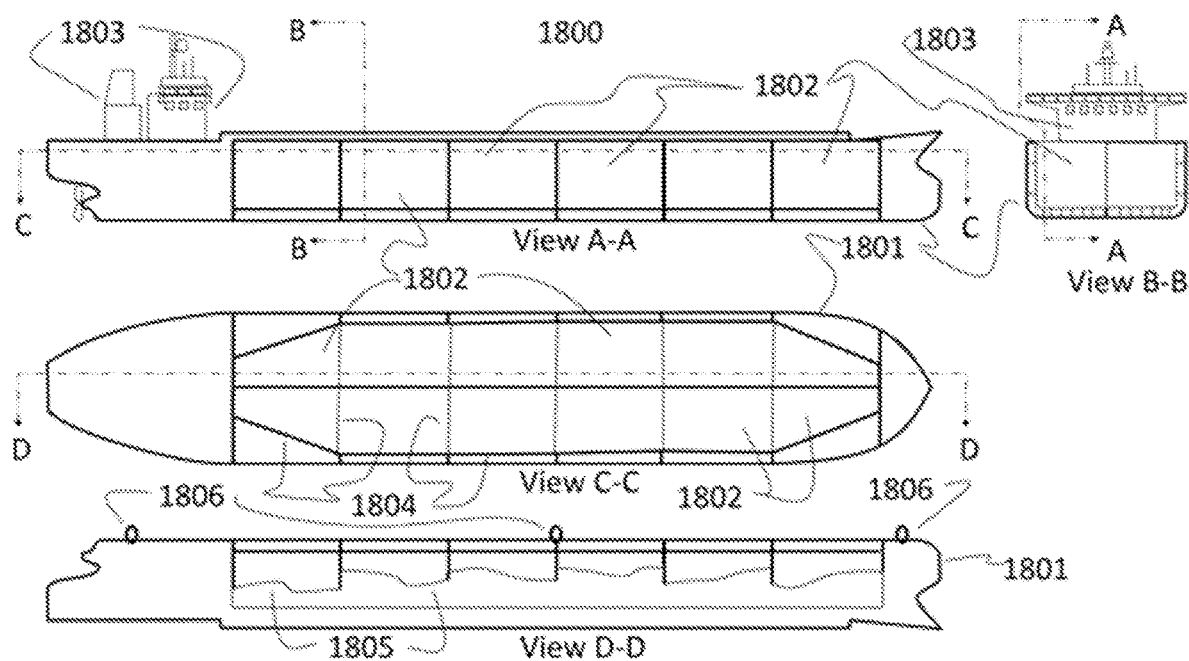
FIG. 18—A series of cross sectioned orthographic projections depicting a double hulled oil tanker being modified for use as a cover for a hydrothermal vent field.
Figure 19:
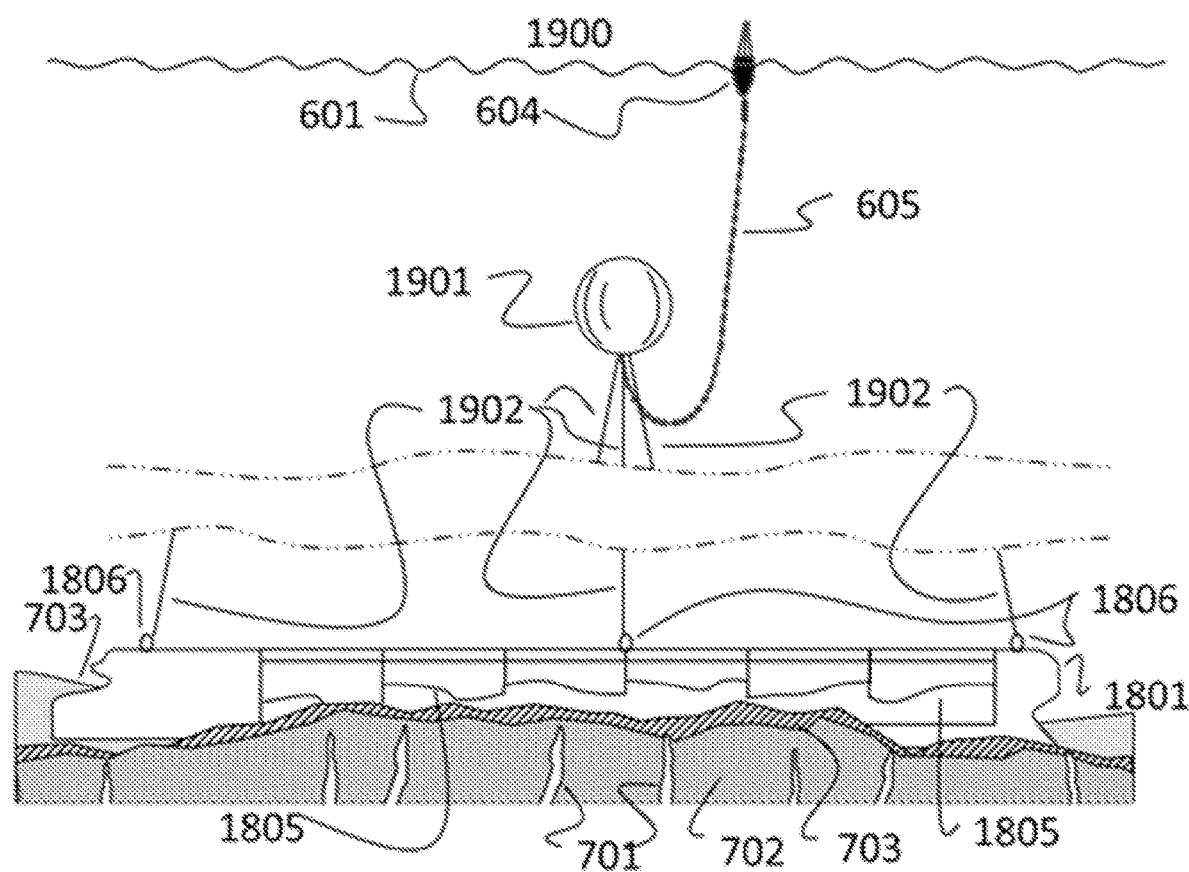
FIG. 19—A cross section of a modified double hulled oil tanker and associated equipment being used as a cover for a hydrothermal vent field.

FIG. 18 and FIG. 19 illustrate the modification and use of a doubled hulled oil tanker 1800. View A-A, View B-B, and View C-C depict a hull 1801, a total of twelve oil storage tanks 1802, the ships superstructure 1803, and/or other components. In FIG. 18, view D-D illustrates a modified version of the same ship with the superstructure removed, the deck removed including the tops of the oil tanks, and the internal drive system removed as is normally done when scrapping a ship. View D-D illustrates the bulkheads or walls of the oil storage tanks 1804 that face other have been modified 1805 to accommodate the peaks of ridges when deployed as a cover for a hydrothermal vent field. Lifting eyes 1806 have been added to aid in maneuvering the hull when used as a hydrothermal vent field cover. The use of a double hulled ship in this application has an advantage in that there is a stagnant layer between the remaining outside oil tank 1802 bulkheads 1804 and the outside hull 1801. The gap between the hull 1801 and the oil tanks 1802 can be filled with material that has a lower thermal conductivity than water further improving the thermal insulation capability of the hydrothermal vent field cover. Sea silos 1201-1301-1601 can be used to supply organic material directly into the vent covers 1801-2001-2204 on the hydrothermal vent field.

FIG. 19 is a deployed version of a doubled hulled oil tanker similar to view D-D of FIG. 18, including a hydrothermal vent field with vents 701, rock core 702 and residue 703 on top of the rock core 702. Hull 1801 with modified internal tank bulkheads 1805 and lifting eyes 1803 is connected to a float 1901 via cables 1902. The top of float 1901 may be arranged fifty to one hundred feet below the sea surface 601 and may be connected to the surface buoy 604 by chain 605. The float 1901 will provide stability to the hydrothermal vent field cover including hull 1801 and modified internal bulkheads 1805 should the vents 701 erupt in a violent volcanic manner and shift the position of the hull 1801. The float 1901 may significantly reduce the displacement of a boat that can safely pick up the hull 1801 off the sea bed and move it to a new location. The modified oil tanker hull 1801 as shown in FIG. 19 can be moved up near the surface, filled with floating logs and other floating material and then lowered to the sea floor vent for the coalification of the hull's contents.

Figure 20:
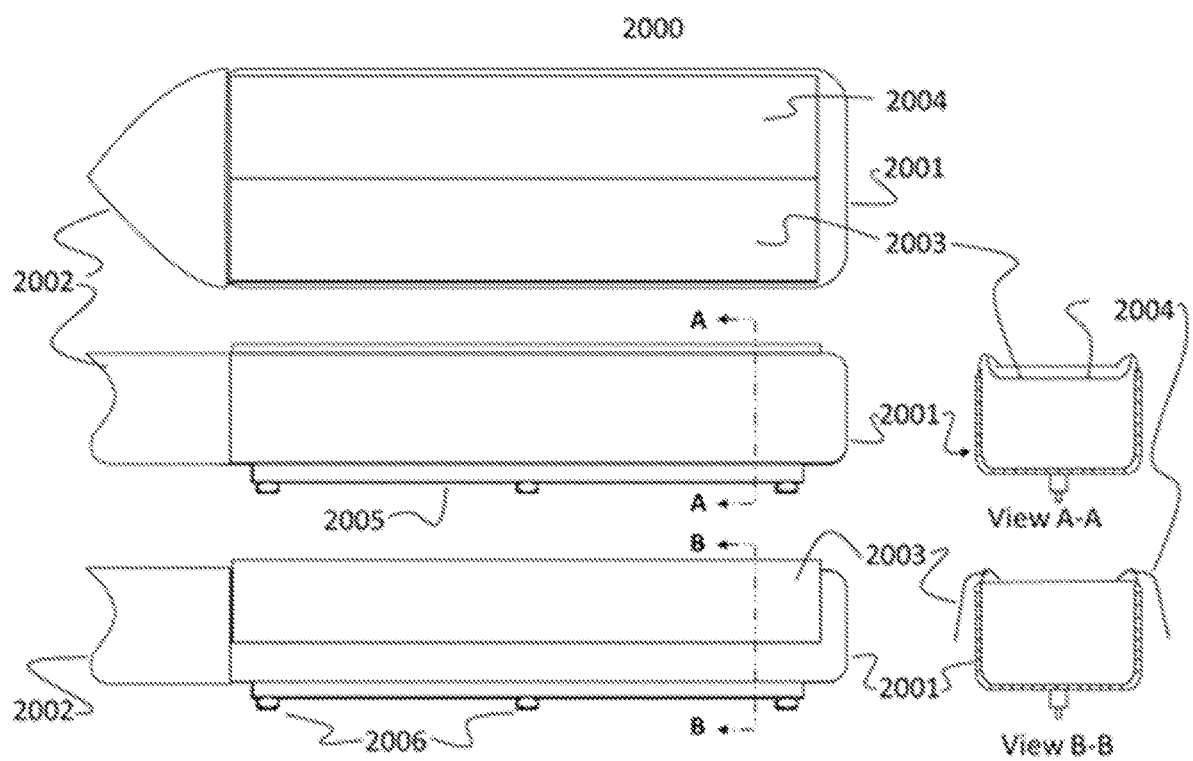
FIG. 20—A large barge configured for use in coalification on a hydrothermal vent site.

FIG. 20 is a barge configured for use as a transporter of organic material to the coalification site and to provide cover for the hydrothermal vent field. The barge may include a hull 2001 shown here as a double hull, two hatches 2003-2004 that open for filling the barge and open for discharging the contents at the coalification site, and/or other components. The barge can be lifted from the keel 2005 using lifting eyes 2006 as well as lifting points on the top of hull in configuration 2000 for use when bring the barge to the surface of the ocean after a coalification run or hauling it out of the water. In View A-A of FIG. 20 the hatches 2003-2004 are closed while in View B-B the hatches 2003-2004 are open.

Configuration 2000 of FIG. 20 has a bow section 2002 that serves several purposes. Bow section 2002 will make the transportation of the barge under tow or under its own power more efficient. Bow section 2002 is also an adjustable float where the displacement is modified by adding or removing water from an internal water reservoir. When the barge is being transported, the reservoir in 2002 would normally be empty.

Figure 21:
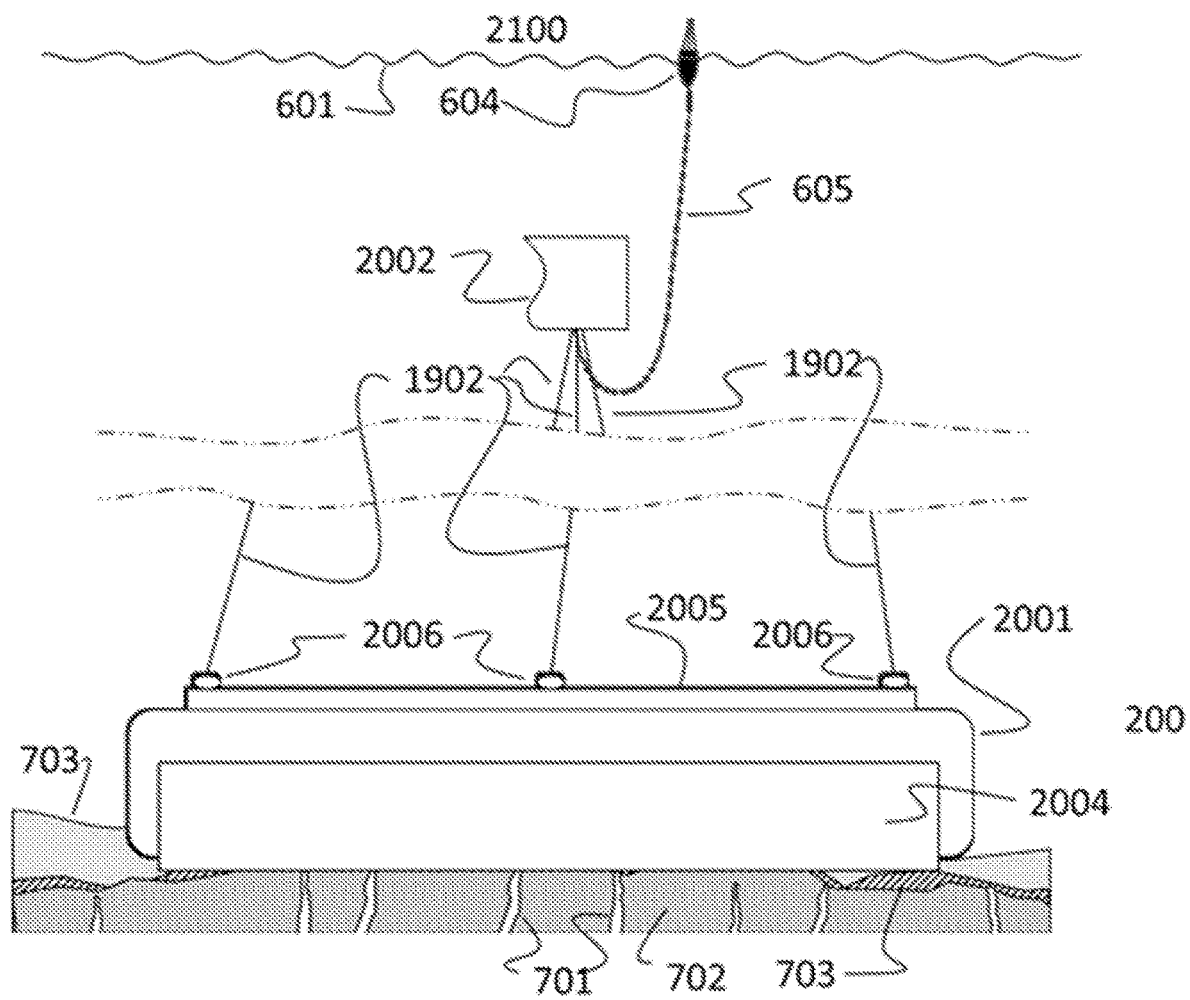
FIG. 21—A barge of FIG. 20 on the hydrothermal vent field.

FIG. 21 is a configuration where barge hull 2001 is inverted with hatches 2003-2004 open as in FIG. 20 View B-B and covering the hydrothermal vent field with vents 701 under hull 2001. The heat from the vents will be conserved in the water under the hull as opposed to streaming into the open ocean in an effort to speed up the coalification process. The bow section 2002 is functioning as a float near the surface 601 adding stability to the barge when moving the barge over the vent and when recovering from a violent volcanic event.

Figure 22:
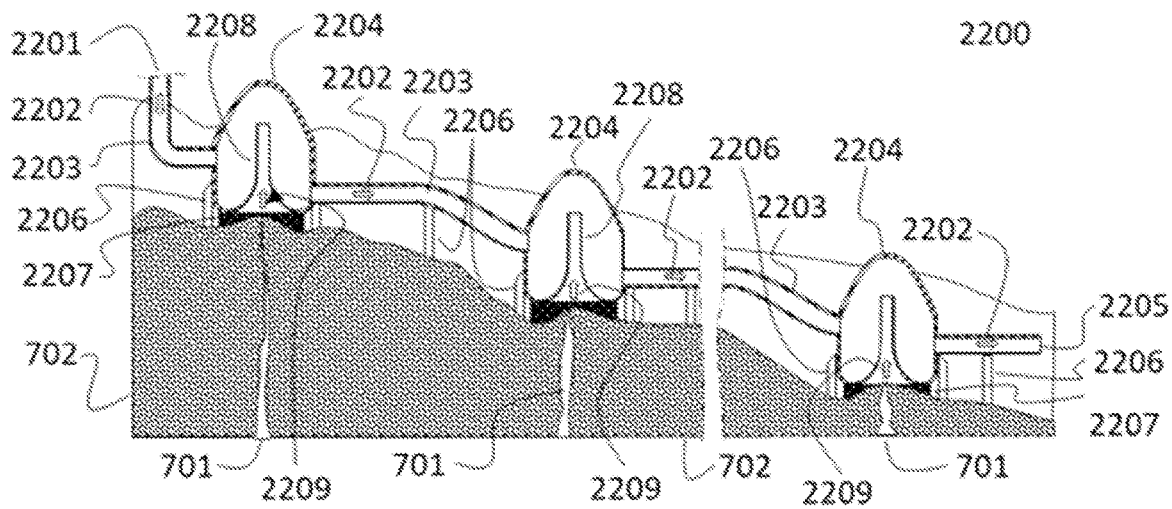
FIG. 22—Multiple ovens used in series to process organic material through the coalification process.

FIG. 22 is a cross-section of a multi-stage coalification oven configuration 2200 with three of the stages shown. The hydrothermal vent fields are generally located on mid-ocean ridges. Configuration 2200 has the input of organic matter 1205 at a high point 2201 of the system with the input for the organic matter 1205 making its way through interconnecting pipes 2203 in the direction of arrows 2202 passing through the oven housings 2204 and eventually reaching the end point 2205 where the processed organic matter will flow further down the mid-ocean ridge and down into a valley below where it will accumulate and complete the coalification process forming coal.

The ovens in configuration 2200 may include an outer shell 2204 mounted on supports 2206 that keep the oven shell above ridge 702 and over vents 701 and a perforated screen 2207 that surrounds hydrothermal vent 701 between ridge 702 and oven shell 2004. The ovens have funnels 2208 to encourage the high temperature water emitted by hydrothermal vents 701 to enter the processing ovens of configuration 2200 in the direction of arrow 2209. The heated vent water will also accumulate under housing 2204 of the processing oven in configuration 2200 and may be somewhat restricted by perforated screen 2207.

The thermal output levels associated with hydrothermal vents are known to very significantly. Old Faithful in Yellowstone National Park is perhaps the best example of this. The configuration of FIG. 22 minimizes the effect of individual vent thermal variations throughput highs and lows by averaging the output of several vents as well as to hold the incoming organic material being processed for a longer period of time allowing for a more complete breakdown of the organic matter entering the system at 2201.

Coal Recovery

What remains of the organic material that successful completes the coalification process is coal (e.g., in the form of hydrochar). In some cases, the structure of the original trees or other plant may be preserved resulting in a relatively low density, like a piece of charcoal. The coal could be sucked up off the bottom of the ocean as-is, after coalification at the hydrothermal vent fields, dried, compacted, and used for fuel. It also could be compacted in or near the vent field with the use of heavy weight 1500 and used for fuel. The carbon residue resulting from the hydrothermal vent coalification process can also improve the soil used for crop production including reforestation, as a fuel, or in the manufacturer of materials having a carbon base.

Protection from Storms

Ocean storms, squalls, hurricanes, cyclones, are common on the high seas. Fortunately, these are surface phenomenon and have little effect on the hydrothermal vent fields or the deep oceans. During hurricanes, wavelengths of eight hundred feet and wave heights of one hundred feet can be reached. Water movement as a result of wave action is negligible half a wavelength below the wave or about 450 feet below the ocean's surface for the waves as described. Some of the surface equipment associated with the coalification process that would be difficult to remove when faced with a storm will often be configured to be submerged about 450 feet below the ocean's surface while tethered to a marker buoy on the surface. This will be done to avoid storm damage for large platforms described herein and the like.

Alternative Energy Sources

Hydrothermal vent fields are a very attractive location for coalification of organic matter because large quantities of organic matter can be processed, and because the resulting coal does not need to be removed. Waste heat from industrial processes or from land based volcanic activity can also be used for this purpose.

Alternative Coalification Sites

The process described herein has focused on the use of high pressure super-heated water for the coalification of organic matter. The process can be accomplished at or near atmospheric pressures if the oxygen is excluded from the processing effort. The use of nitrogen gas would prevent the formation of $CO_2$ at the temperatures needed to breakdown organic compounds. High temperature steam can be used to breakdown organic compounds that do not react significantly with water molecules in a way that forms and releases $CO_2$ or $CH_4$. It is possible to achieve the needed water pressures to achieve the coalification goals using pumps or having a stand of water that has a vertical elevation of about one thousand six hundred feet. Across the world there are presently 11 skyscrapers that are taller enough to achieve that head of pressure and thousands of hills and mountains where this could be accomplished. The big island of Hawaii has both mountains that are tall enough and volcanic activity at the bottom that could supply the needed heat.

Inland Hydrothermal Vents

There are deep inland lakes that have thermal vents like Lake Ysyk in Kyrgyzstan that never freezes due to the geothermal activity. The coalification process, as described herein, is not limited to the oceans but rather to hydrothermal vents that are deep enough under water to raise the boiling point of the water to a temperature that will quickly degrade the incoming organic material.

Exemplary Operations

Figure 23:
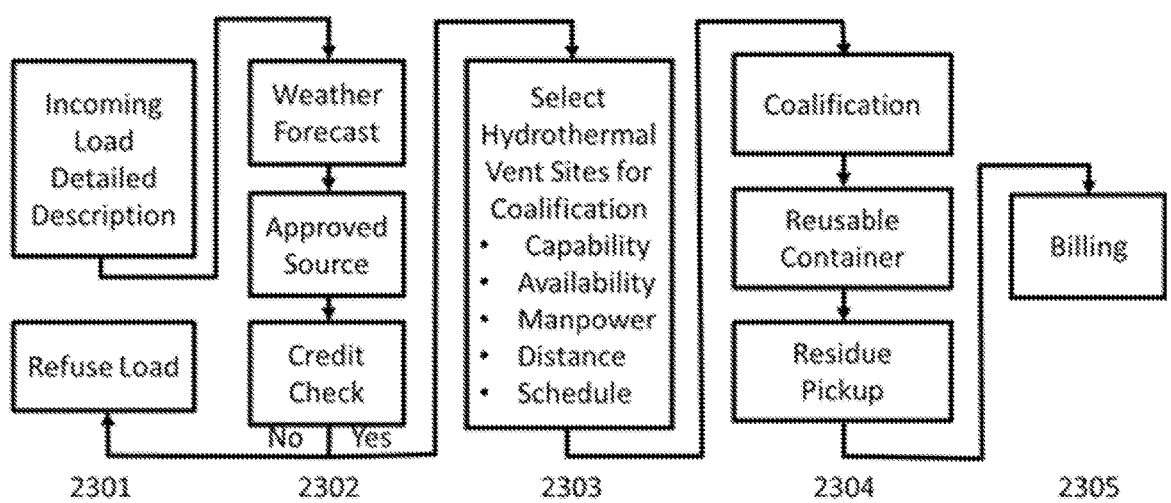
FIG. 23—Block diagram of typical workflow for a hydrothermal vent coalification operation.

FIG. 23 is a block diagram 2200 of an exemplary operating sequence for a request for the coalification of organic material. The first column 2301 is the incoming request and response. The second column 2302 is an analysis of the incoming request. The weather on the high seas will sometimes cause delays. The incoming material must be from an approved source, and the customer must have the ability and desire to pay for the effort. If these basic needs are not met, the request will be rejected.

If the load is accepted, a plan 2303 will be worked out with the customer. Following that coalification 2304 will initiated and after completed, any reusable containers 2304 or desired residue 2304 will be scheduled for pickup by the customer. Billing 2305 for the effort will be done after the coalification is started and in most cases before the coalification of the incoming material is completed.

Drilling for Heat

Figure 26:
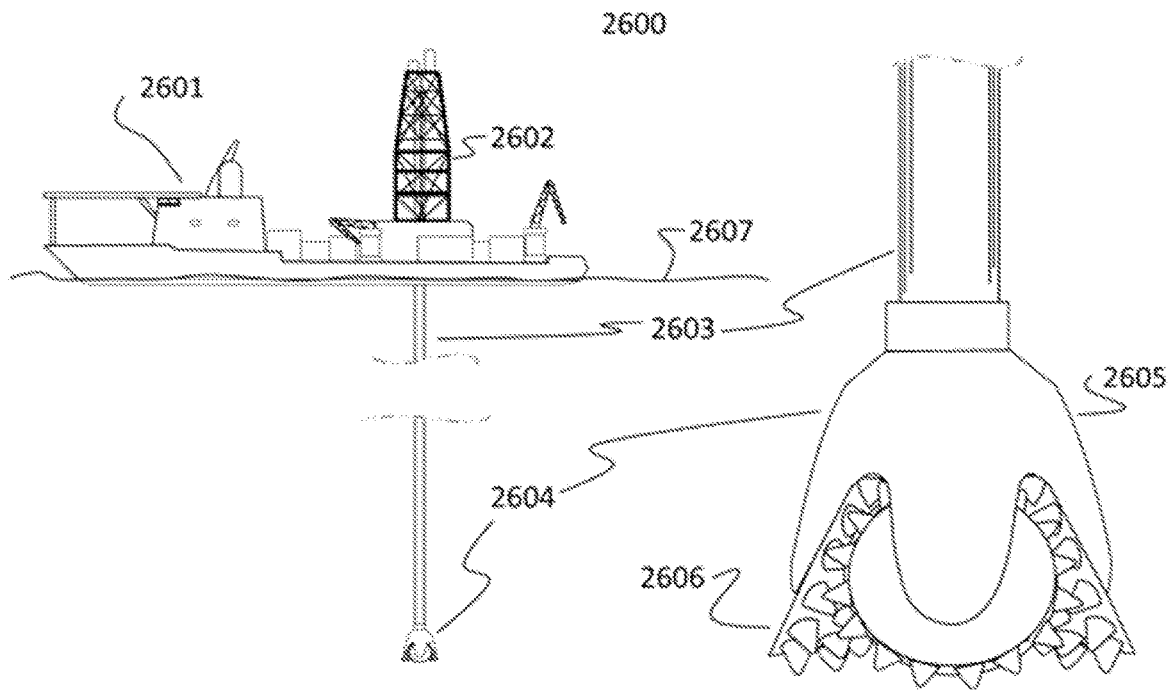
FIG. 26 is a depiction of a drill ship commonly used by the petroleum industry for drilling oil wells, with a drill bit of the type commonly used to drill through rock.

Nature's submarine hydrothermal thermal vents are useful as an energy source as-is but could be improved. The volcanic energy is coming from magma below the hydrothermal vents. Drilling down below the hydrothermal vent fields to get closer to the energy source can be accomplished with common equipment like the drill ship 2601 of FIG. 26, including drilling tower 2602, drilling shaft 2603, drill bit 2604, and/or other components. The drill bit housing 2605 may hold grinding wheels 2606 that rotate and have teeth that grind through rock. When drilling, the housing 2605 and shaft 2603 rotate. When drilling a borehole 2702 through rock 2701 as shown in the cross-sectional drawing FIG. 27a, high pressure water is pumped through the shaft 2603 from the drillship 2601 to the drill bit 2604 where it exits the drill bit housing 2605 pushing ground up rock 301 fragments up and out of the borehole 2702 of FIG. 27a. The high flow rate of surface water associated with the drilling process will also cool the drill bit when drilling for the heat emitted from the magma chambers commonly located below hydrothermal vent fields.

Figures 27A, 27B, 27C:
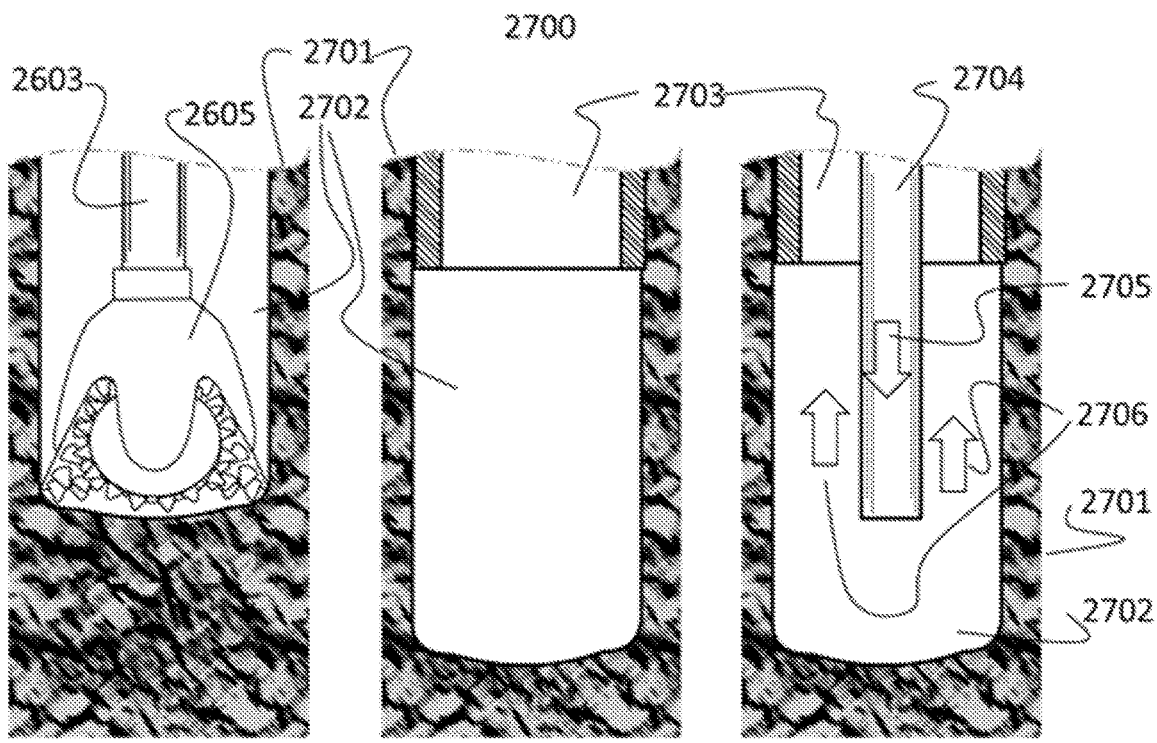
FIGS. 27A-27B-27C illustrate cross-sectional drawings depicting the drilling of a bore hole 2702 (FIG. 27A), the addition of a liner 2703 (FIG. 27B), and the addition of an incoming water pipe 2704 (FIG. 27C).

Once the drill bit has reached the desired position, the drill bit and associated equipment may be withdrawn. A borehole liner 2703 is often added to support the walls of the borehole 2702 as shown in FIG. 27b and FIG. 27c. The configuration of FIG. 27c has a pipe 2704 added to facilitate the extraction of heat from the borehole 2702. Water may move down the pipe 2704 as indicated by directional arrow 2705, either mechanically propelled or through convection that occurs when the water heated in the borehole 2702 of FIG. 27c begins to rise as indicated by directional arrows 2706. The heat from the borehole walls may be transferred to the water: the water may expand, lowering its density, and start to rise. The output from the borehole 2706 can be in the form of hot water or steam or supercritical water. The state of the water 2706 can change as it rises due to changes in temperature and pressure of the water.

There are multiple sources possible for the water 2705 flowing down tube 2704 to the borehole. Water deep in the ocean is typically in the 2° C. to 4° C. range and a little warmer very near the hydrothermal vent fields. Water from active thermal vents is relatively hot but can be used as is as incoming water 2704 or mixed with cooler water prior to use. Water flowing 2705 down tube 2704 can come from the hydrothermal vent processing ovens of FIG. 31, 32, 38, 41, or the storage facility of FIG. 39.

The water 2705 flowing down tube 2704 can come from the surface of the ocean 2607 where it is normally warmer than the water at the bottom of the ocean. The surface water can be moved down to the borehole in a manner that will allow it to act as an insulating jacket for heated water coming out of the borehole in a coaxial configuration as described in FIG. 30a or FIG. 39a where it will take on heat from the hotter rising water and/or steam in the center of the coaxial pipe. Water coming from the surface is likely to include organic matter like municipal sewage and garbage that will be loaded into the pipe 2704 and processed into hydrochar while traveling through the borehole and processing equipment after going through the borehole. Surface water 2705 flowing down tube 2704 is likely water that has been used as coolant for energy processing operations before being loaded into tube 2704. When needed, water flowing 305 down tube 2704 can be assisted with pressure from the surface as is done with the drill shaft 2603 or with impellers located near the bottom of the ocean.

Figure 28:
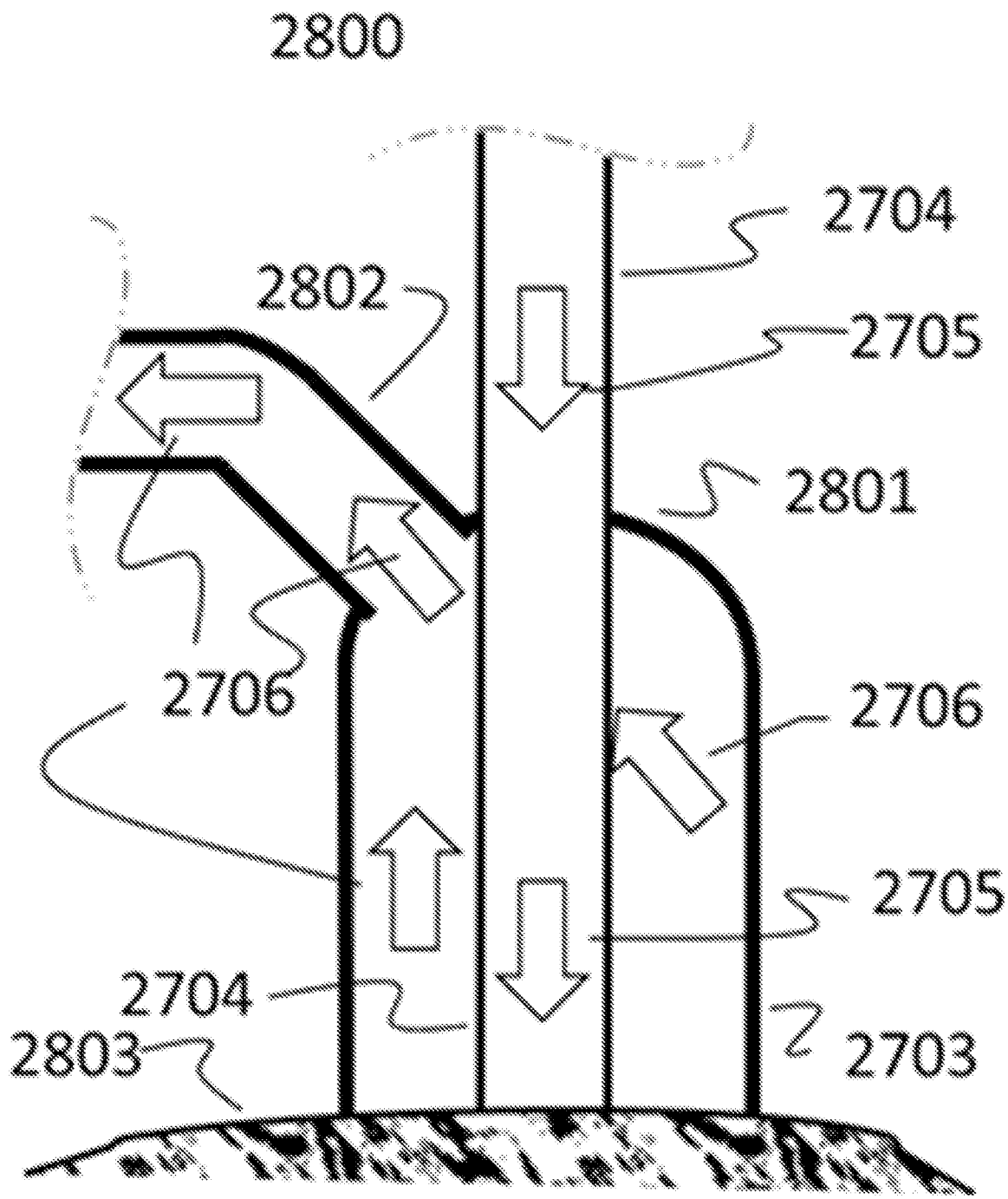
FIG. 28 is a depiction of the pipes at the top of a borehole in cross-section where the heated water 2706 from the bore hole is exiting near the bottom of the ocean 2803 for use in that general area.

FIG. 28 is a cross-section of a hydrothermal vent output tube 2703 that terminates at endpoint 2801 near the ocean floor 2803 with the output 2706 from the tube 2703 directed through tube 2802. The incoming water 2705 is entering through tube 2704. The heated output water 2706 flowing through pipe 2802 is likely to be directed into an ocean bottom processing effort including but not limited to hydrothermal vent ovens 3101, 3802 energy storage unit 3900 or a rain cloud generating operation 4500 or an electrolysis processor 4900. The incoming water 2705 in tube 2704 could be coming from the same operation as the output 2706 resulting in an increase in the heat in the water 2706 leaving the borehole.

Figure 29:
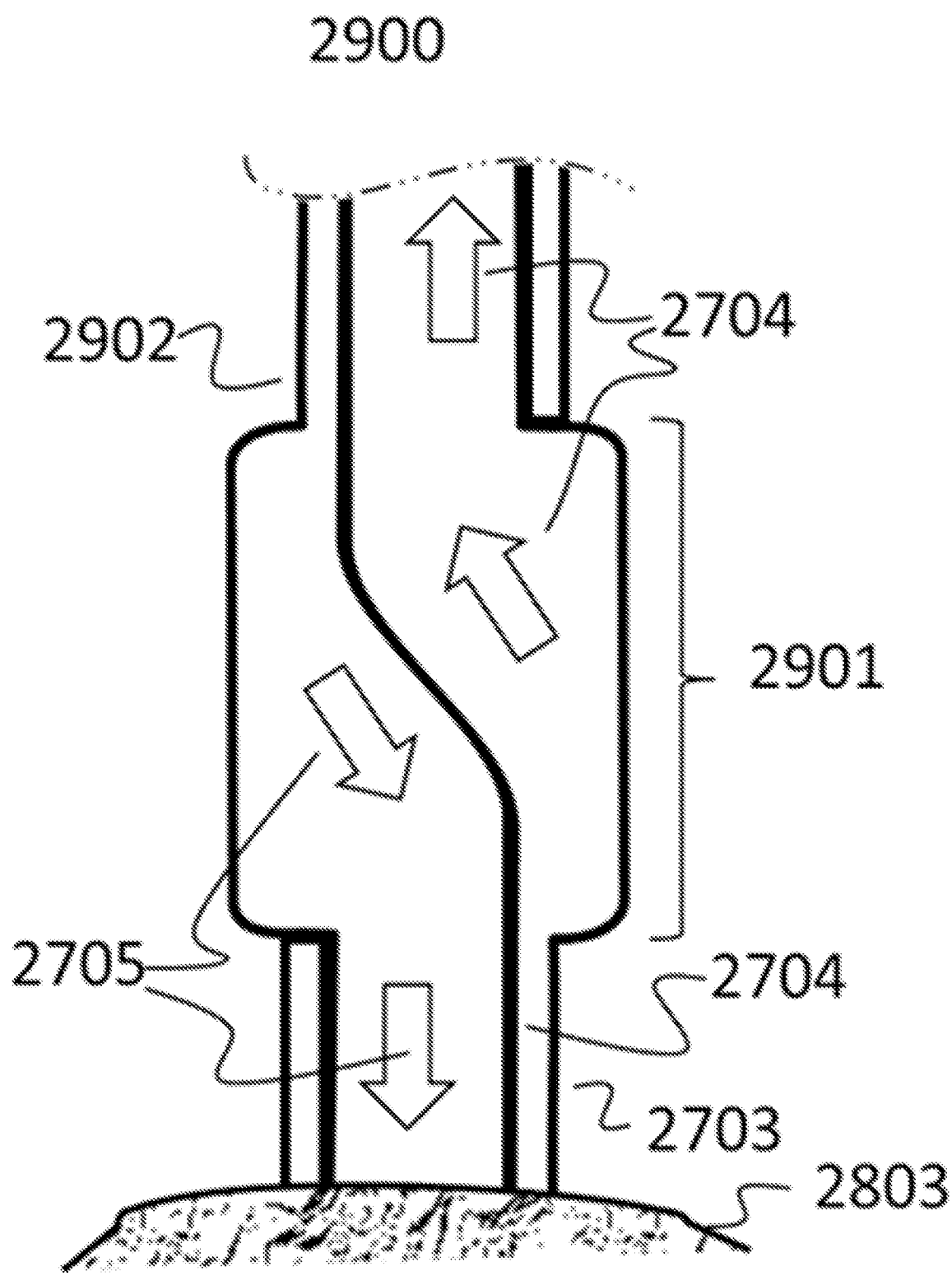
FIG. 29 is a crossover connection for a coaxial pipe in cross-section where the incoming water 2705 to the bore hole is on the outside of the coaxial pipe above the crossover connector 2901 with the outgoing heated water 2706 on the inside of the pipe. Below the crossover connector 2901, the water heated from the borehole 2706 is on the outside of the coaxial pipe and the incoming water 2705 is on the inside.

FIG. 29 is a crossover connector 2900 that moves the heated output water 2706 from the outside position in pipe 2703 containing heated water from the bore hole near the ocean floor 2803 and moves the egressing water to the inside position of the coaxial pipe 2903 above the crossover connector 2900. The incoming cooler water 2705 is moved from the outside position in pipe 2902 above the crossover connector to the inside position in pipe 2704 before or after entering the borehole.

The incoming water 2705 can come from many different sources as previously mentioned but when it comes from water near the exit of the heated water 306 it can increase the insolation capability of the coaxial plumbing configuration. The incoming water 2705 in the outside tube 2902 will be exposed to the heat escaping the hotter water 2706 in the inside coaxial tube. Since the temperature of the incoming water 305 has been increased, the temperature of the exiting water will be increased. This same principle can be applied to plumbing where the incoming water 2705 and the outgoing water 2706 is not configured coaxially but side-by-side in near vicinity or in a cluster with multiple entrances and egress riser tubes bundled and moving energy from one point to another.

Figure 30A:
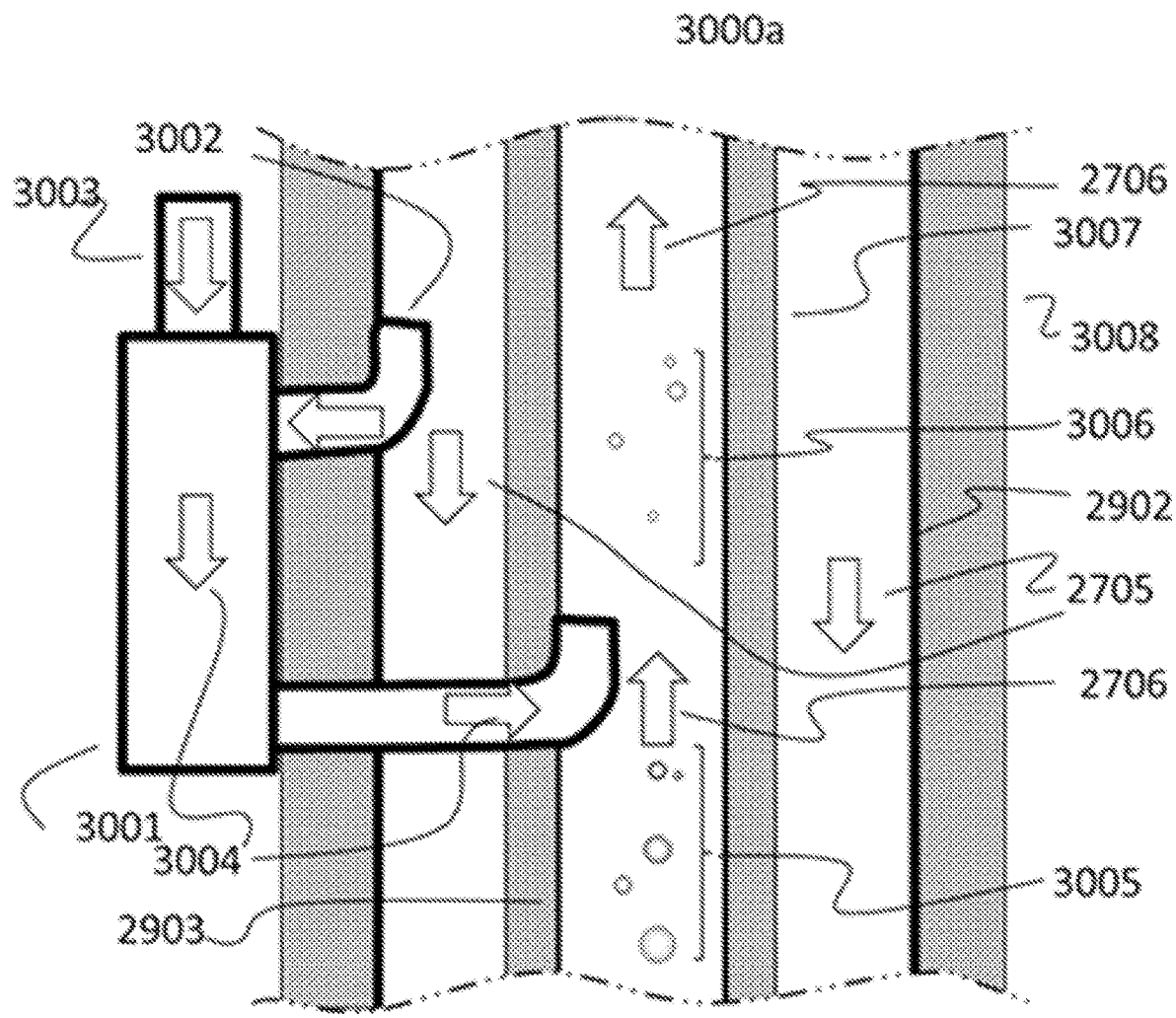
FIGS. 30A-30B illustrate cross-sections of ways to control the boiling point of water rising in the center of an insulated coaxial riser pipe.
Figure 30B:
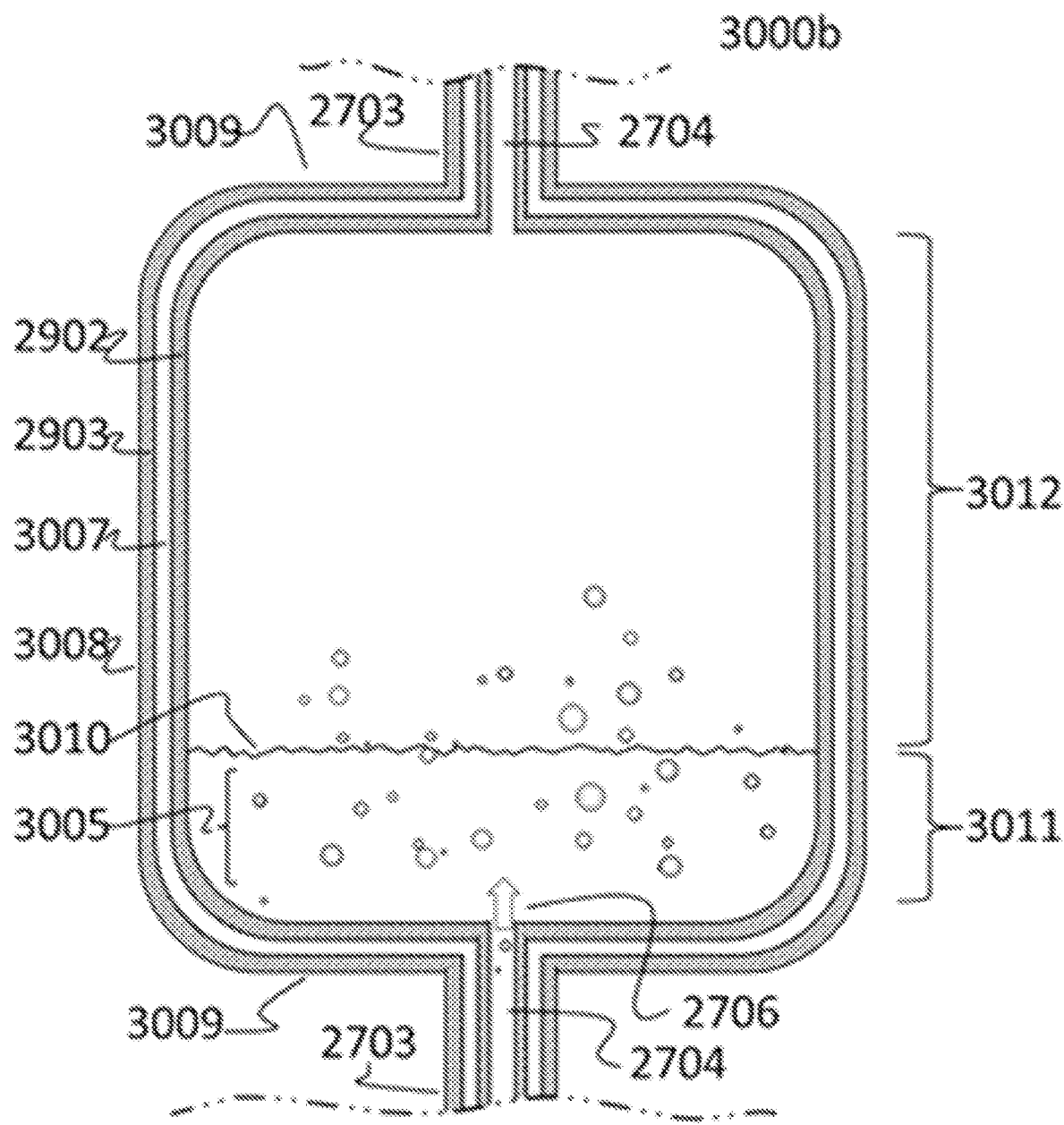

When the hot water 2706 or steam 2706 or supercritical water 2706 is rising from the borehole, it is likely to change state. FIGS. 30a and 30b illustrates ways to control the change in state when needed to enhance a process. Referring to FIG. 30a, as the hot water 2706 is rising through the riser tube 2903 the pressure will decrease, and it is likely the water will begin to boil before it reaches its destination, which could be the surface of the ocean. The boiling point can be controlled by adding cool water 3004 to the hot water 2706 flow as shown in FIG. 30a where a hot water temperature controller 3001 has been added. There are two water input streams 3002 and 3003 for this version of the controller. One input is from water 3003 surrounding the device and the other input water 3002 is from the incoming water 2705 heading down to the bore hole. If the hot water 2706 starts boiling 3005, the cooler water 3004 mixing with the hotter water 2706 will reduce the waters 2706 temperature and the waters 2706 tendency to boil 3006 or eliminate the boiling entirely. Optimizing the systems performance may result with several controllers 3001 being added to the coaxial tube 3000a to maintain control of the flow rate of the hot water 2706.

In the configurations of FIG. 30 the conservation of energy in the coaxial configuration has been improved with the addition of insulation 3007 being added to the internal coaxial tube 2903. Also, insulation 3008 may be added to the external coaxial tube 2902.

Near the bottom of the ocean, the water entering the controller 3001 through the local input 3003 could be as cold as 2° C. or 3° C. If the incoming water 2705 is surface water, it is likely to enter the outside coaxial tube 2902 near 20° C. and take on heat from the hot water 2706 in the riser tube 2903 increasing the temperature of the incoming water stream 2705. At the location of the controller, the incoming water 2705 entering the controller at the controller input 3002 could be above 100° C. If the goal of the system is to generate rain clouds as described in the system associated with FIG. 45 and maximizing the amount of water blown into the air is desirable, warmer incoming water through controller input 3002 would support that goal with more hot water 2706 moving through the riser tube 2903.

Referring to FIG. 30b, the steam output pressure may be addressed. The reservoir 3009 has been added to provide room for the water to boil. Referring to the system of FIG. 45, if the cloud generating process can be optimized with steam from the hydrothermal vent system at 100 psig, the configuration of FIG. 30b can accomplish that efficiently. The evaporation tank 3009 would be set up such that the evaporation line 3010 will be 80 m (262 ft.) below the water's surface 2607. Below the evaporation line 3010 the expansion chamber 3009 will contain boiling water 3011 and above the evaporation line, the chamber will contain pressurized steam. For the stated conditions, the water temperature for the hot water 2706 entering the chamber is controlled at 170° C. (338° F.) with controllers 3001 located below the expansion tank. When the hot water 2706 enters the chamber, it will boil until the pressure in the chamber reaches 100 psig and then stop boiling since the pressure will have raised the boiling point to 170° C. The pressure above the evaporation line 3010 would typically be controlled at the surface and adjusted to meet the system needs. The chamber of FIG. 30b can be configured to minimize problems associated with steam hammers with properly designed expansion and contraction capabilities.

Managing Combustible Gas and Oil Byproducts

As the coalification process is done at deeper depths and higher temperatures the output will change. At shallower depths, the organic matter being produced will be mostly hydrochar, a form of coal that can be left on the sea floor for centuries where it may turn into coal seams. Coalification operations located 2.5 km or more below the sea surface could be operating at 400° C. At that temperature and depth the products will be hydrochar and will include oil that resembles sweet crude petroleum as well as one or more of methane, ethane, propane, and other combustible gasses. The oil and combustible gas generated during high temperature coalification need to be managed.

Figure 31:
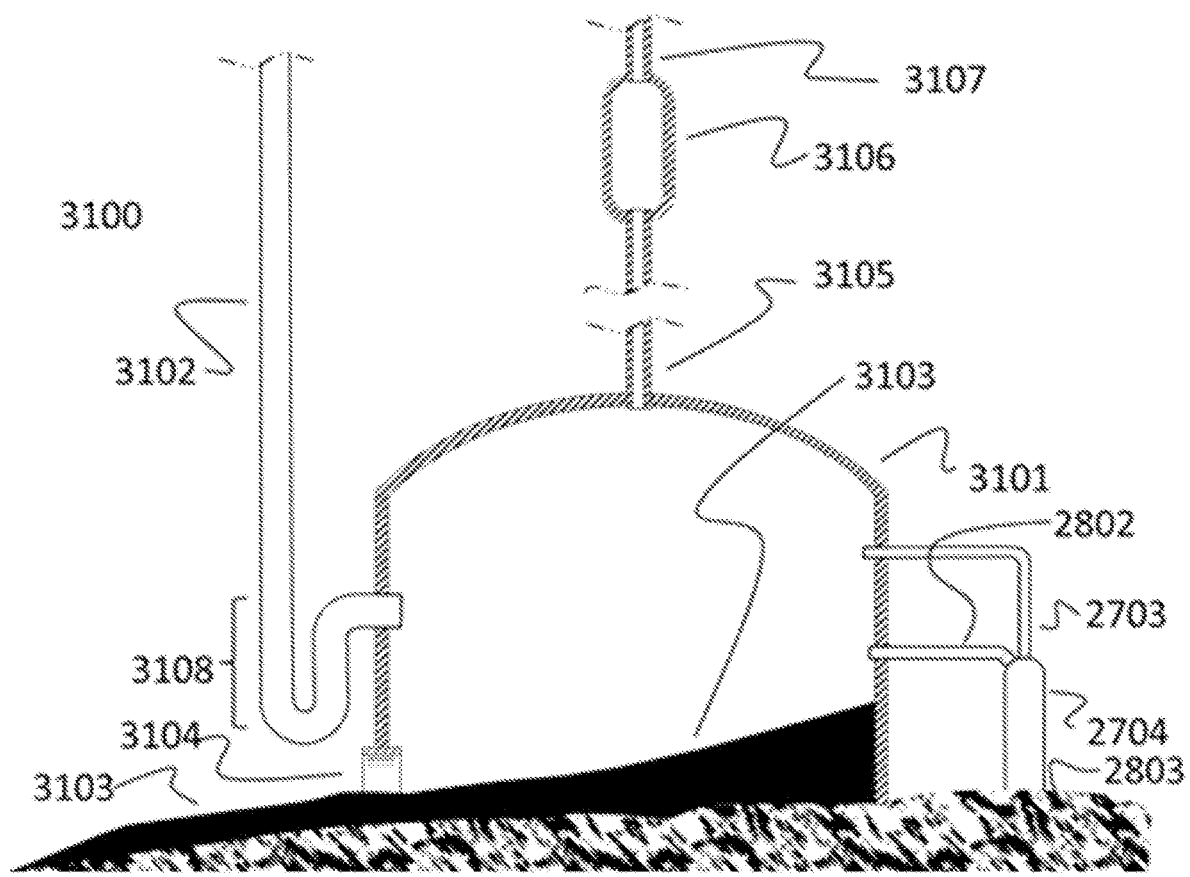
FIG. 31 is a hydrothermal vent oven shown in cross-section configured to operate on the sea floor at depths where the boiling point of water is high enough to produce significant amounts of oil and combustible gas when processing organic matter into hydrochar.
Figure 32:
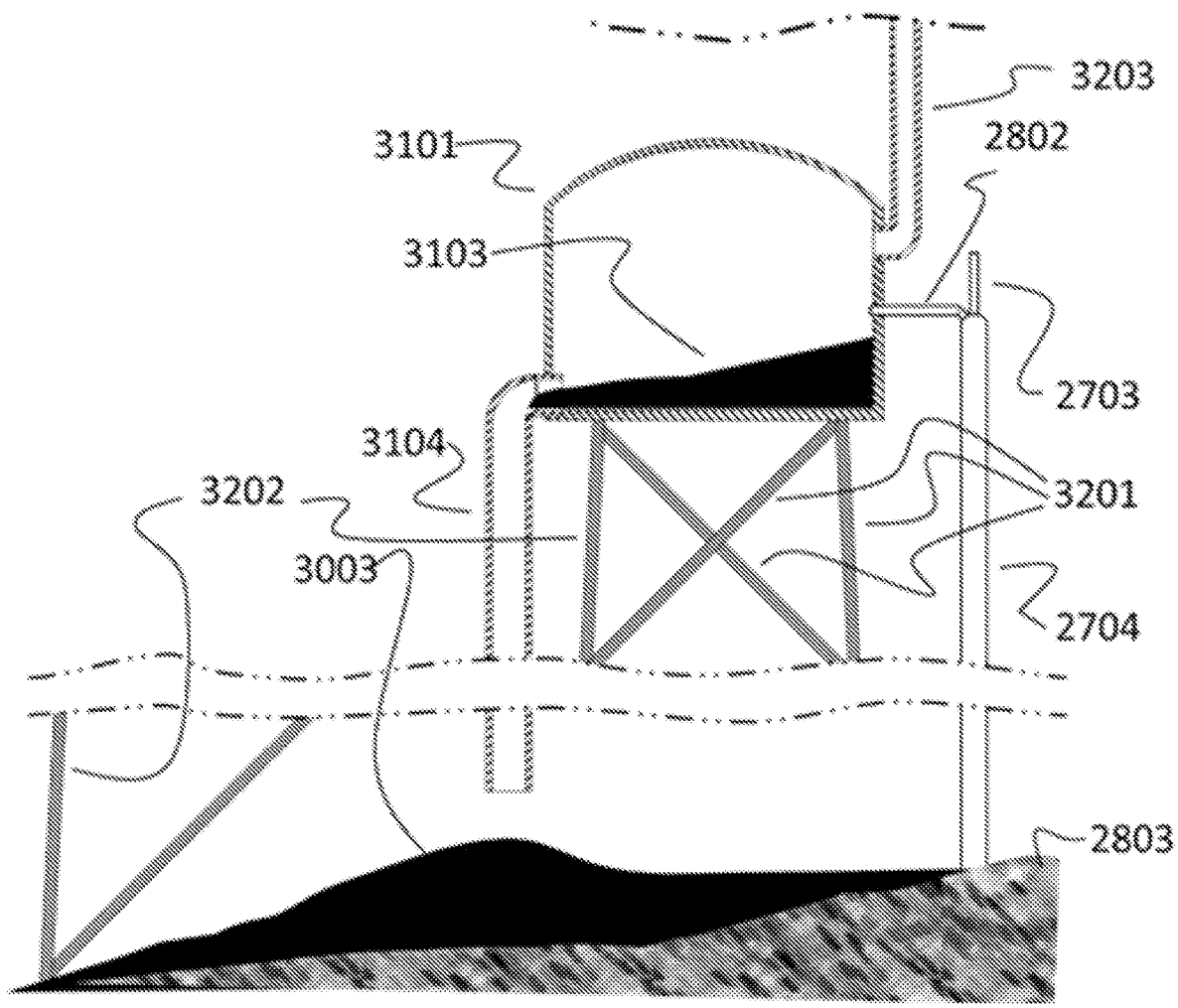
FIG. 32 is a hydrothermal vent oven in cross-section mounted well above the bottom of the ocean in an effort to decrease to production of oil and combustible gas generated in the hydrochar operation.

Referring to FIG. 31, a hydrothermal vent oven 3101 is sitting on the ocean floor 2803 set up for coalification under high temperature high pressure conditions. The oven may receive organic matter, garbage, sewerage from the sea silo 3102. The P trap 3108 at the bottom of the sea silo 3102 may prevent the oil and combustible gas produced during the coalification process from traveling back up the sea silo 3102 to the surface of the ocean where the sea silo 3102 is loaded with organic matter.

The solid hydrochar 3103 resulting from the process will collect in the bottom of the oven 3101 and move slowly out the hydrochar exit 3104 and down the side of the mid-ocean ridge where the hydrothermal vent fields are often found. The oven may be heated with the output from hydrothermal vents through tubing 2704 and 2802. In this application the input the hydrothermal vent borehole operation 2703 is coming from inside the hydrothermal vent oven 3101 rather than the surrounding water.

A reservoir 3106 may be connected to the top of the hydrothermal oven 3101 by a tube 3105. The reservoir 3106 is positioned to collect and cool the oil and combustible gas before proceeding up through riser pipe 3107 to the surface for use or disposal.

Elevated Coalification Platforms

Minimizing the problem associated with combustible gas and oil generated in favor of solid char during the coalification process can be accomplished by raising the hydrothermal vent processing oven up off the bottom of ocean and/or lowering the temperature of the water heating the oven. In FIG. 28 the oven may be lifted well off the sea floor and the input to the borehole 2703 is from the open ocean rather than the hydrothermal vent oven. The sea silo 3203 input to the hydrothermal vent oven 2803 may not require a P trap 3108. The exit 3104 for the hydrochar 3003 has been extended down near the sea floor. Beam 3202 is one continuous straight leg of the support structure 3201 added here to show prospective to the hydrothermal vent oven 3101 elevation above the ocean floor 2803.

High Volume Coalification Processing

Figure 33:
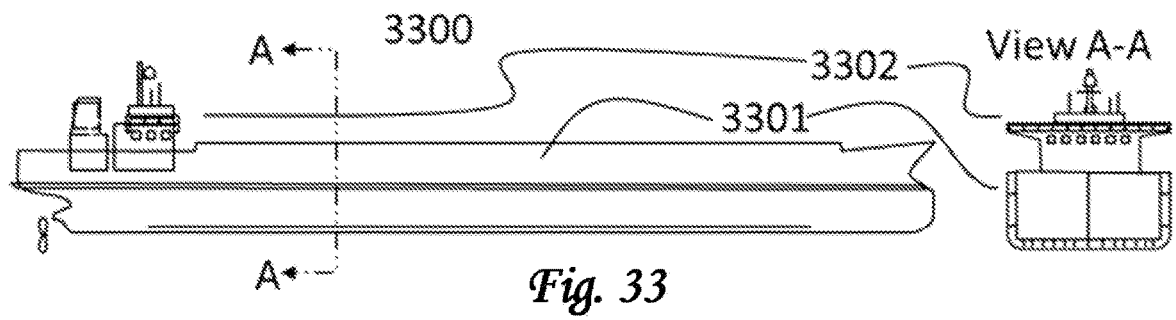
FIG. 33 is a two view orthographic projection of a double hulled oil tanker with View A-A in cross-section.

FIG. 33 is a typical two-dimension orthographic projection of a doubled hulled oil tanker similar to that of FIG. 18a. There are about 7400 oil tankers operating worldwide. The normal life of a tanker is about 15 years. After that ships need to be refurbished or scrapped. Several hundred tankers are scrapped every year. Scrapping a ship in the EU is expensive and accidental groundings during a moon high tide in Bangladesh or Indonesia are sometimes the final voyage of such vessels with the vessels being scrapped on the beach after grounding.

Figure 34:
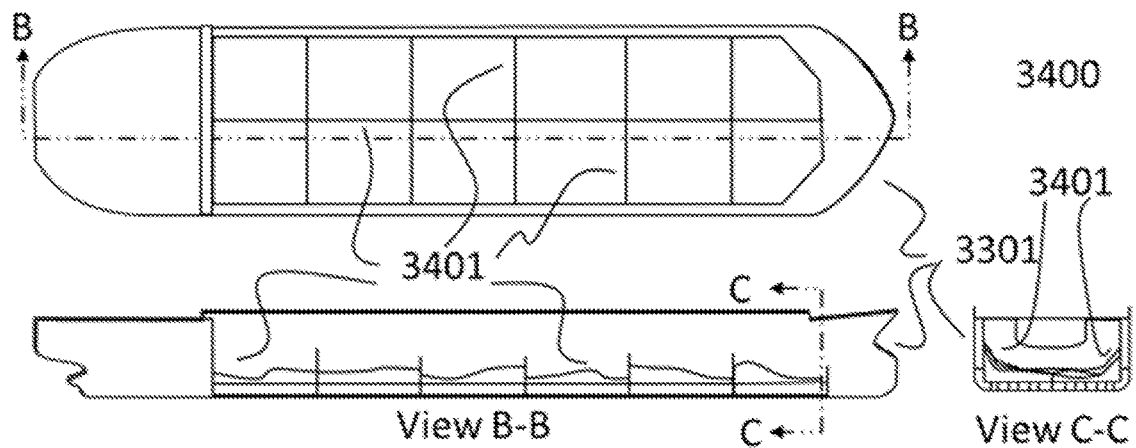
FIG. 34 is a three view orthographic projection with two views cross-sectioned of the oil tanker of FIG. 33 modified for use as a hydrothermal vent oven.

FIG. 34 is a three-dimensional view orthographic projection of a double hull tanker of 3300 with the side View B-B and front View C-C cross-sectioned hull 3301 that has been modified for use as a hydrothermal vent oven. The superstructure 3302 has been removed as well as the deck and the bulkheads 3401 separating the oil storage tanks similar to FIG. 18b. The areas between the hulls can be stuffed with insulation, e.g., material that has a lower thermal conductivity than sea water, when being used as a hydrothermal vent oven.

Figure 35:
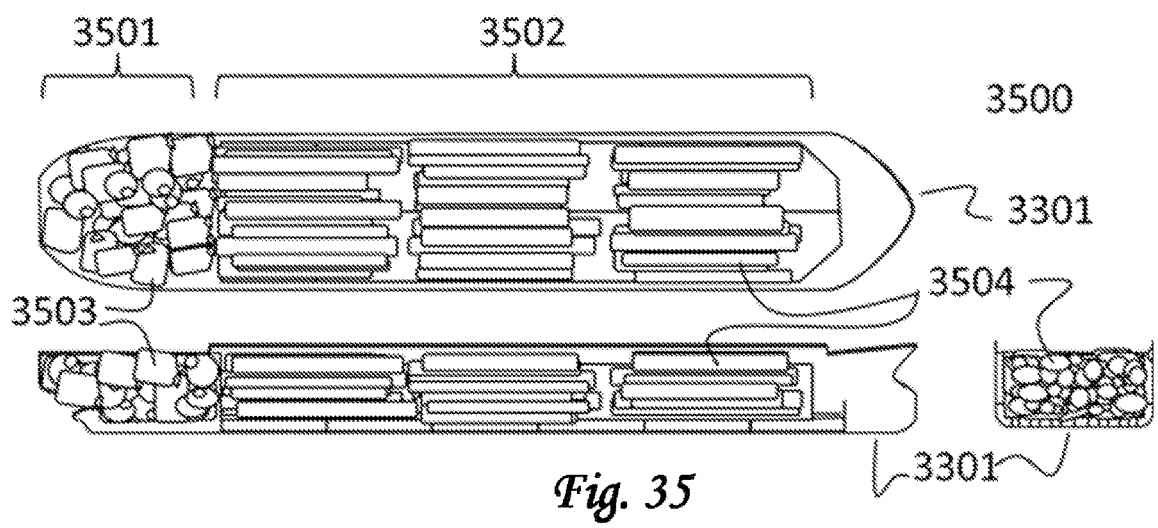
FIG. 35 is a three view orthographic projection of the hull in FIG. 34 loaded with organic matter.

FIG. 35 is the hull 3400 cross-sectioned as shown in FIG. 34 that has been loaded with organic matter. The organic matter 3501 loaded into the stern of the hull 3301 includes municipal garbage, forest litter and other organic matter in reusable or degradable organic containers 3503 for processing in the hydrothermal vent oven. The forward compartments may be loaded with logs.

Figure 36:
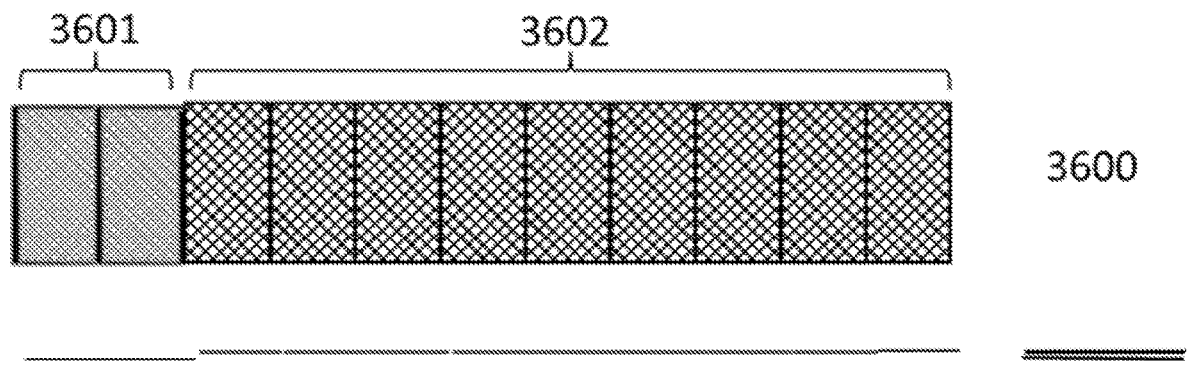
FIG. 36 is a three view orthographic projection of a set of porous hatch covers for the modified hull of FIG. 35.

FIG. 36 is a three-dimensional view of the grates used as hatch covers for the loaded hull 3500. The hatch cover grates will be sized to allow the hydrochar to pass through grate and head down toward the ocean floor while keeping the unprocessed material in the hull 3601. Some of the material processed in the hydrothermal vent ovens, including tree trunks, are likely to form a carbon skeletons of their former self. These can be broken up with high pressure water driven into the hulls or hydraulic pressure plates that will push the processed matter through the grates. The hatch cover grates 3601 are configured to function with municipal waste and forest litter while hatch covers 3602 are sturdier and configured to operate with trees or other organic matter where the remaining carbon skeletons will likely be crushed.

Figure 37:
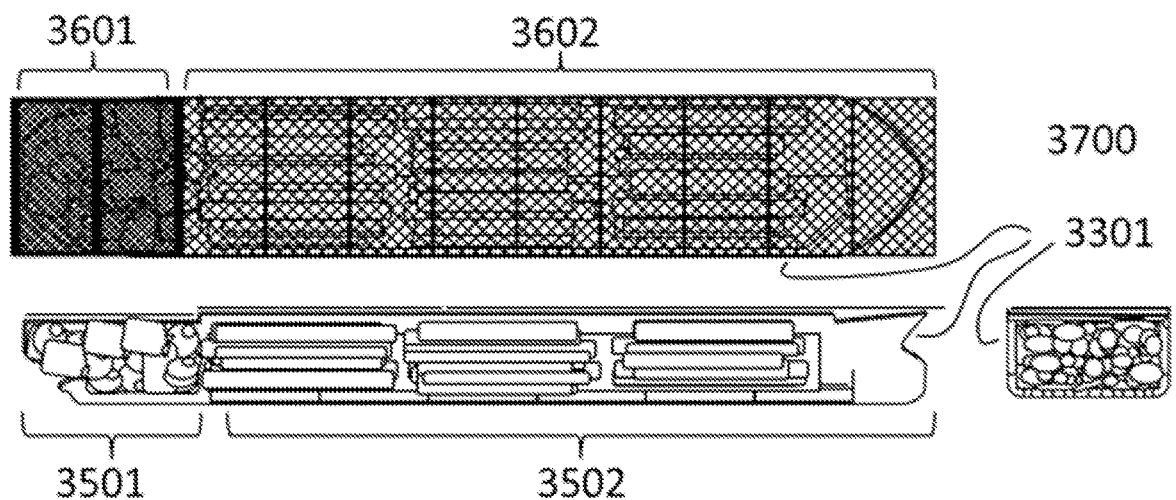
FIG. 37 is a three view orthographic projection of the loaded hull of FIG. 34 with the hatch covers securing the organic matter in the hull's hold.

FIG. 37 is the three view orthographic projection of a modified tanker hull loaded with organic matter, with hatch covers in place. The hull is cross-sectioned as was done in FIG. 35. At this point the hull can be towed to the hydrothermal vent, and submerged.

Figure 38A:
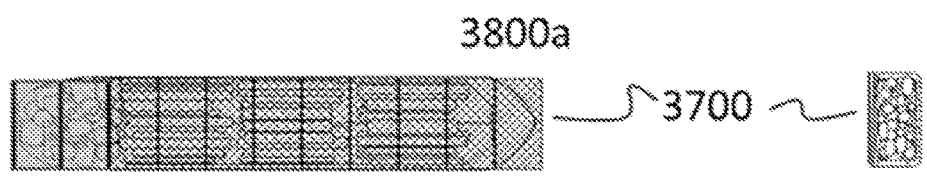
FIG. 38a is a two view orthographic projection of the hull of FIG. 37 being rolled 90°, and in FIG. 38b the hull is rolled 180° coming to rest on a raised hydrothermal vent oven platform for processing the organic matter into hydrochar.

FIG. 38a is a two view orthographic projection 3800a of the tanker hull loaded with organic matter 3700 and rolled over 90° on the way down to hydrothermal oven processing center 3800b.

Figure 38B:
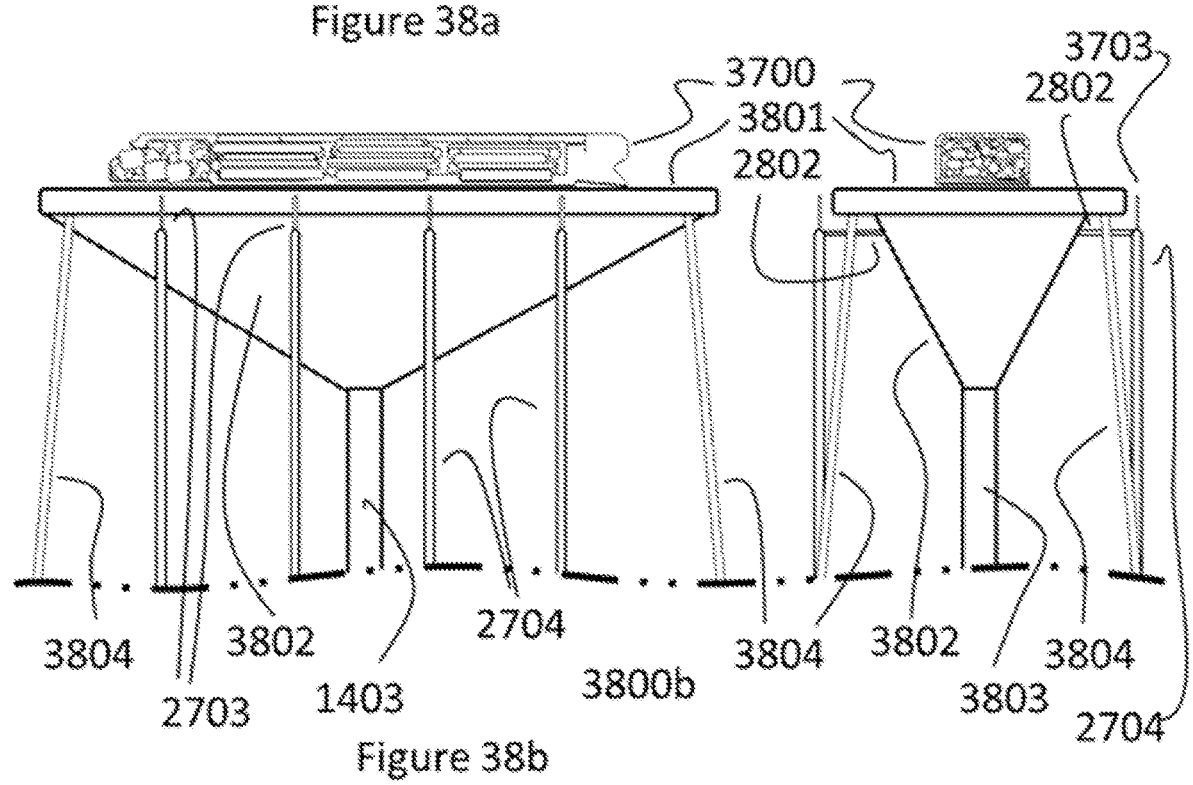

FIG. 38b is a raised hydrothermal vent oven platform 3801 configured to support a hydrothermal vent oven. In configuration 3700, the hull is rotated 180° and is now resting with the hatches 3600 facing down. The interface between the hydrothermal vent oven 1300 and the oven platform 3701 is not shown but normally a grate similar to 4104 or 3602 would be used. The oven platform 3801 is supported above the bottom of the ocean by legs 3804. This may be done to reduce the amount of oil or combustible gas that is generated. It also makes it easier to retrieve the reusable hydrothermal oven parts 3400-3600-3700 for processing more loads of organic material. Under the platform is a funnel device 3702 configured to direct the char that results from this operation into a tube 3803 that will release the char near the ocean floor.

The energy for processing the organic material in the hydrothermal vent oven 3700 is derived from eight coaxial borehole riser tubes 2704 with the hot water tube 2802 mounted through the funnel 3802 walls and released into the hydrothermal vent oven 3700 through the grates 3600. The water for entering the coaxial riser tube through tube 2703 is shown coming from the surrounding waters but could be coming from the heated water in the hydro thermal vent oven 3700.

Storing Hydrothermal Energy

FIG. 39 is a hydrothermal vent hot water storage unit 3900. The storage unit is configured to store the output of natural hydrothermal vents or borehole hydrothermal vents. As shown, there are two borehole energy supplies located outside the borehole each including a coaxial riser pipe 2704 coming up from a bore hole in the ocean floor 2703 and an incoming water supply going down to the borehole 2703. The incoming water to the bore hole is being supplied from a coaxial riser pipe 3008 with the water from the outside pipe 2902 supplying warm water to borehole input 2703. The output from these two external high temperature water sources is fed into the chamber through pipe 2702. These sources supply the water inside the chamber.

A third borehole hydrothermal vent heat source inside the storage unit with the tube 2704 may be connected to a bore hole, with the hot water from the bore hole exiting pipe 2802 inside the storage chamber. The input to the borehole hydrothermal vent may come from inside the storage unit. This heat source recirculates the water in the storage unit through the hydrothermal vent bore hole keeping the stored water hot. The output of the energy storage unit is through tube 2906 that has insulation 3007 and is the center pipe in a coaxial configuration which includes pipe 2902 and its insulation 3008.

Figures 39A, 39B, 39C:
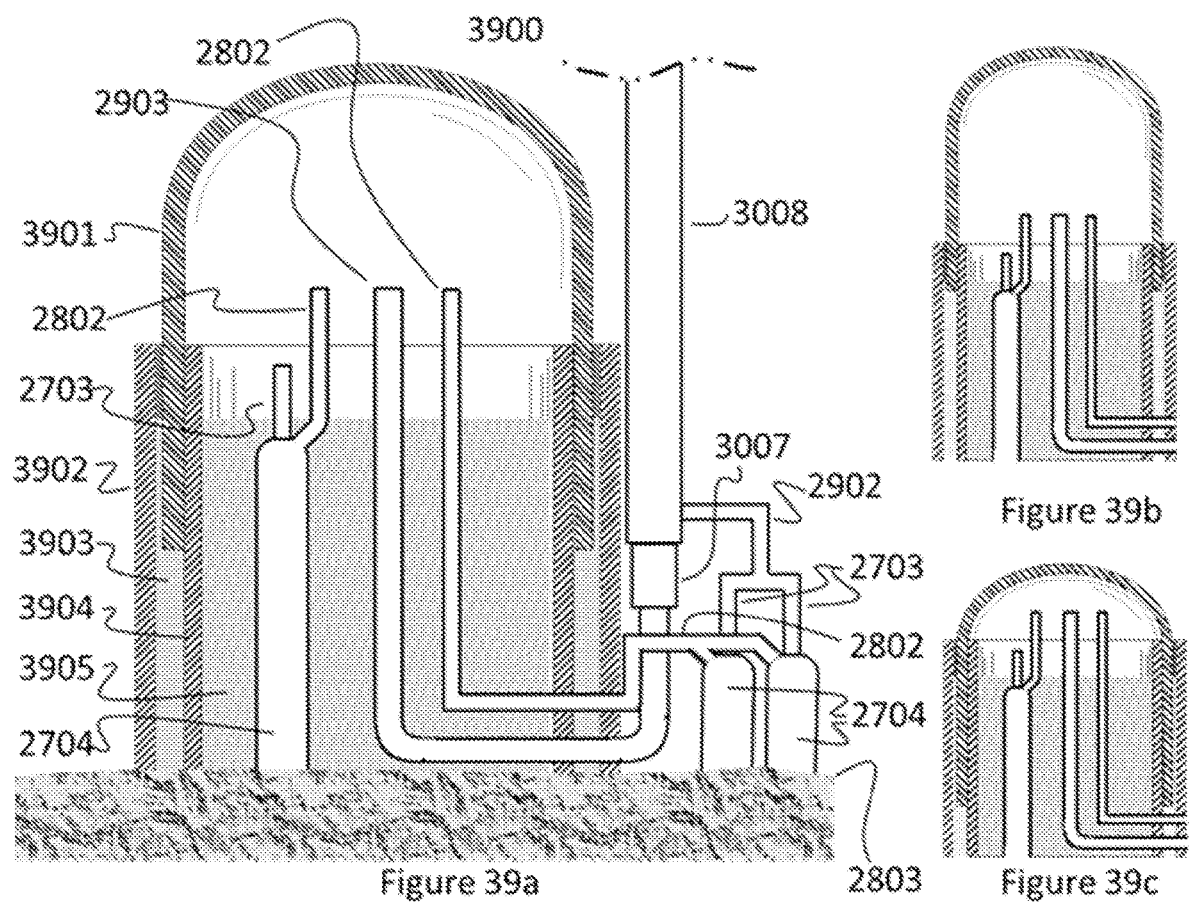
FIGS. 39A-39B-39C show cross-section views of a storage facility for storing hot, superheated, or supercritical water heated by the hydrothermal vents for later use. These facilities can be huge with buoyancy added to the dome to lower the pressure underneath the dome when filled with hot water.

The housing for the hydrothermal energy storage 3901-3902-3904 are shown in cross-section and may include an outside wall 3902, an inside wall 3904, a movable dome 3901 that rises and falls to accommodate more or less volume, and/or other components. Inside the inside wall 3904 a filler 3905 is used to reduce the amount of space for storing heated water that would be difficult to access when the dome 3901 is at its minimum height as shown in FIG. 39c. FIG. 39a shows the housing in mid-range. FIG. 39b shows the oven near full extension. Between the inner wall 3904 and the outer wall 3902 a sealant 3903 similar to drilling mud, will be used to minimize the loss of energy through the crack between the inner wall 3904 and the moving dome 3901 and between the outer wall 3902 and the dome 3901. The hot water coming out of hydrothermal vents pipe 2802 is in one of three states. It can be hot water that is below its boiling point, it can be above its boiling point, or it can be at supercritical water.

When the energy storage unit 3900 is being used for storing energy in the form of hot water, the storage unit can be very large. The water inside the dome is likely to be only slightly less dense than the surrounding water. Small amounts of ballast and buoyancy can be added to relieve stress on the structure. A storage unit that is to contain energy in the form of steam or supercritical water will require a relatively heavy dome to contain the steam or supercritical water. The ballast requirements can be reduced by increasing the height to diameter ration of the dome. The domain of supercritical water 2503 is shown in the lower right hand corner of FIG. 2. In this state the liquid and vapor stages of water are indistinguishable, and the water takes on new properties including the loss of polarity, the ability to penetrate porous solids, and much faster oxidation. The density of the supercritical water will be about one-third of the water surrounding it. In nature supercritical water forms the black smoker type of hydrothermal vent. A storage unit for storing supercritical water will need a sufficiently heavy dome to keep the supercritical water compressed. The sealant 3903, fill 3905 and base 2703 will need to be configured to minimize energy loss due to the supercritical water's ability to penetrate porous solids. The structure and plumbing will need to be evaluated for corrosion failure since the supercritical water is a highly aggressive oxidant.

Figure 40:
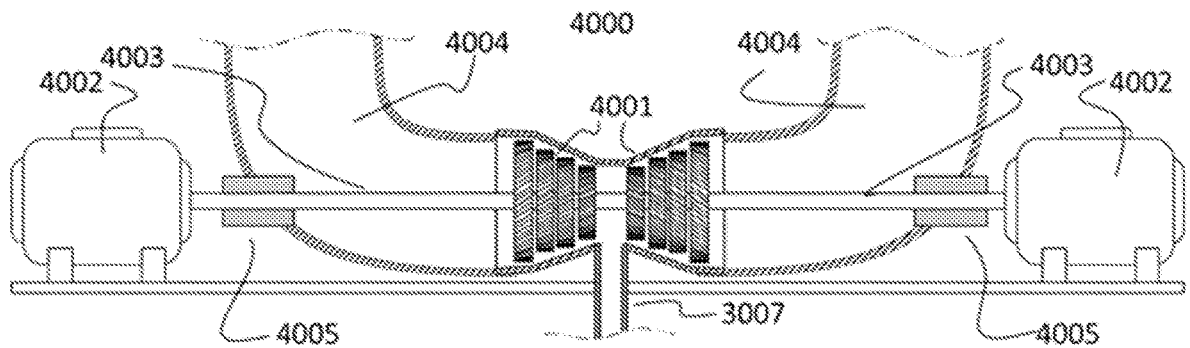
FIG. 40 is a steam turbine driving a set of electrical generators, a typical application for high pressure steam coming from hydrothermal vents or a hot or supercritical water storage facility.

A common use of high pressure steam is to power steam turbines that drive generators for the production of electricity. FIG. 40 is a typical steam turbine set up. The high pressure steam for the turbines 4001 enters the system through pipe 3007 and passes through turbines 4001 with housings in cross-section on either side of entrance pipe 3007 causing turbines 4001 to turn shaft 4003. Shaft 4003 passes through bushings 4005 and drives the two electrical generators 4002. The steam that entered through pipe 3007 will exit through ducts 4004. The ability to safely store the energy at the bottom of the sea at high pressure and have it available on demand may help to commercialize the use of hydrothermal vent energy to provide electrical power. The electrical generator of FIG. 40 may provide electrical power for the electrolysis equipment of FIG. 49.

Large Scale Effort on Semisubmersible Platforms

The primary focus of the coalification process is to reduce the $CO_2$ levels in the atmosphere by preventing organic carbon from reentering the atmosphere as $CO_2$ which occurs with virtually all organic matter through combustion or consumption by microbes with both methods releasing the carbon as $CO_2$ into the atmosphere. The anthropogenic carbon dioxide release as a result of burning fossil fuel is in the range of 36 Giga Ton (GT) to 40 GT a year.

The World Bank Group 2018 report "WHAT A WASTE 2.0" concluded that "the world generates 2.01 billion tonnes of municipal solid waste annually." Some of the garbage is burned to produce energy for heating or the generation of electricity with its carbon released as atmospheric carbon dioxide. Some of it is too wet to burn and requires more energy to heat it up than it releases when it burns. If the carbon content of municipal garbage is 10% by weight and if half the World's municipal garbage could be processed into hydrochar, 1% of the World's annual anthropogenic $CO_2$ emissions would be sequestered.

A study led by T. W. Crowther of Yale School of Forestry and Environmental Studies concluded that there are 3.04 Trillion trees over 10 cm (4") diameter at breast height (DBH). Statistics on the amount of carbon stored in an "average tree" that dies and is not part of a harvest are not available. Tree's carbon density varies significantly form high density teak, to hardwood, to pines, to low density palm trees. While the average dying tree is an unknown; it could be a 100 year old conifer, with a 65 mm DBH, weighing over 3 metric tons and sequestering enough carbon to release 4 metric tons of $CO_2$ into the atmosphere if burned or allowed to rot with consumption by microbes releasing $CO_2$ into the atmosphere. There would be some 30.4 billion such "average trees" dying every year some of which will be harvested for construction or energy generation. If 30% of these conceptual "average trees" were processed through coalification, it would mean that over 9 billion trees would be processed per year, over 36 GT of $CO_2$ would be kept out of the atmosphere, and the Earth would basically be carbon neutral. If the hydrothermal borehole vent ovens were able to handle the equivalent of 2500 "average trees" a day, the world would need 10,000 ovens in operation year round. These are rough estimates but point out that the atmospheric $CO_2$ concentration could be controlled as described herein and that an operation capable of doing so would be huge.

Figure 41:
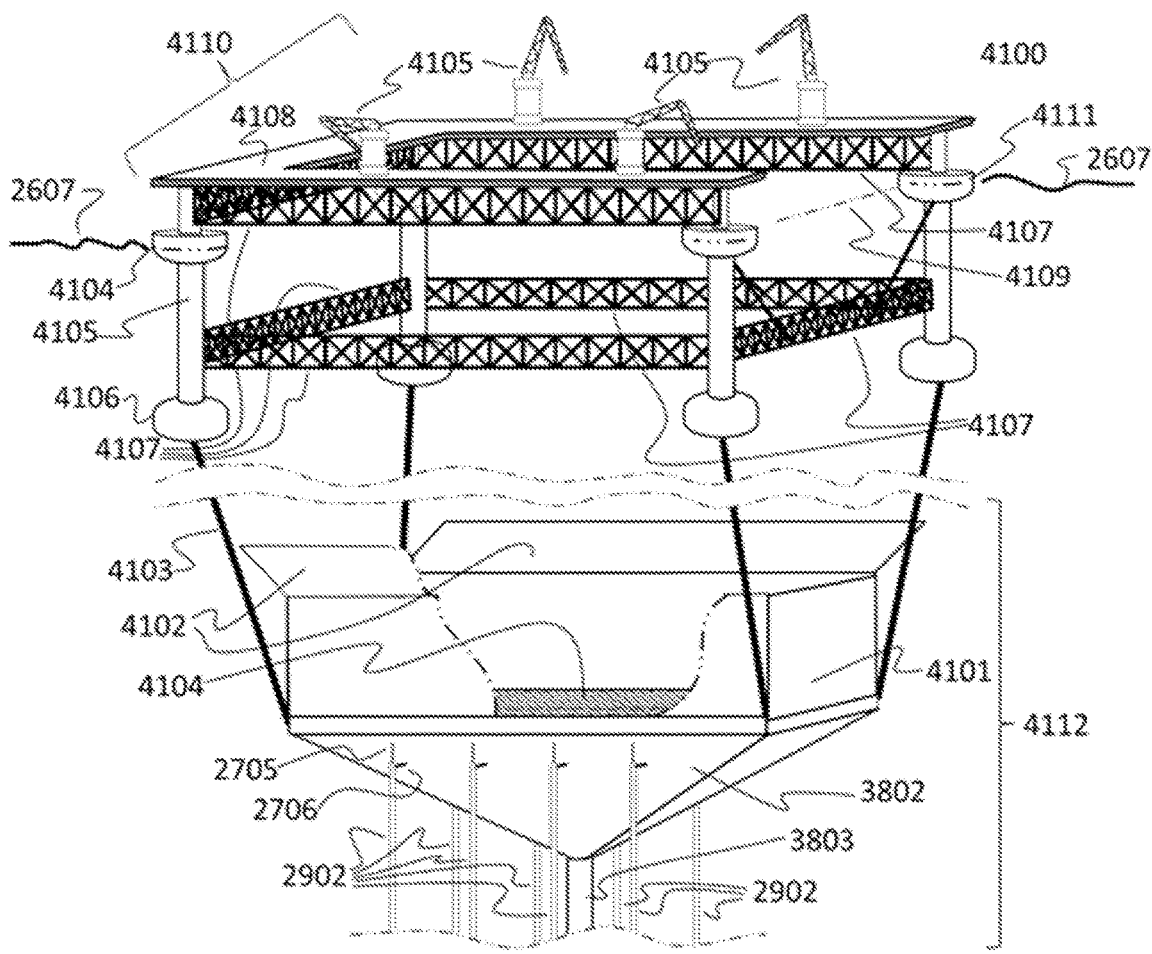
FIG. 41 is a semisubmersible that is suspending a top loading hydrothermal oven above the ocean floor for processing organic matter into hydrochar with the energy from hydrothermal vents.

FIG. 41 illustrates a large coalification processing center. It is a highly stable semisubmersible, similar to those used in the petroleum industry, configured to be moored at sea above an operating hydrothermal vent area. This type of platform commonly includes living facilities, life boats, navigation equipment and other amenities as well as items common to wharfs for the loading and unloading of ships. In some implementations, the semisubmersible platform may include four corner supports including float tank 4104, column 4105, ballast tank 4106, and/or other components. The four columns are connected with structural supports 4107. The platform floats with its waterlines 4111 at sea level 2607 under a wide range of conditions by adjusting the amount of ballast in the columns 4105 and ballast tanks 4106. The above water area of the semisubmersible 4110 includes a deck 4108 supported by structural supports 4107 and cranes 4105 mounted on the deck for moving cargo. One section of the upper platform 4110 has been left open 4109 for easy entrance of ships, barges, or rafts of organic matter that will be processed.

The lower section of 4100 is a hydrothermal borehole vent oven 4112 suspended from the semisubmersible by cables 4103. The hydrothermal oven as shown has four walls 4101 a porous grated bottom 4104, and a lid 4102 that is configured to open and close as needed. The oven 4112 also has a funnel shaped collector 3802 below the bottom grate 4104 configured to direct the hydrochar from the coalification process down pipe 3803 to the ocean floor. The heated water for the coalification process is coming up from the hydrothermal borehole vent in coaxial tube 2902 with the heated water 2706 going through the walls of the funnel 3802 to be released under the grate 4101. The return water 2705 for this configuration is coming from inside the funnel area.

Figure 42:
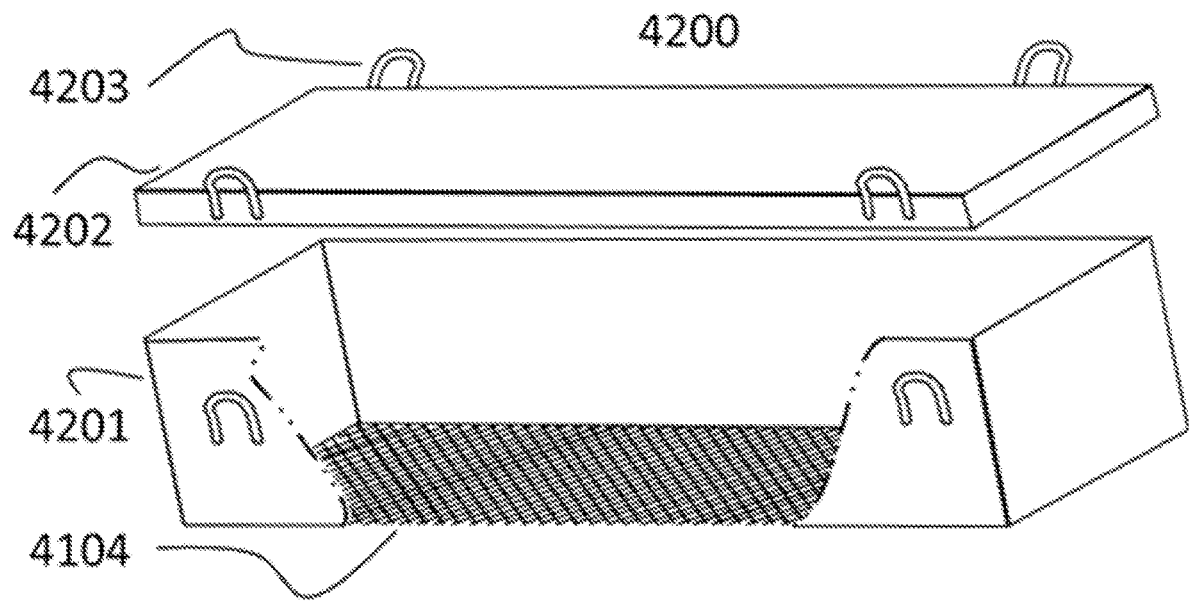
FIG. 42 is a reusable container and cover for loading organic matter onto a hydro thermal vent oven of FIG. 38 or FIG. 41. The cover is weighted so that buoyant organic material like household plastics or logs that are not waterlogged, can be processed on the deep sea hydrothermal.

FIG. 42 is a container 4200 with a heavy lid 4802 for moving floating logs or other material down to the hydrothermal oven 4112. The container has sides 4201, part of which have been cut away to show grating 4104 that makes up the bottom of the container. Both container 4201 and the heavy lids 4202 have lifting eyes 4203 for use with cranes 4105. Multiple containers will be making their way down to and up from hydrothermal vent platform of FIG. 41 at any given time. The containers can be loaded at the location where the transport ships pick up the load of logs or other organic matter with the heavy lids added by the cranes 4105 at the operating deck 4110.

Figure 43:
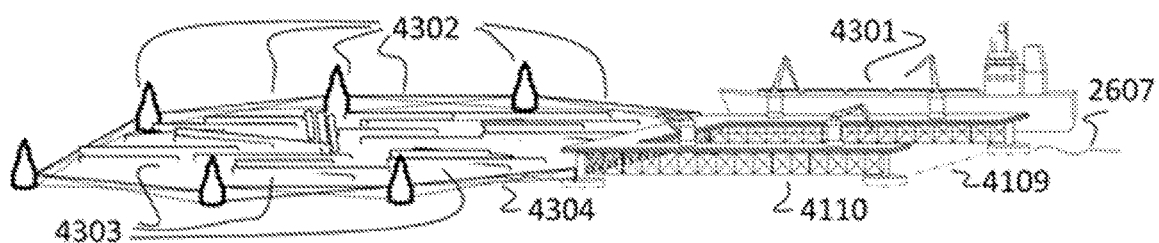
FIG. 43 is an operation at the sea surface supporting the coalification process. There is a ship at the semisubmersible platform of FIG. 43 unloading organic matter and a corral for floating logs or rafts of that are waiting to be processed.

FIG. 43 is a surface view of the operation portion of FIG. 41. A cargo ship 4301 unloads organic matter to the processing center 4110. The processing center 4010 has a corral 4304 made up of buoys and barriers 4342 and netting below the barriers to minimize the sinking of logs in the wrong place. The corral holds rafts or logs 4303 for later processing. The energy that powers the coalification processing center of FIG. 43 is a 24/7 operation. Having a storage area like the corral may maintain the efficiency of the operation. Log or bamboo rafts towed to the processing center 4110 will contain massive amounts organic matter to be processed. These rafts will be brought in to the processing center 4110 through the entrance 4109, and into the corral 4604 before or after being disassembled in the processing center 4110.

Log rafts have proven to be effective in moving large quantities of logs. Between 1906 and 1941, Benson's Saw Mill located in the Barrio Logan section of San Diego Calif. moved 120 large log rafts from the Columbia River in Oregon to San Diego, some 1000 miles by sea. The largest rafts contained 19,000 m3 of logs that if processed as described herein, into hydrochar, would sequester enough carbon to account for all of the anthropogenic $CO_2$ generated in the US in a day.

Figure 44:
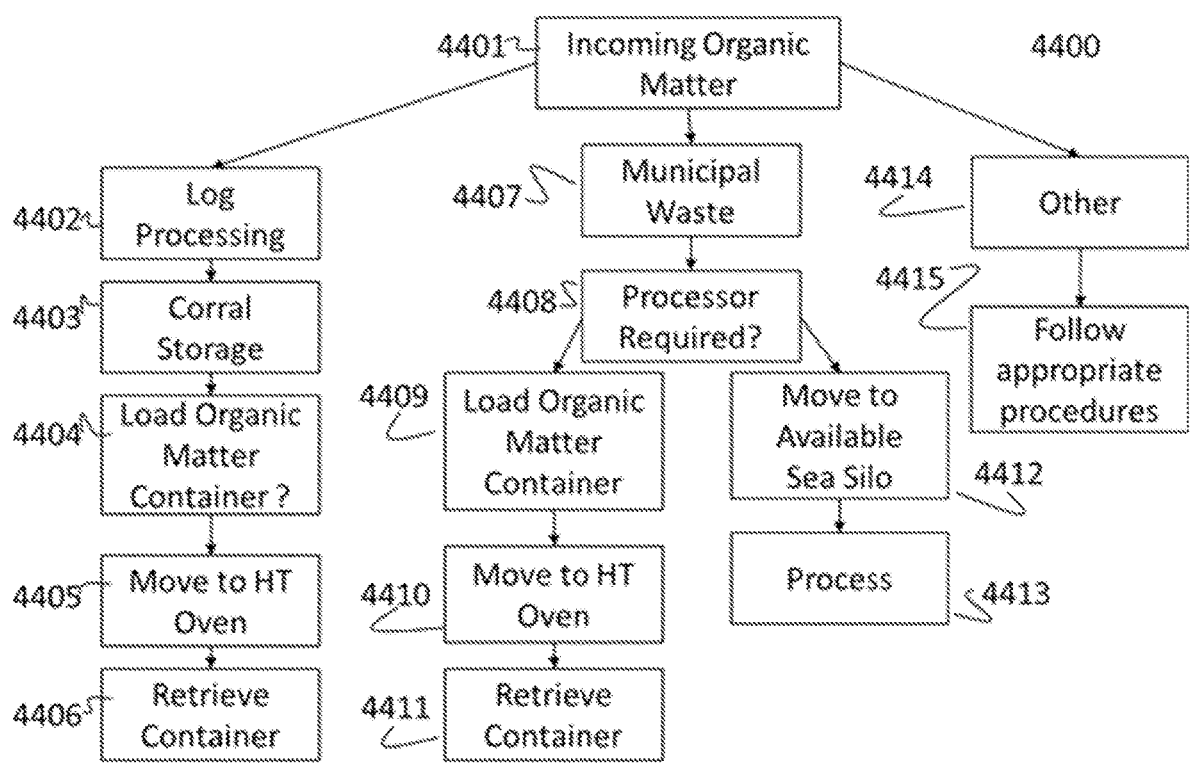
FIG. 44 is a block diagram of typical operation of the equipment of FIG. 43.

FIG. 44 is an operational block diagram of the system described in FIG. 41, FIG. 42, and FIG. 43. The initial evaluation 4401 will divide the incoming organic matter into log processing 4402, municipal waste 4407, or other 4414. For log processing 4402 the logs will normally first go to Corral Storage 4403 and allowed the organic matter to take on water while waiting to be processed. The logs will then be loaded into an organic matter container 4404, if need be, and moved to the hydrothermal oven 4405. If a container or just the container weighted lid is used, it will be retrieved 4406 after the log processing is complete. Municipal waste 4407 may be better handled through the sea silos 4512 and hydrothermal ovens with restricted flow might be more appropriate for processing 4413. Municipal trash can be loaded into containers 4409 moved to the hydrothermal vent ovens 4410 for processing and the container retrieved 4411 when done.

There may be special cases like medical waste, drug seizures, high temperature plastics, were special handling 4414 and procedures 4415 are desirable. Also, there is organic matter that can be sunk or be pushed down to the bottom of the ocean where it can decompose without the emission of significant greenhouse gasses using the coalification process described herein. Unlike the organic material that has been through the coalification process, unprocessed organic matter may take hundreds of years to decay and is likely to releasing oil, combustible gases, or carbon dioxide during that process.

Rain Cloud Generation

Figures 45A, 45B:
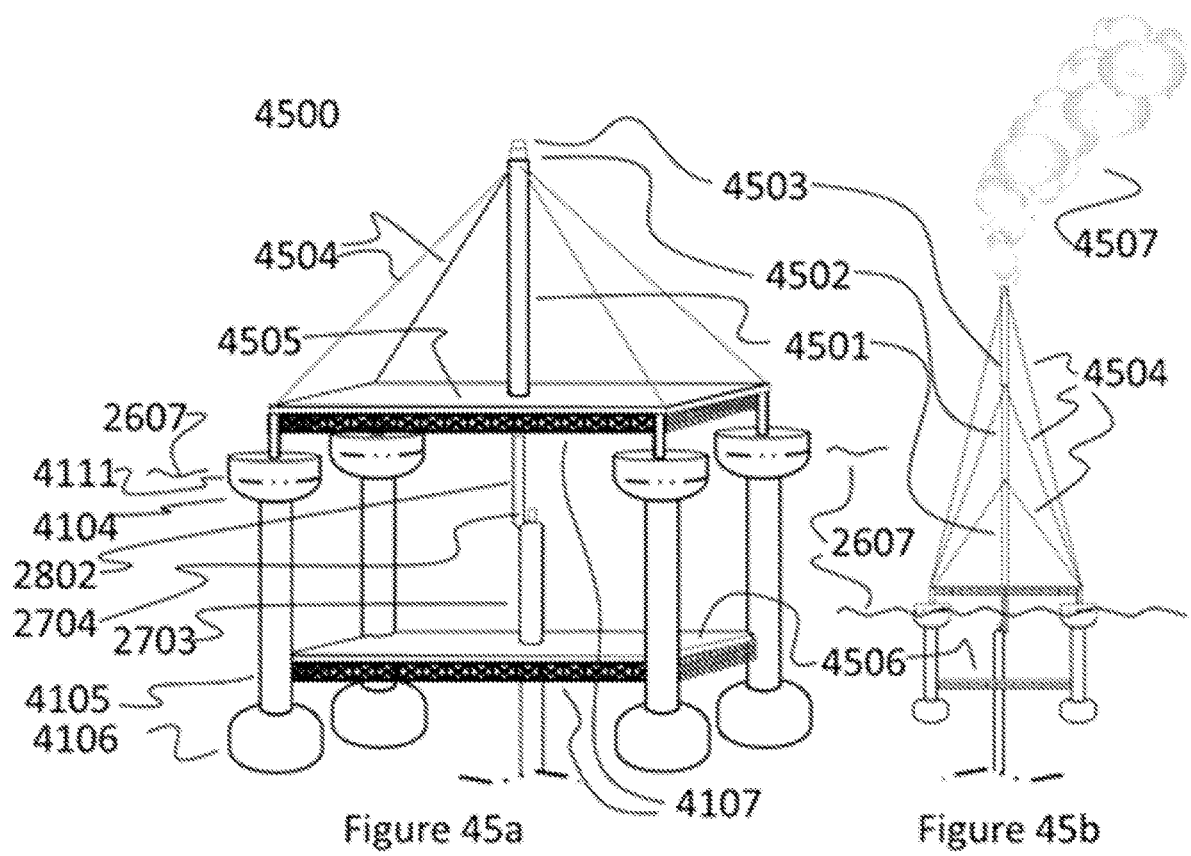
FIGS. 45A-45B illustrate a semisubmersible set up to initiating rain clouds far above the ocean's surface for the purpose of providing rain to areas down wind of the initiation site.

FIG. 45 depicts a mid-altitude cloud generating system with two views of configuration 4500. The semisubmersible platform may be designed with four corner supports including float tank 4104, column 4105, ballast tank 4106, and/or other components. The four columns may be connected with structural supports 4107. The platform floats with its waterlines 4111 at sea level 2607 under a wide range of conditions by adjusting the amount of ballast in the columns 4105 and ballast tanks 4106. The platform has an upper deck 4505 and a submerged deck 4506. An extendible mast system may include multiple concentric masts 4501-4502-4503 with each mast stabilized near the top with four shrouds 4504. When needed, further mast supports including but not limited to spreaders, shrouds, and jack stays may be added. The extended mast system will typically be in the 1000 to 3000 foot range. The flow controls will be located near the deck 4505 with the incoming steam from 2704 likely to be coming from the evaporation controls of FIG. 30 to maximize the volume of water vaper from exhaust tube 4503. The typical pressure range at the bottom of the masts will be in the 5 pounds per square inch (psi) to 200 psi range. In FIG. 45 the return water going down to the borehole 2705 is coming from the oceans relatively warm surface water through tube 2703. The steam leaving the top of the mast will form rain clouds at an elevation were the prevailing winds are strong enough to move the clouds over the coastal mountains. The mountains are often associated with tectonic plate movement that also generates hydrothermal vent fields. Many places in the world include hydrothermal vent fields near a coast where mountains have been pushed up hindering rainclouds from moving inland with the prevailing winds including, but not limited to the west coasts of British Columbia, Canada; Washington, Oregon, and California in the USA; the Mexican states of Baha California, Baja California Sur, Sonora, Sinaloa, Nayarit, Jalisco, Colima, Michoacan, Guerrero, Oaxaca, and Chiapas; as well as the entire Central American "Dry Corridor". The collision of the tectonic plates causes the mountains on the continent to rise. The differential movement of the tectonic plates results in the irruption of hydrothermal vents when the magma fills in the gap between the shifting plates. While there are many locations were the system operation could be described perhaps the most interesting is the Middle East.

Figure 46:
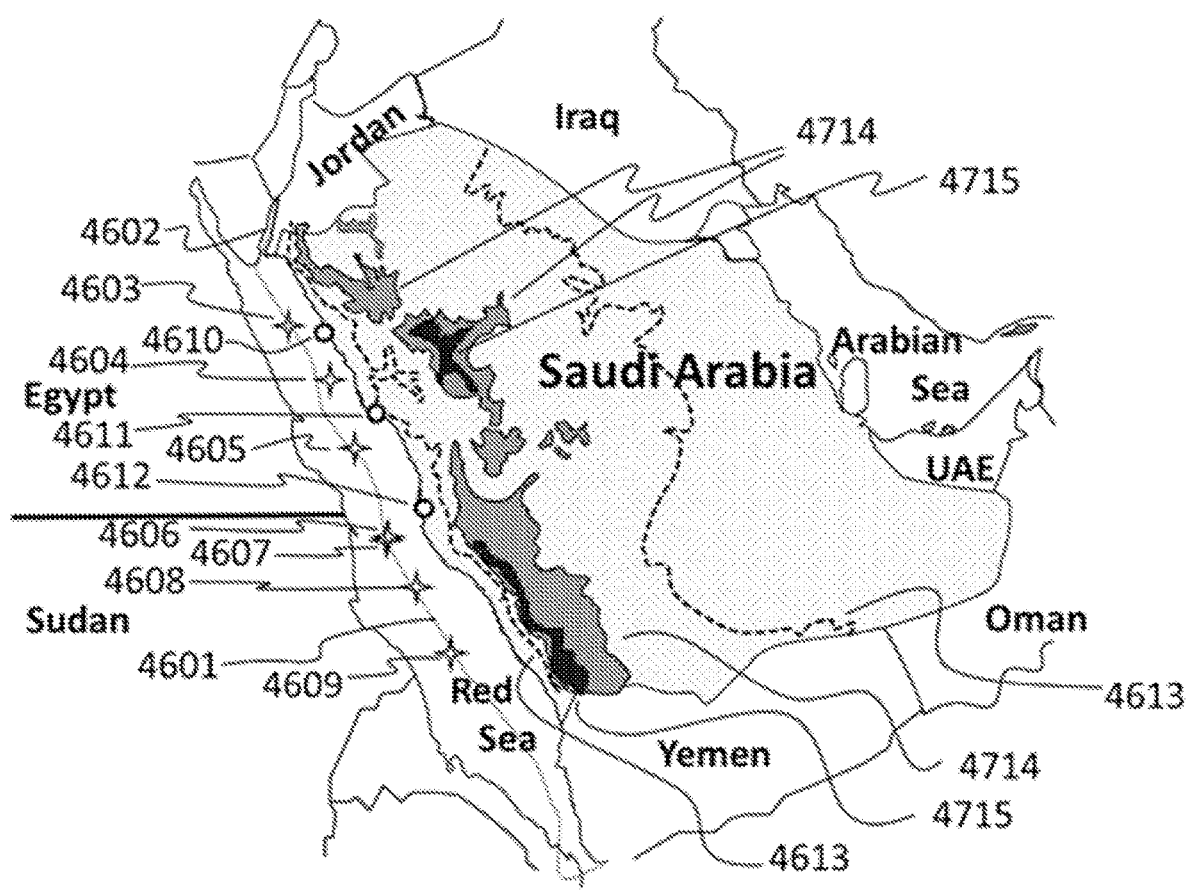
FIG. 46 is a topographical map of Saudi Arabia showing major obstacles to the movement of clouds moving east from the Red Sea.

FIG. 46 depicts the Red Sea and the surrounding area. The Red Sea Rift 4601 connects Dead Sea Transform 4602 a rift in the Gulf of Aqaba and runs down the middle of the Red Sea. Seven hydrothermal vent fields 4603-4604-4605-4606-4607-4608 and 4609 have been discovered in the Red Sea and are listed in FIG. 47 along with the name of the field, the jurisdiction, the position, the depth, and the spreading rate. The Red Sea Rift is spreading NNE to SSW and the Saudi Arabian plate is twisting CCW at a tectonic plate rate. Research efforts over the last decade have resulted in detailed mapping of the Red Sea floor.

The Saudi Arabian land elevation in FIG. 46 below 1 km (3280 ft.) has a white background with black dots. There is a dashed line ( - - - ) 4613 running through this area that indicates 200 m (656 ft) above sea level with lower ground down toward the Red Sea in the west and the Arabian Sea in the east. Higher land is located between the dashed line 4613 and the higher elevations indicated by an area with checker board squares 4714. The elevation of the land in checker board squares 4714 is between 1 km (3280 ft.) and 2 km (6560 ft.). The black area with white dots 2315 is above 2 km.

FIG. 48 is the table of prevailing wind direction at various places in Saudi Arabia. The monitoring stations are for the most part, airports. The wind at airports is typically measured 30 feet off the ground. The position of three of the monitoring stations Wdijh 4610, Yenbo 4611, and Jeddah-KAIA 4612 are identified on FIG. 48 by their reference numbers. Yenbo 4611 reported the prevailing winds out of the west for all twelve months for the year, Jeddah 4612 for nine of the twelve months and Wdijh 4610 for six of the twelve months.

Referring to FIG. 46, there is a gap in the coastal mountains east of Wdijh 4610. Another gap east of the area between Yenbo 4611 and Jeddah 4612 roughly follows the Naid Fault Zone. These gaps would reduce the impedance for rainclouds developed over the Red Sea to be moved inland over the mountains eastwards by the prevailing westerly wind. The probability of locating magma dykes in the area of interest that could be tapped to supply the needed thermal energy for generating clouds is elevated by the proximity of hydrothermal vent fields 4603 through 4607.

Hot Superheated and Supercritical Water Electrolysis

Figure 49:
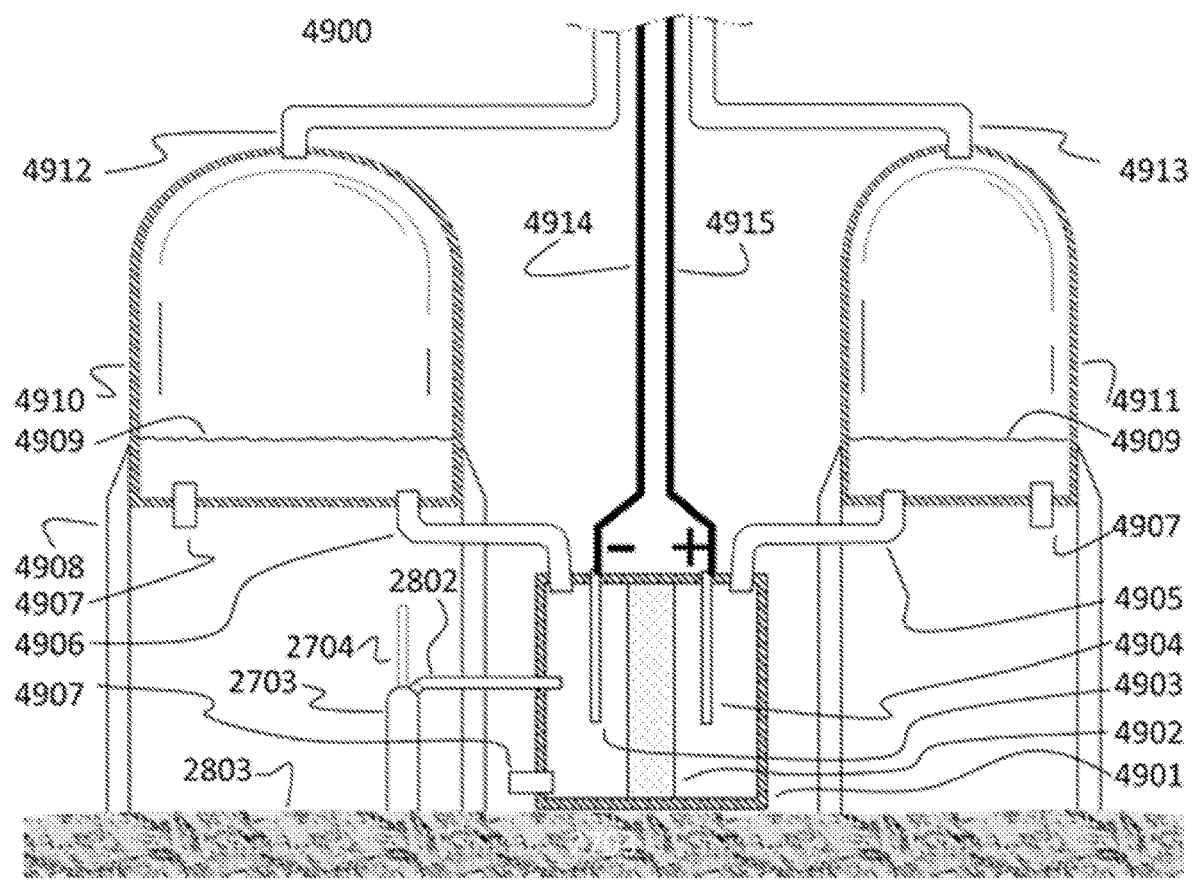
FIG. 49 is an electrolysis unit configured to operate on the seafloor. It has a high pressure storage unit for both hydrogen and oxygen operating at the pressure of the water surrounding the storage unit.

FIG. 49 is a depiction of electrolysis equipment that is configured to process water at the bottom 2803 of the sea using water heated from the hydrothermal boreholes vent or natural vents supplied through pipes 2704 going down to the hydrothermal borehole vent and pipe 2802 out of the vent and into chamber 4901. The incoming water to the borehole heating unit through pipe 2703 is shown coming from local open water source but is likely to be coming from the electrolysis chamber 2701. The efficiency of electrolysis systems generally improve significantly if the water in the electrolysis chamber is above the critical point for water, temperature above 373.946° C. and pressure above 217.75 atmospheres.

The electrolysis chamber 4901 and storage tanks 4910-4911 are anchored to the sea floor 403 directly or through supports 2008. Chamber 4901 contains a separator 4902, anode 4904, and cathode 4903. Electrical power is fed into the chamber with positive polarity 4915 connected to anode 4904 and negative polarity connection 4914 connected to cathode 4903. The oxygen generated in electrolysis chamber 4901 near anode 4904 will exit the chamber through pipe 4905 for storage in tank 4911. The hydrogen generated near cathode 4903 will exit tank 4901 through pipe 4906 for storage in tank 4910. From tanks 4910-4911 the oxygen and hydrogen will be delivered to its point of use, normally above sea level, through pipes 4913 for the stored oxygen in tank 4911 and though pipe 4912 for the hydrogen stored in tank 4910.

The pressure in storage tanks 4910-4911 will be fairly constant with the volume being changed by the rise or fall of water level 4909 independently in the tanks. Storage tanks 4910-4911 and the electrolysis tank 2501 all have a connection to the ocean at the bottom of tank 4907. The vents 4907 facilitate increases and decreases in the amount of water in the tanks. It is expected that small amounts of char and/or tar will develop in the tanks during normal operation. The tubes 4907 will allow material that settles in the bottom of the tanks 4910-4911-4901 to leave the tanks.

Wind Powered Electric Power Generation at Sea

Electrolysis requiring electrical power can be done anyplace on the ocean. Supercritical water electrolysis as depicted in FIG. 49 occurs at depths of approximately 7000 feet or more below the ocean's surface. The ocean floor at those depths is generally a significant distance from land. Equipment can be operated in mid-ocean waters with mooring cables going out to several wide spread points on the ocean's floor. FIGS. 50-54 describe systems configured to supply electrical energy at sea by harnessing wind power.

Figure 50:
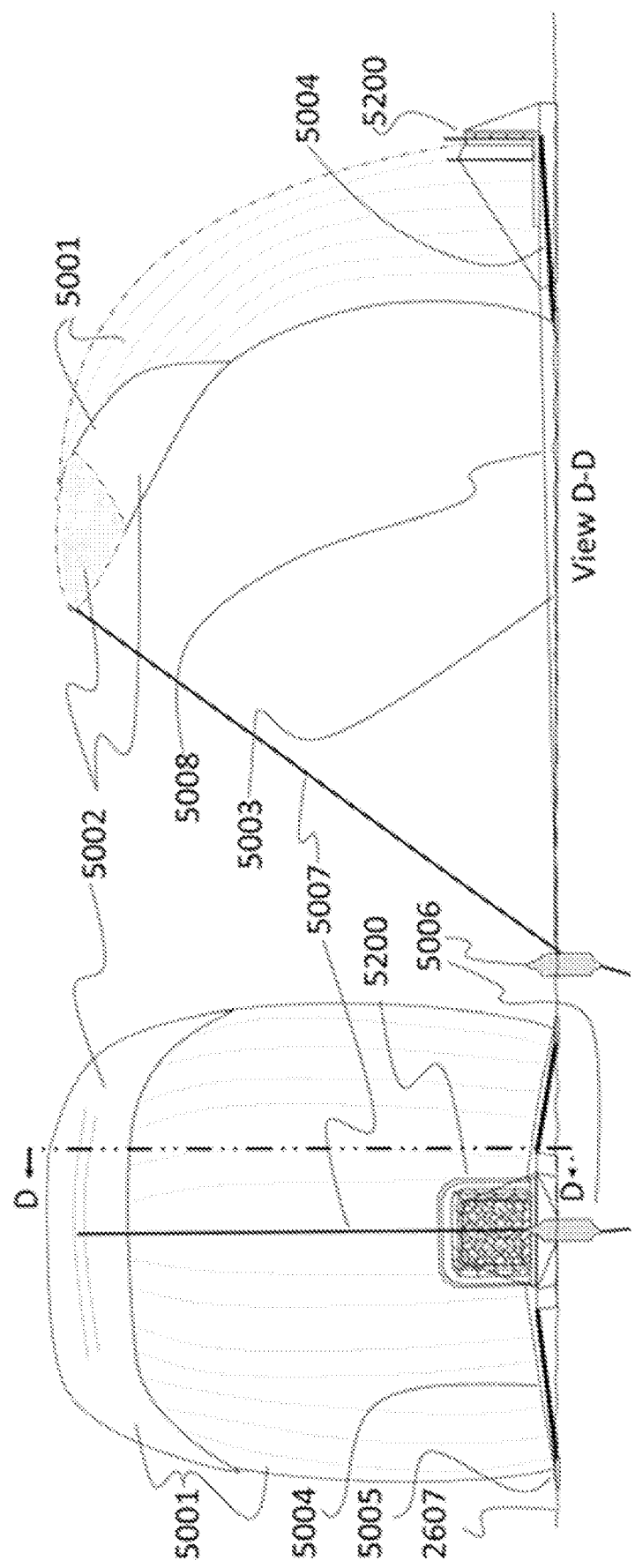
FIG. 50 is a wind powered electrical generating barge of the type needed to drive the electrolysis system of FIG. 49. A massive spinnaker is used to concentrate the winds energy.

FIG. 50 depicts the system fully deployed wind powered electrical generating system with a large spinnaker like sail 5001 funneling wind down to a wind tunnel 5200 with wind powered turbine electrical generators 5401. Barge 5101-5102 in FIG. 50 is connected to a mooring at buoy 5006 with the bow of the barge toward the mooring with bow line 5008 connecting the bow of the barge to buoy 5206. In View D-D of FIG. 50 the spinnaker is cross-sectioned along the area line (—··—··—) revealing the inside of the starboard half of the spinnaker. Normally at sea, there is not enough wind to continuously support a spinnaker of the size shown. The top part of spinnaker 5001 contains a balloon like enclosure 5002 that can be filled with enough hydrogen or helium to keep spinnaker 5001 aloft with no wind at all. A forestay 5007 is connected to the upper section of spinnaker 5001 and buoy 5007. Forestay 5007 and bow line 5008 and a line 5003 between the spinnaker pole 5004 and buoy 5006 as well as the possession of the spinnaker clew or corner and the end of the spinnaker pole 5004 are adjusted to control the shape of spinnaker 5001. There are two spinnaker poles 5004, one leading from the port side of the boat and the other from starboard side of the barge out to the corner or clew of the spinnaker with the outside of the spinnaker pole attached to a float 5005 that will prevent the outside ends of spinnaker pole 5004 from sinking in light or no wind. The floats 5005 and the outer end of the spinnaker poles 5004 are connected together. The spinnaker clews are connected to tracks on the spinnaker poles allowing the clews to move from the storage position to the end of the spinnaker poles. The outer ends of the spinnaker poles are connected to buoy 5006 by a rope or pole-guy 2603 that along with bow line 5008 will be adjusted to optimize the wind going through the wind tunnel of 5200.

Figure 51A:
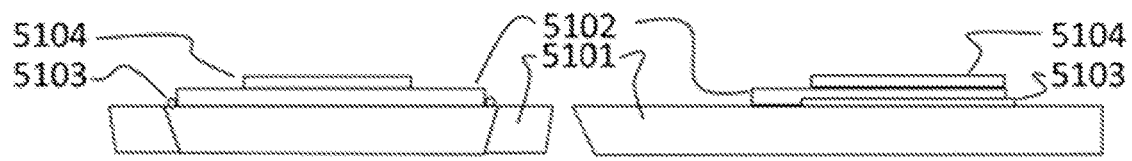
FIGS. 51A-51B-51C illustrate three phases of operation for the wind to electricity barge of FIG. 50 with hatches battened down in FIG. 50A for storms or storage; masts up ready to lift wind turbines in FIG. 50B.
Figure 51B:
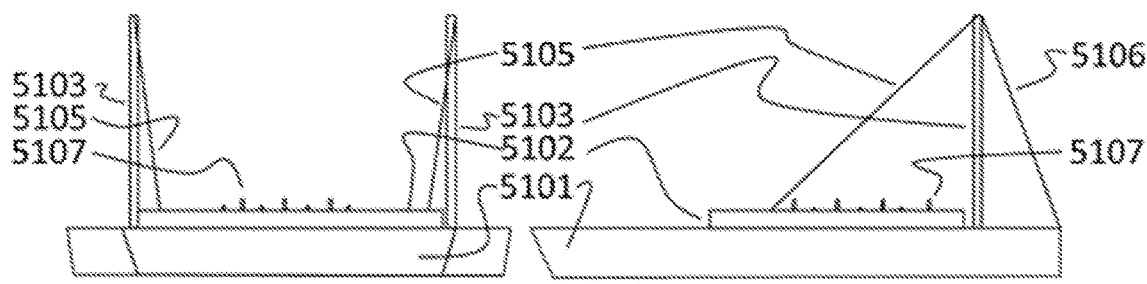
Figure 51C:
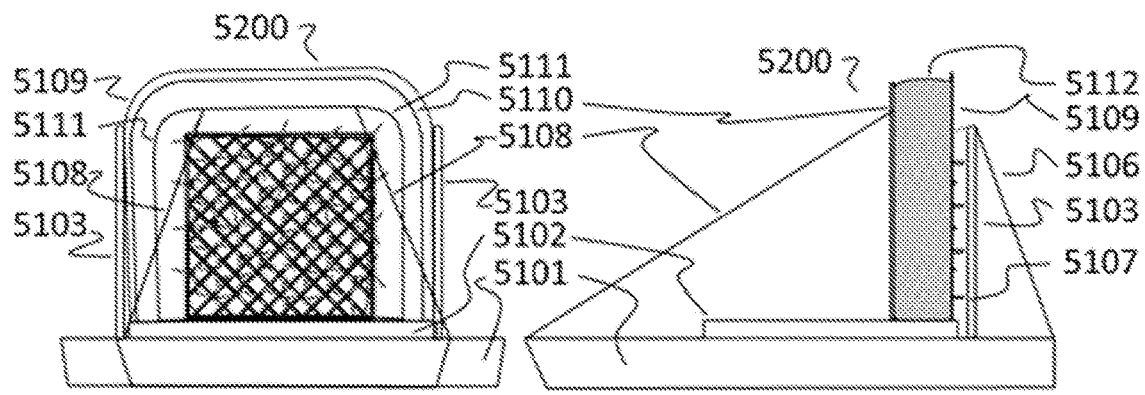

Referring to FIGS. 51A-51B-51C, each depicts two view orthographic projections of a barge with hull 5101, hold 5102, masts 5103 and other equipment in various stages of deployment. FIG. 51*a* shows a configuration that would be used if the barge were in storage or at sea on a mooring riding out a severe storm or hurricane. All the deck equipment has been lowered into the barge hold 5102 and a hatch 5104 has been added to protect the wind tunnel egress. FIG. 51*b* depicts both the port and starboard masts 5103 being raised. The base of masts 5103 are mounted to the deck with a tabernacle which allows the masts to pivot at their base. A backstay 5106 has been added to prevent the top of the mast from moving forward. A halyard has been added between the top of the mast and the back of the wind tunnel which is stowed in the hold 5102. The hatch 5104 has been removed and some of the equipment 5107 in the wind tunnel assembly 5107 can be seen. FIG. 51*c* illustrates wind tunnel 5200 and associated equipment out of the hold 5102 and in the normal operation position. Spinnaker 5001 in this image is furled and stowed around the housing for the wind tunnel 5112. The wind tunnel has a back plate 5109 and a front plate 5110. Back plate 5109 is slightly larger than front plate 5110 with front plate 5109 fitting inside hold 5102 and back plate 5109 fitting over the lip of hold 5102, forming part of the hatch. The front section of the wind tunnel 5110 includes the entrance to the wind tunnel 5111. The erect wind tunnel is prevented from rotating further aft by forestays 5108.

Figure 52:
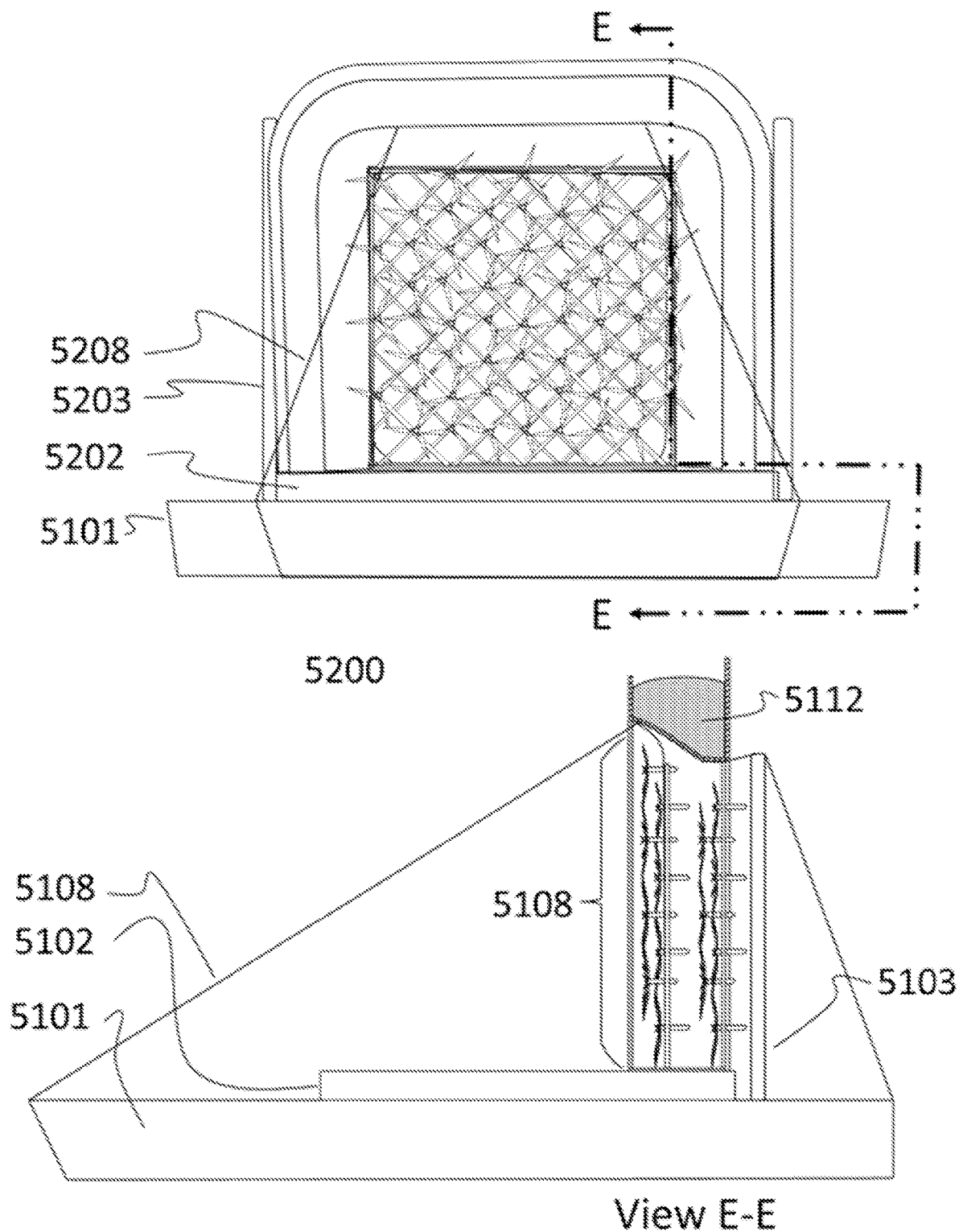
FIG. 52 is two views: front and side of FIG. 51*c* with the wind tunnel in cross-section.
Figure 53:
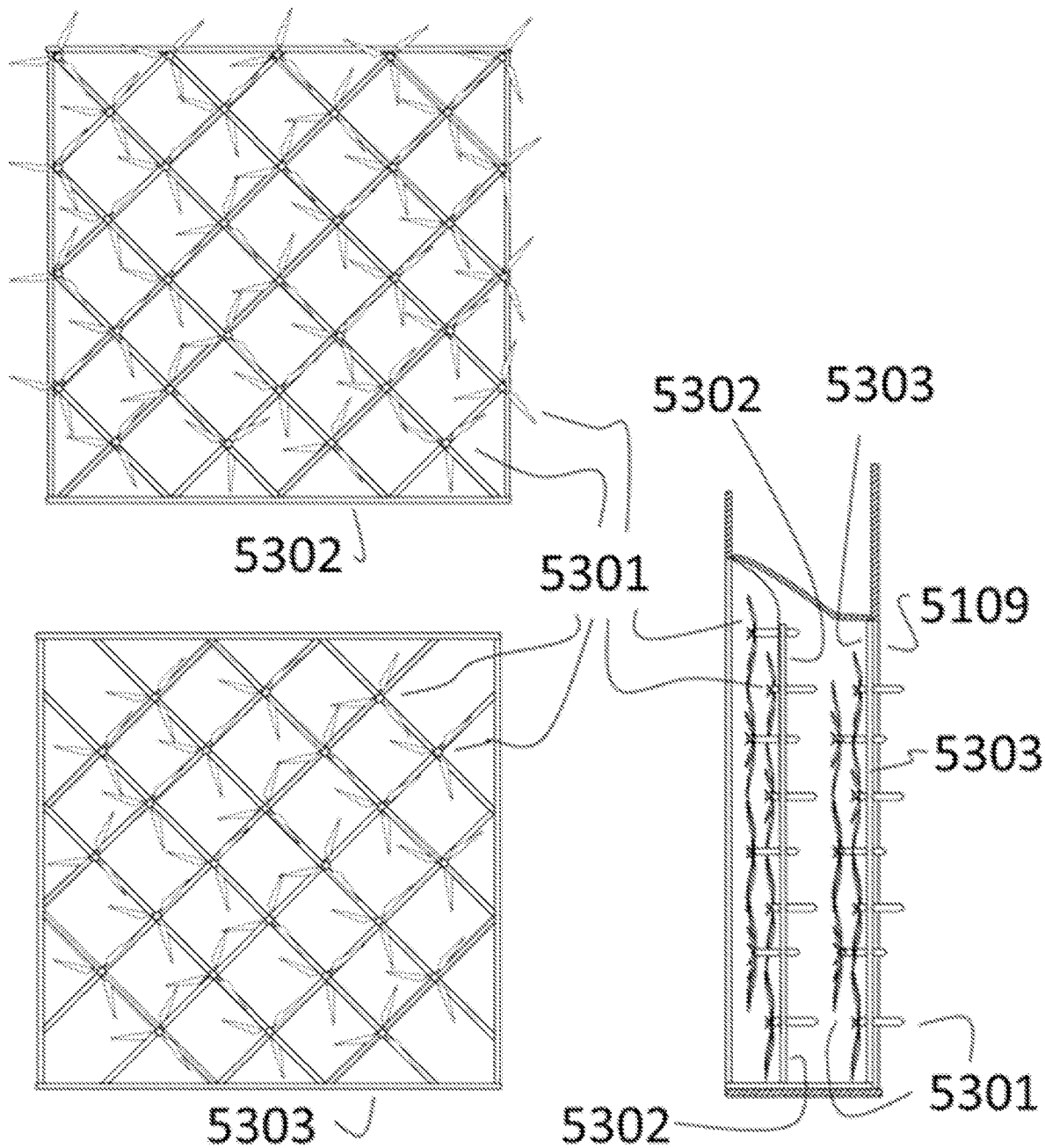
FIG. 53 depicts the wind tunnel identifying the location of sixty wind driven electrical turbines.

FIG. 52 is a front and side view of the wind tunnel area with View E-E showing a partial cross-section of the wind tunnel. The spinnaker 5112 is still furled and stowed in the cross-sectioned of View E-E.

In FIG. 50 thru FIG. 54 the forward frame 5302 is located inside the wind tunnel has rows containing either five or four wind turbine electrical generators 5301 with the rows of four wind turbine generators located slightly aft of the rows of five to eliminated propeller interference. In the aft frame 5303 there are three rows of four wind turbine electrical generators 5301 and four rows of three wind turbine electrical generators with the rows of three slightly behind the rows of four generators to prevent propeller interference. In total, there are sixty wind turbine electrical generators 5301 shown in this assembly and in the wind tunnel. The wind tunnel can be designed so that it is circular with one or more larger concentric wind turbine electrical generators with a relatively small gap between the concentric rotor and the wall of the wind tunnel.

Furling the Spinnaker

Figure 54:
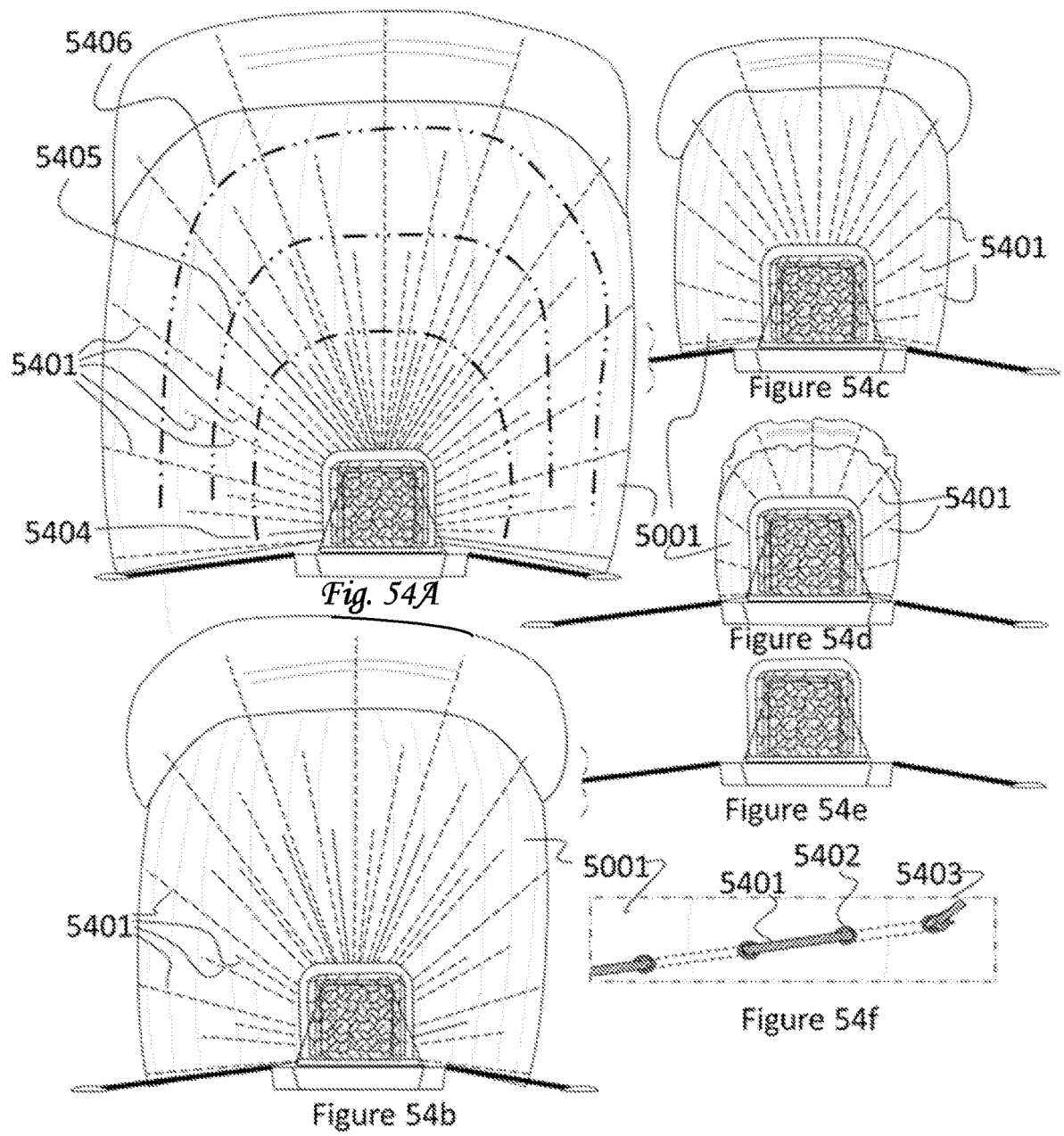
FIG. 54A-54B-54C-54D-54E-54F depict a furling system or components thereof for the spinnaker 2601 in various stages of deployment.

The size of the spinnaker 5001 and the remoteness of typical operating venues make automated furling desirable. FIG. 54 depicts a furling or reefing system for spinnaker 5001. The system has reefing or furling cords 5401 woven into the fabric of the spinnaker 5001 shown in FIG. 54*f*. The furling lines 5401 are woven through grommets 5402 located in the fabric of the spinnaker 5001. The lines 5401 and fasteners can also be mounted on one, or the other, or both sides of the spinnaker. The end of the furling lines 5401 are secured to the spinnaker 5001 with a knot 5403 or fastener. For reefing the spinnaker, knots or fasteners can be added closer to the wind tunnel frame where the spinnaker is normally stowed 5112.

In the application shown in FIG. 54, the furling cords 5401 are divided into four groups. The group with the shortest cords have the end knot inside the area marked by area line 5404 (—··—··—). The second group of furling lines 5401 are terminated 5403 inside the area line 5405, the third group is terminated inside of area line 5406, and the fourth group of furling lines is terminated near the edge of the spinnaker 5001.

Reefing of the spinnaker 5001 can be accomplished by partially or fully tightening the inside sets of lines 5401 by group tightening the lines inside 5404 first then those inside 5405, then the lines 5401 inside 5406. When furling the spinnaker, all the furling lines should be kept snug.

The furling or reefing lines 5401 from any one of the four groups of lines can be wound on the same spindle with that spindle turning until the that portion of the spinnaker is properly retracted. Differences in length for lines on the same spindle can be managed by modifying the diameter of the spindle so that all the lines on that spindle are fully retract about the same time.

Figure 16:
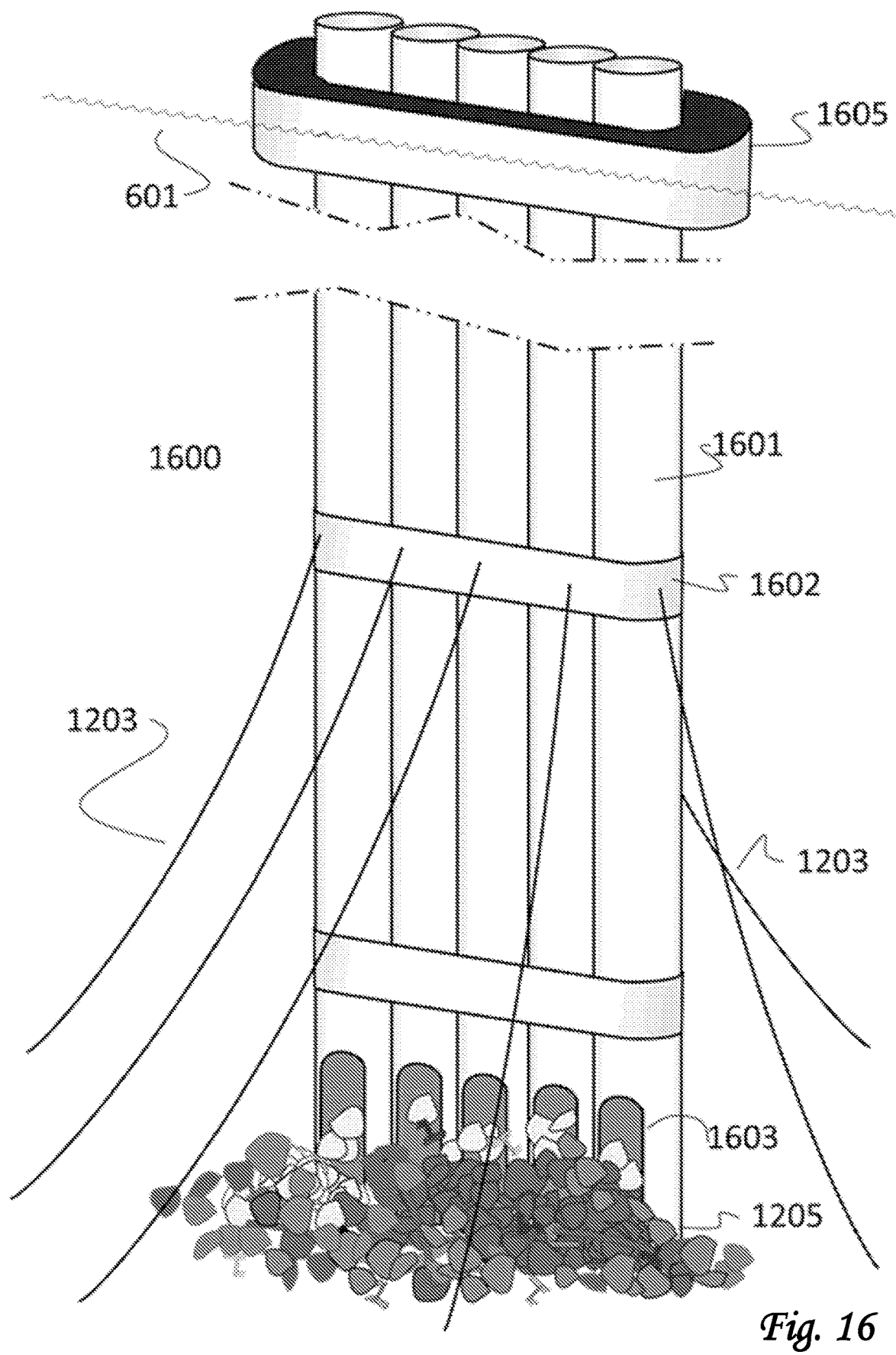
FIG. 16—A group of five sea silos mounted on the floor of the ocean.
Figure 55:
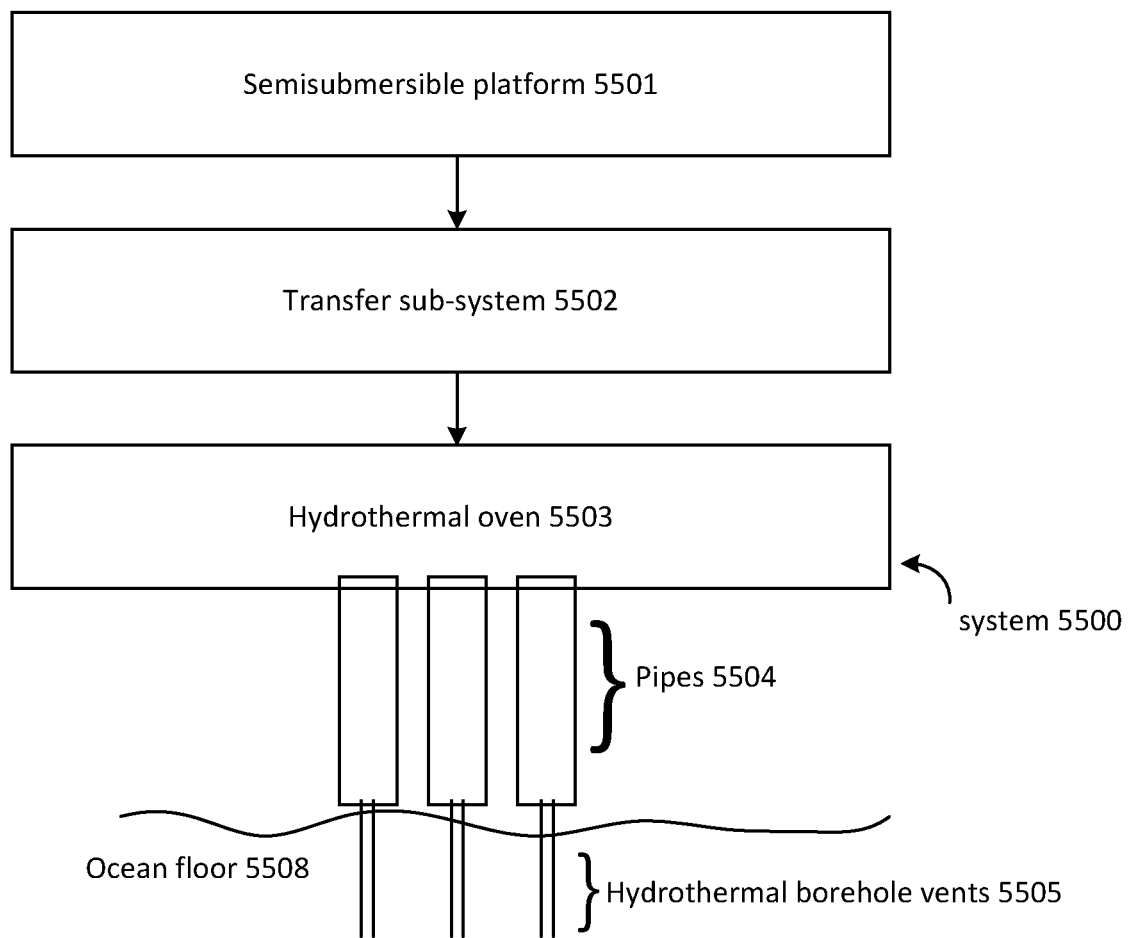
FIG. 55 illustrates a system configured to coalify organic material using hydro pyrolysis powered by one or more hydrothermal borehole vents, in accordance with one or more implementations.

FIG. 55 depicts a system 5500 configured to coalify organic material using hydro pyrolysis powered by one or more hydrothermal borehole vents 5505. In some implementations, system 5500 includes one or more of a semisubmersible platform 5501 (which may be similar to the semisubmersibles shown in FIGS. 41-43), a transfer sub-system 5502 (which may be similar to the sea silos 1201-1301-1601 shown in FIGS. 12-13-16, or to the containers 400-500-4200 in FIGS. 4-5A-5B-42), a hydrothermal oven 5503 (which may be similar to the hydrothermal ovens 800-1100-1400-1900-2100-2200 shown in FIGS. 8-11-14-19-21-22), one or more pipes 5504 (which may be similar to tubes 2703-2704 or pipes 2802-2902 shown in FIGS. 28-38B-39-41), and/or other components. Semisubmersible platform 5501 may be configured to be moored at a body of water, such as an ocean. Transfer sub-system 5502 may be configured to transfer organic material from semisubmersible platform 5501 into hydrothermal oven 5503. Hydrothermal oven 5503 may be configured to coalify the organic material using at least one of (i) hot water, (ii) steam, and (iii) supercritical water. One or more pipes 5504 may be configured to provide at least one of (i) hot water, (ii) steam, and (iii) supercritical water from one or more hydrothermal borehole vents 5505, near ocean floor 5508, to hydrothermal oven 5503. In some implementations, system 550 may include a pressure generator.

Figure 56:
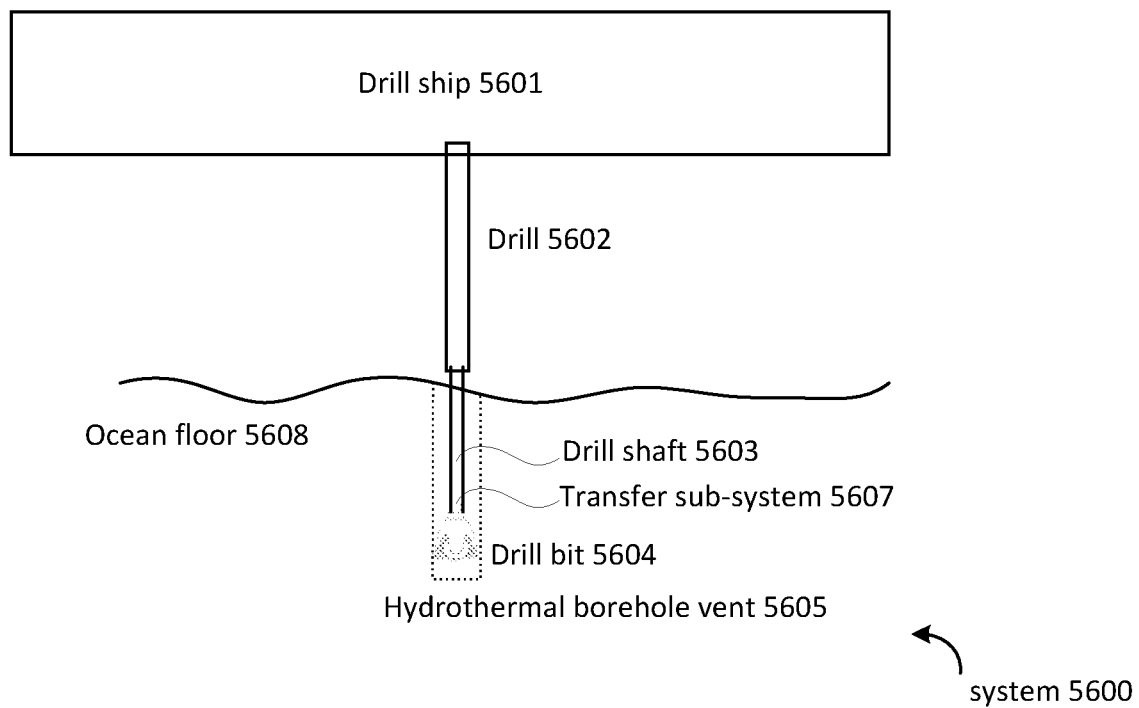
FIG. 56 illustrates a system configured to coalify organic material using hydro pyrolysis powered by hydrothermal borehole vents, in accordance with one or more implementations.

FIG. 56 depicts a system 5600 configured to coalify organic material using hydro pyrolysis powered by one or more hydrothermal borehole vents 5605 near ocean floor 5608. In some implementations, system 5600 includes one or more of a drill ship 5601 (which may be similar to drill ship 2601 shown in FIG. 26), a drill 5602 (which may be similar to the drilling equipment shown in FIG. 26), and a transfer sub-system 5607 (which may be similar to the sea silos 1201-1301-1601 shown in FIGS. 12-13-16, or to the containers 400-500-4200 in FIGS. 4-5A-5B-42). Drill ship 5601 may be configured to carry drill 5602. Drill 5602 may include drill shaft 5603 (which may be similar to drilling shaft 2603 shown in FIG. 26), drill bit 5604 (which may be similar to drill bit 2604 shown in FIG. 26), and/or other components. Transfer sub-system 5607 may be configured to transfer organic material from drill ship 5601, through drill shaft 5603, into hydrothermal borehole vent 5605 such that the organic material coalifies through hydro pyrolysis powered by hydrothermal borehole vent 5605. In some implementations, drill shaft 5603 of drill 5602 may operate as transfer sub-system 5607. In some implementations, transfer sub-system 5607 may include a conveyor belt (e.g., similar to conveyor 1206 shown in FIG. 12), a pressure generator, and/or other components. For example, transfer sub-system 5607 may be configured to use a pressure differential and/or gravity to move organic material downward.

Figure 57:
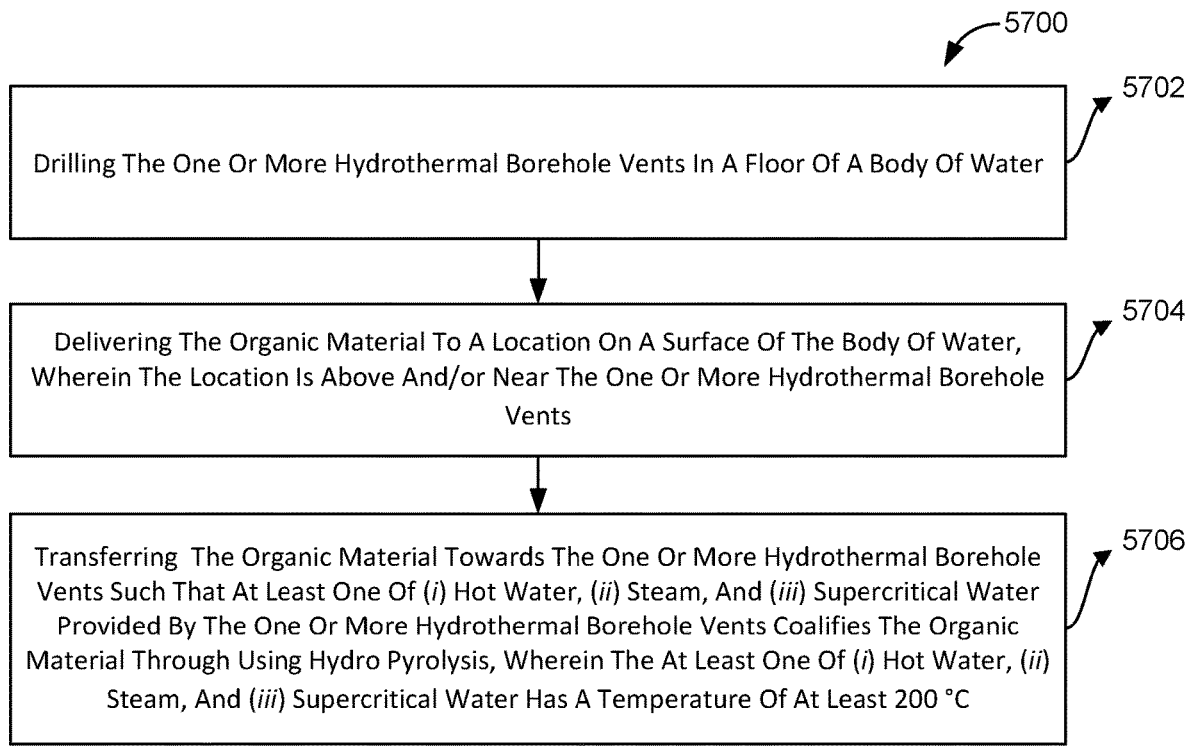
FIG. 57 illustrates a method to coalify organic material using hydro pyrolysis powered by one or more hydrothermal borehole vents, in accordance with one or more implementations.

FIG. 57 illustrates a method 5700 to coalify organic material using hydro pyrolysis powered by one or more hydrothermal borehole vents, in accordance with one or more implementations. In some implementations, the organic material may include one or more of drugs, garbage, sewage, and/or other types of organic material. The operations of method 5700 presented below are intended to be illustrative. In some implementations, method 5700 may be accomplished with one or more additional operations not described, and/or without one or more of the operations discussed. Additionally, the order in which the operations of method 5700 are illustrated in FIG. 57 and described below is not intended to be limiting.

At an operation 5702, one or more hydrothermal borehole vents are drilled in a floor of a body of water, such as an ocean floor. In some embodiments, operation 5702 is performed by a drill the same as or similar to drill 5602 (shown in FIG. 56 and described herein).

At an operation 5704, the organic material is delivered to a location on a surface of the body of water, wherein the location is above and/or near the one or more hydrothermal borehole vents. In some embodiments, operation 5704 is performed by a cargo ship and/or a log raft the same as or similar to cargo ship 4301 (or another ship described in this disclosure) and/or log raft 300 (shown in FIG. 43 and FIG. 3 and described herein).

At an operation 5706, the organic material is transferred toward one or more hydrothermal borehole vents. At least one of (i) hot water, (ii) steam, and (iii) supercritical water provided by the one or more hydrothermal borehole vents coalifies the organic material through using hydro pyrolysis. The at least one of (i) hot water, (ii) steam, and (iii) supercritical water has a temperature of at least 200° C. In some embodiments, operation 5706 is performed by a transfer sub-system the same as or similar to transfer sub-system 5502 and/or transfer sub-system 5607 (shown in FIG. 55 and FIG. 56 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A transportation system configured to transport organic material by flight, the transportation system comprising:
    a remotely-piloted air vehicle configured to transport the organic material through the air and to provide lift to the transportation system, wherein the organic material includes logs;
    a frame coupled to the remotely-piloted air vehicle, wherein the frame is configured to be coupled to multiple air vehicles, wherein the frame forms one or more rectangles around at least two of the multiple air vehicles;
    the multiple air vehicles configured to provide additional lift to the transportation system in addition to the lift provided by the remotely-piloted air vehicle, wherein the multiple air vehicles are coupled to the frame, and wherein the multiple air vehicles include at least five blimps;
    one or more propellers configured to provide thrust to the transportation system;
    ballast storage configured to store ballast; and
    a harness configured to couple the organic material to the transportation system, wherein the harness includes one or more logging straps configured to be tied around the logs.

2. The transportation system of claim 1, wherein the remotely-piloted air vehicle is a blimp.

3. The transportation system of claim 1, wherein the transportation system further includes one or more navigation lights, one or more rudders, one or more ailerons, and one or more motors.

4. The transportation system of claim 1, wherein the lift provided to the transportation system counteracts gravitational pull of the organic matter during the flight.

5. The transportation system of claim 1, wherein the ballast storage includes water ballast storage.

6. The transportation system of claim 1, wherein the ballast storage includes one or more water bags.

7. The transportation system of claim 6, wherein the one or more water bags are refillable, and wherein the ballast storage is configured to empty the one or more water bags prior to the transportation of the organic matter.

8. The transportation system of claim 1, further including a gondola configured to carry crew.

9. The transportation system of claim 1, wherein the multiple air vehicles include blimps.

* * * * *